May 9, 1939.   G. W. HOPKINS, JR   2,157,411
CALCULATING MACHINE
Filed May 8, 1931   19 Sheets-Sheet 1

INVENTOR.
George W. Hopkins Jr.
BY
ATTORNEY.

WITNESS

May 9, 1939.  G. W. HOPKINS, JR  2,157,411
CALCULATING MACHINE
Filed May 8, 1931  19 Sheets—Sheet 2

INVENTOR.
George W. Hopkins jr.
BY
ATTORNEY.

WITNESS

May 9, 1939.   G. W. HOPKINS, JR   2,157,411
CALCULATING MACHINE
Filed May 8, 1931   19 Sheets-Sheet 3

INVENTOR
George W. Hopkins jr.
BY
ATTORNEY.

WITNESS
W. Math.

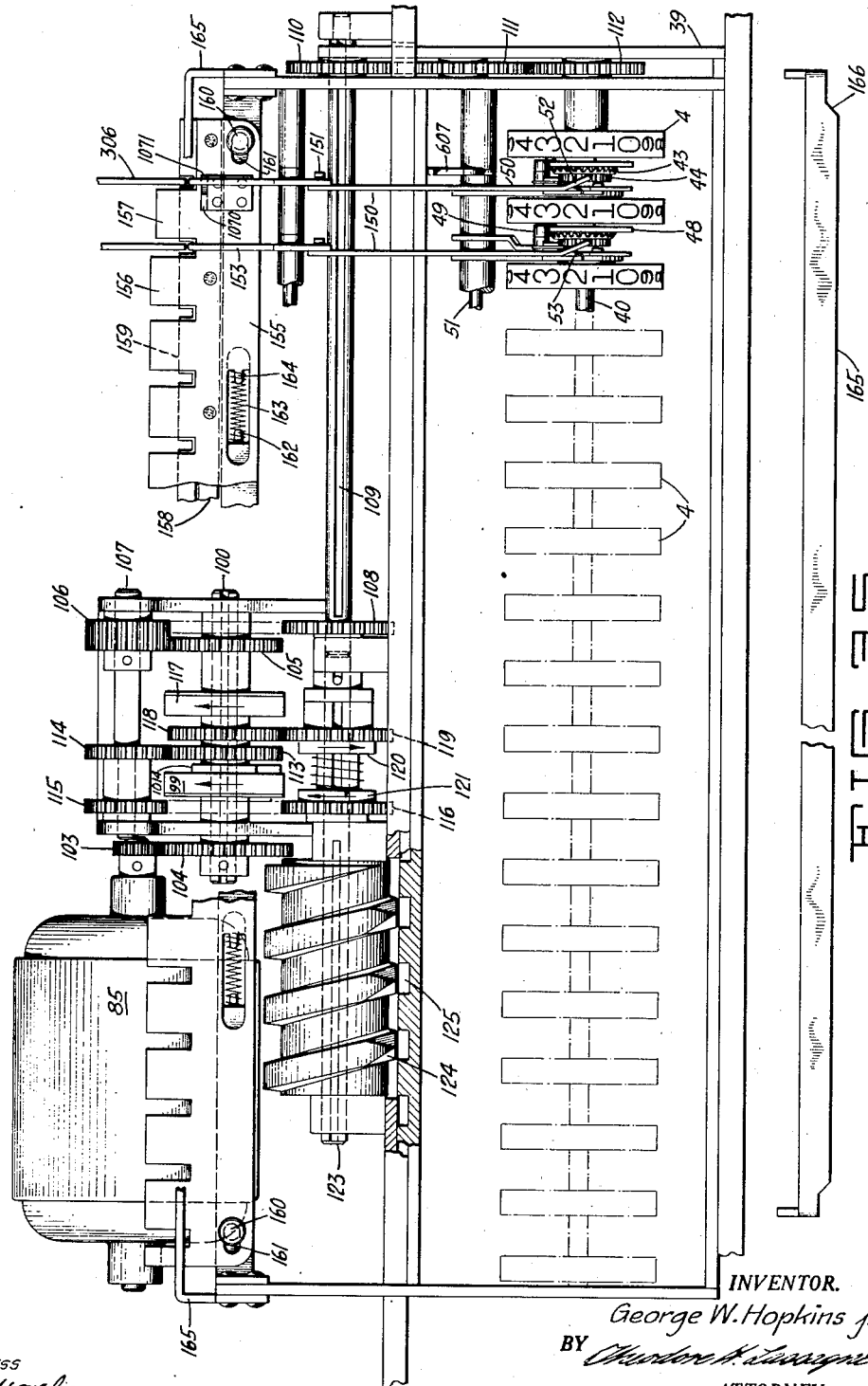

May 9, 1939.  G. W. HOPKINS, JR  2,157,411
CALCULATING MACHINE
Filed May 8, 1931  19 Sheets—Sheet 7
FIG-7-
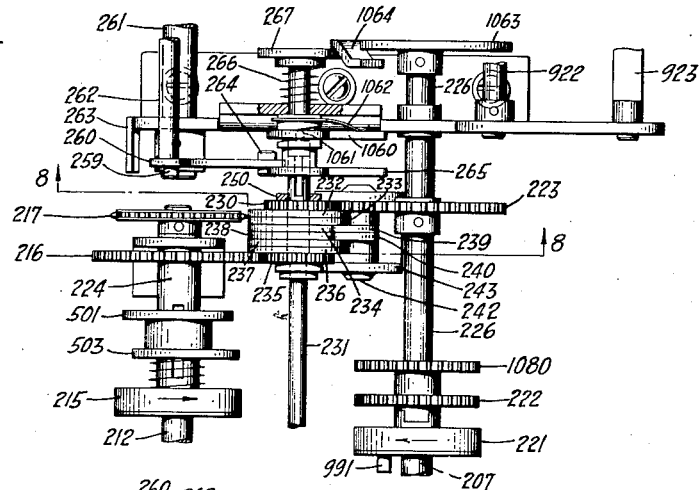
FIG-8-
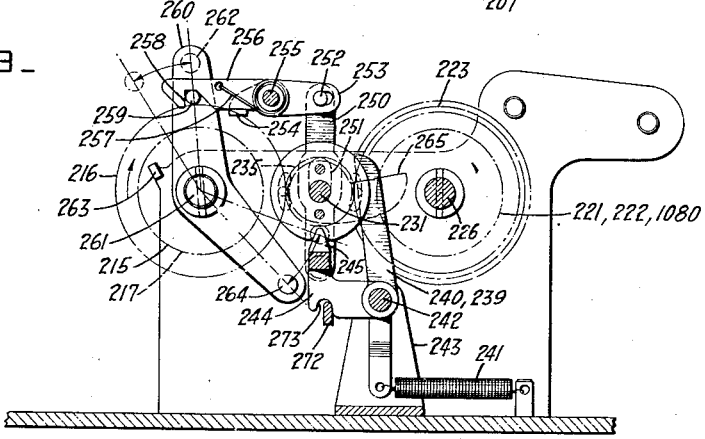
FIG-8A-
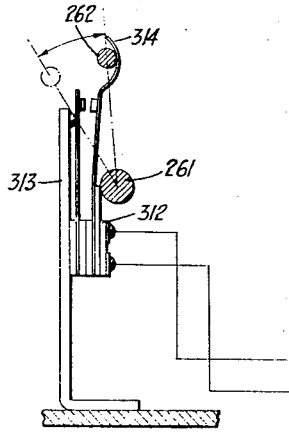
FIG-9-
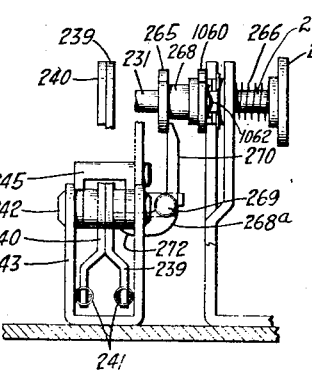
FIG-7A-
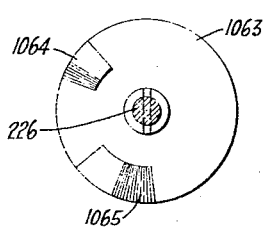
INVENTOR.
George W. Hopkins jr.
BY
ATTORNEY.
WITNESS

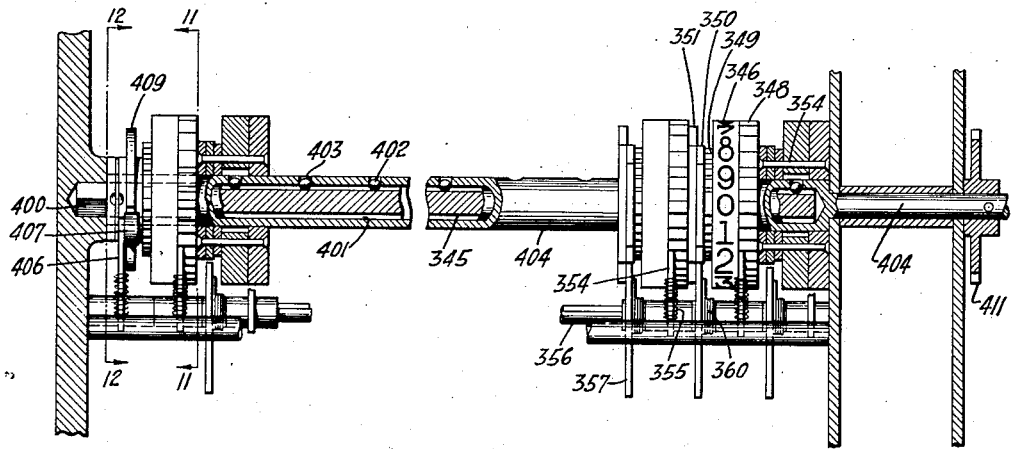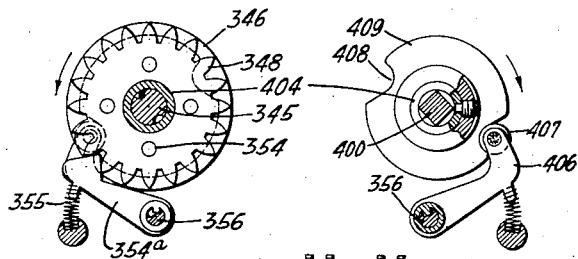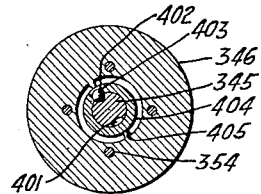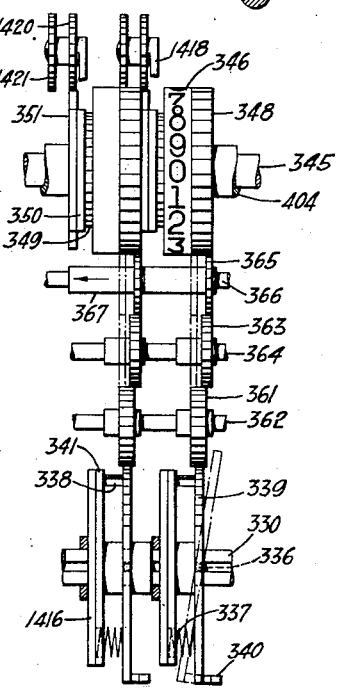

May 9, 1939.　　　G. W. HOPKINS, JR　　　2,157,411
CALCULATING MACHINE
Filed May 8, 1931　　　19 Sheets-Sheet 9
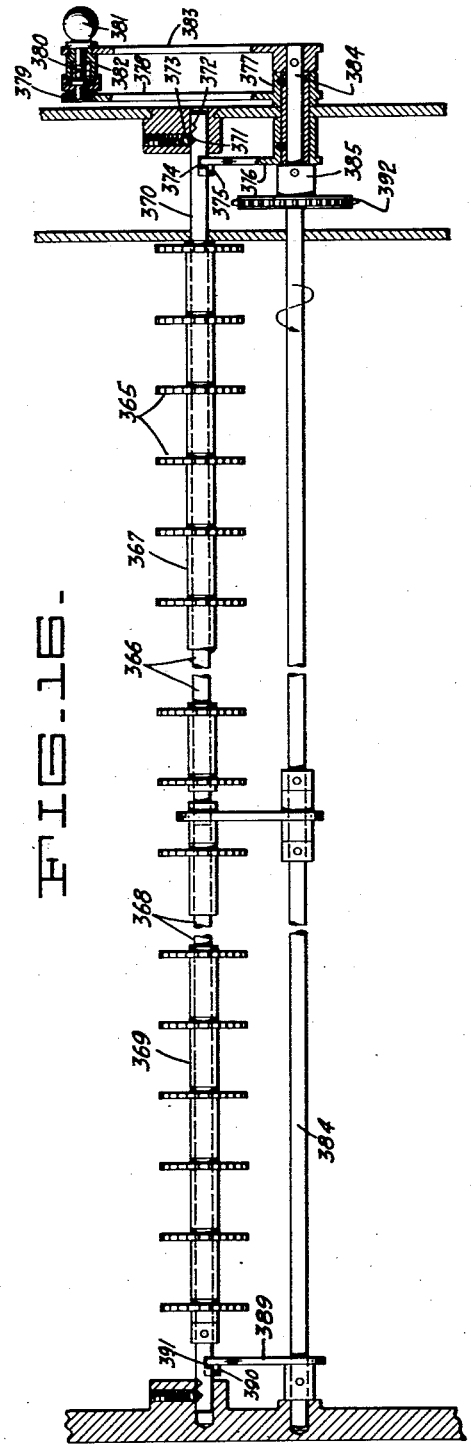
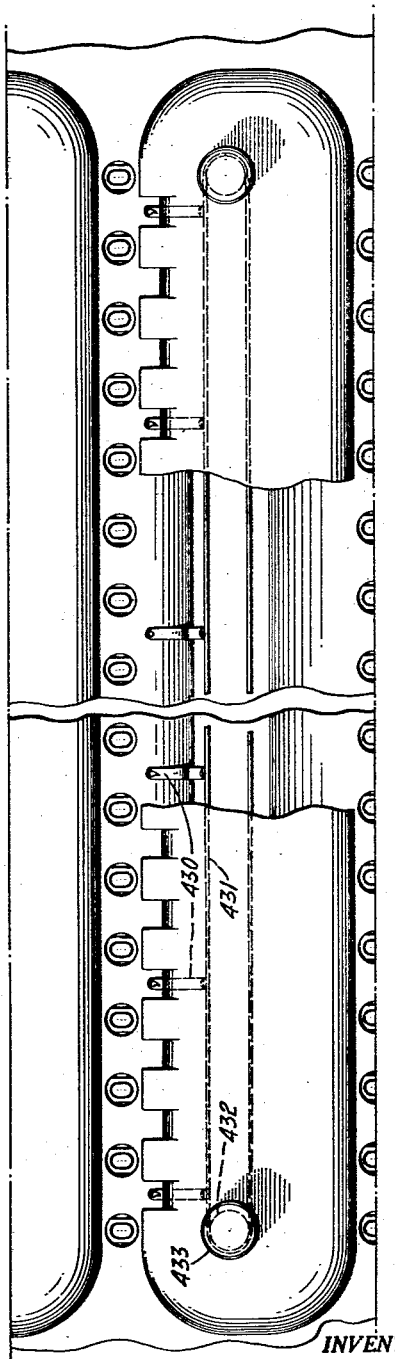
INVENTOR.
George W. Hopkins jr.
BY
ATTORNEY.

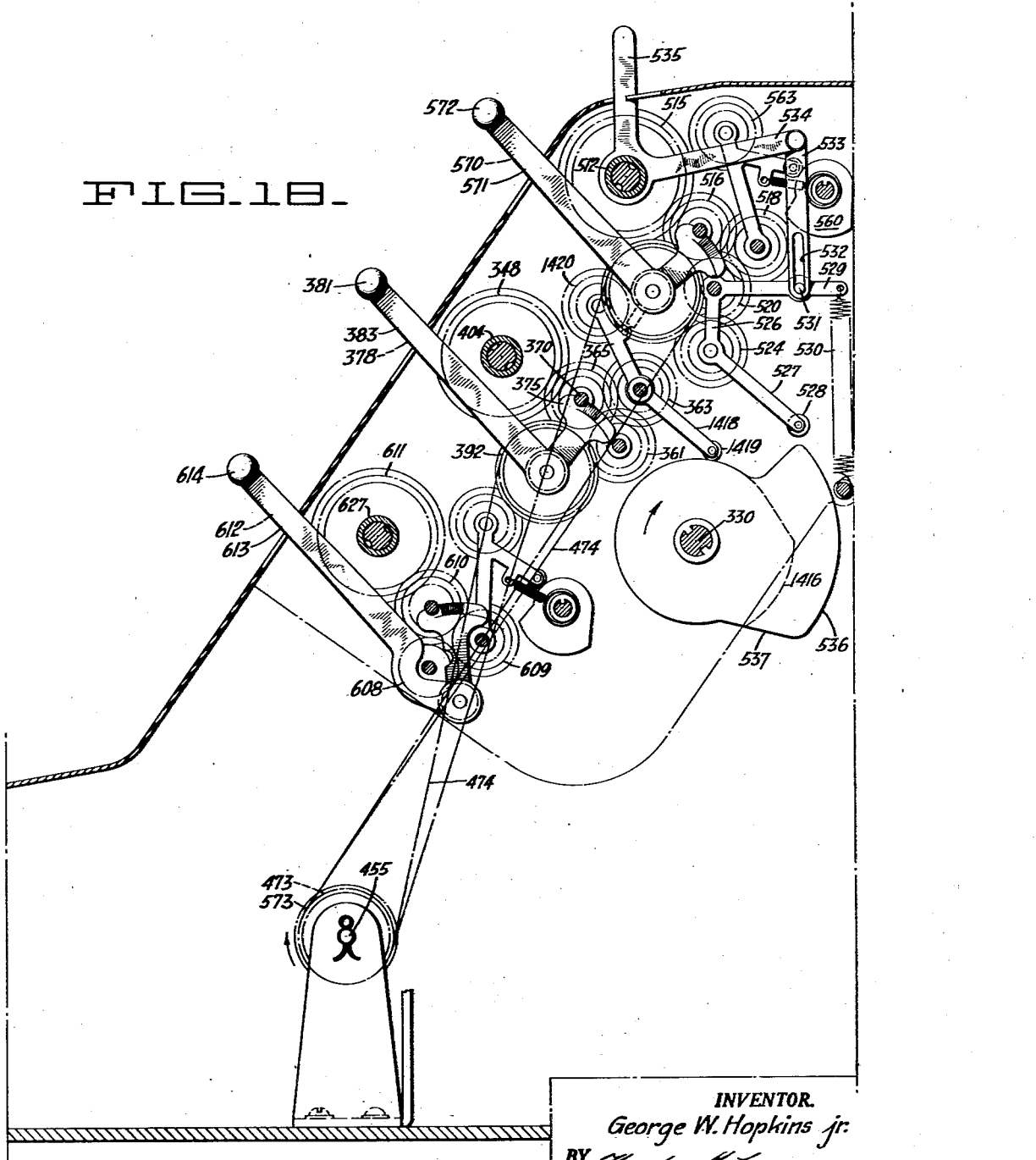

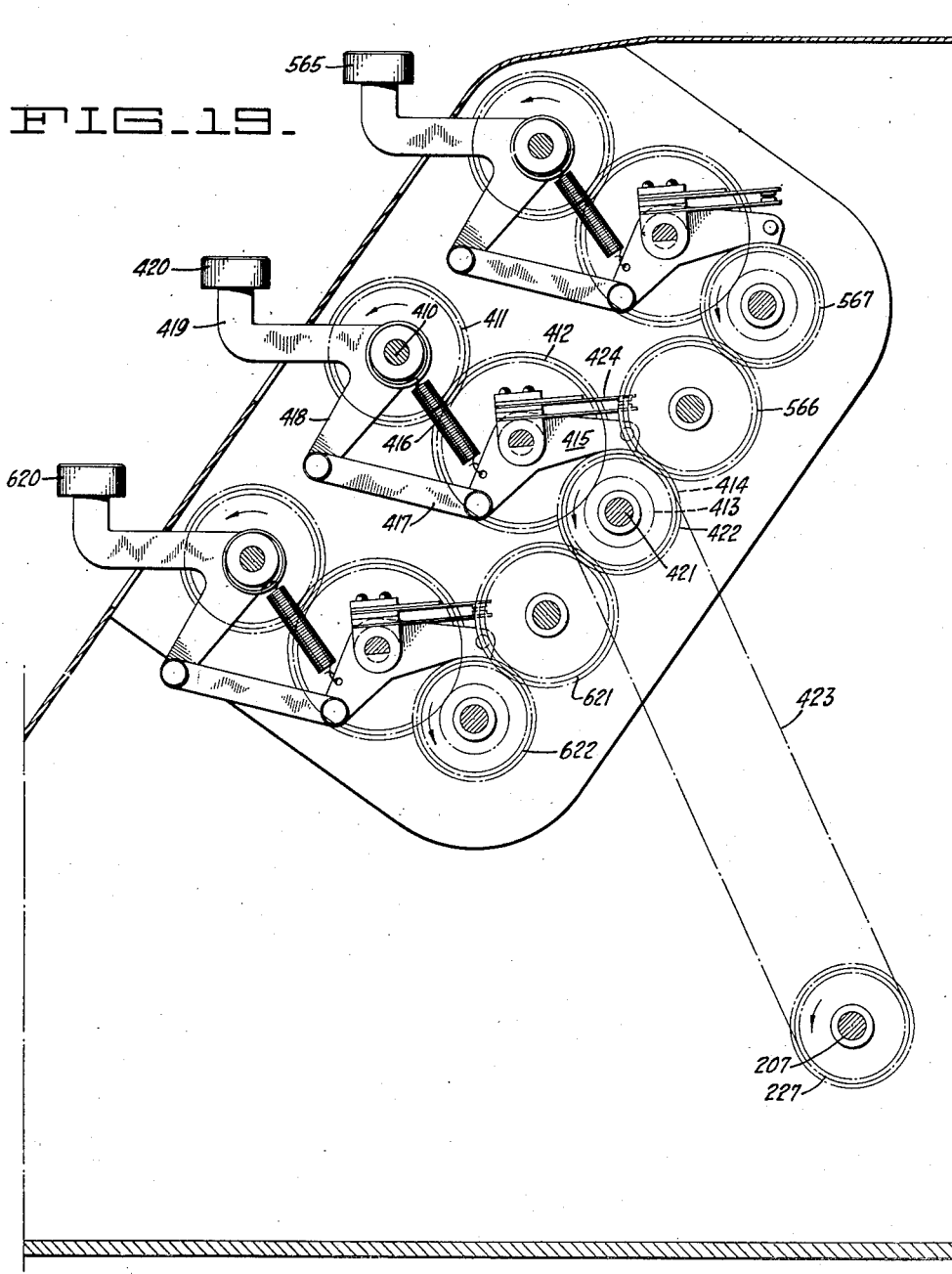

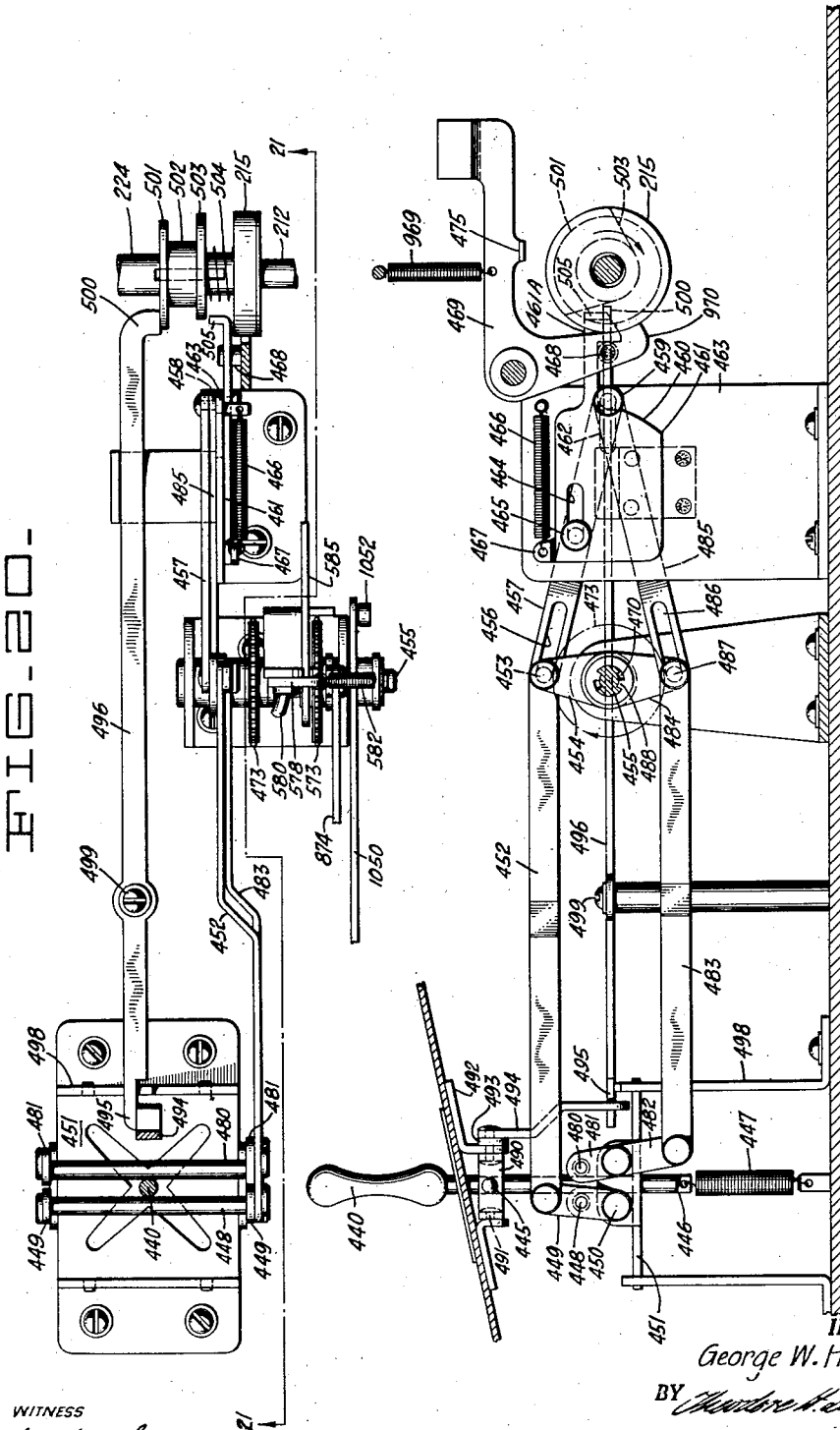

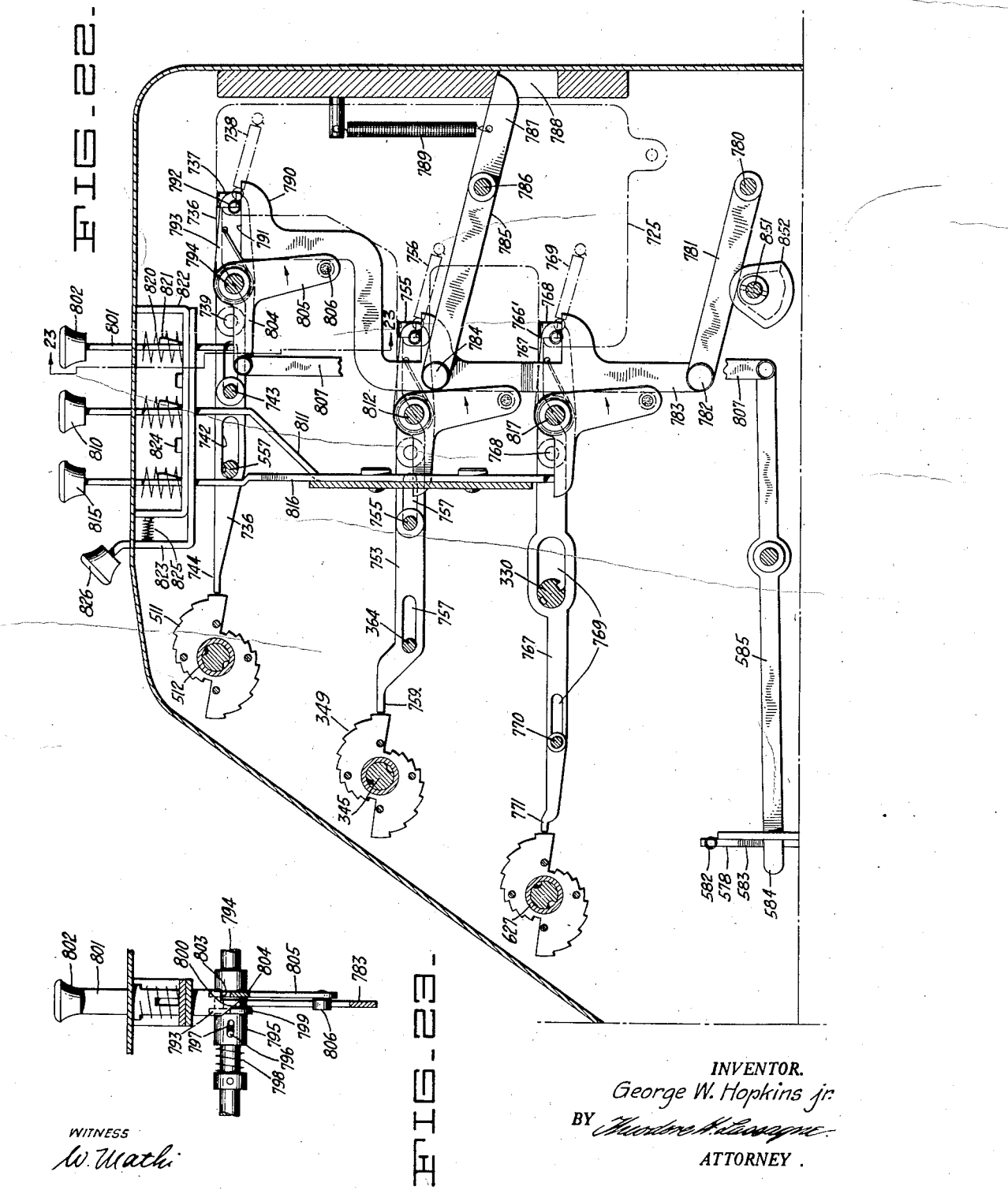

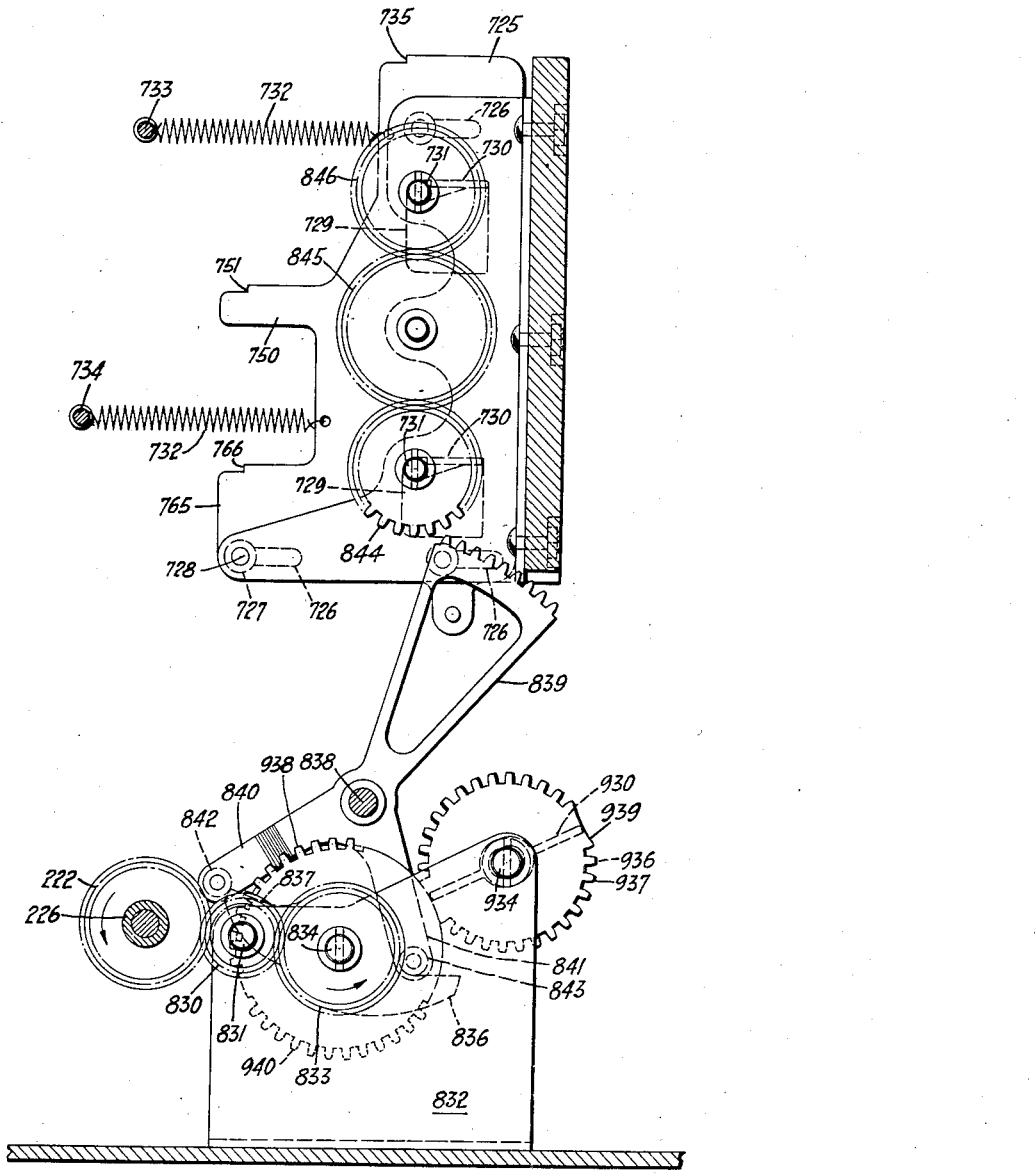

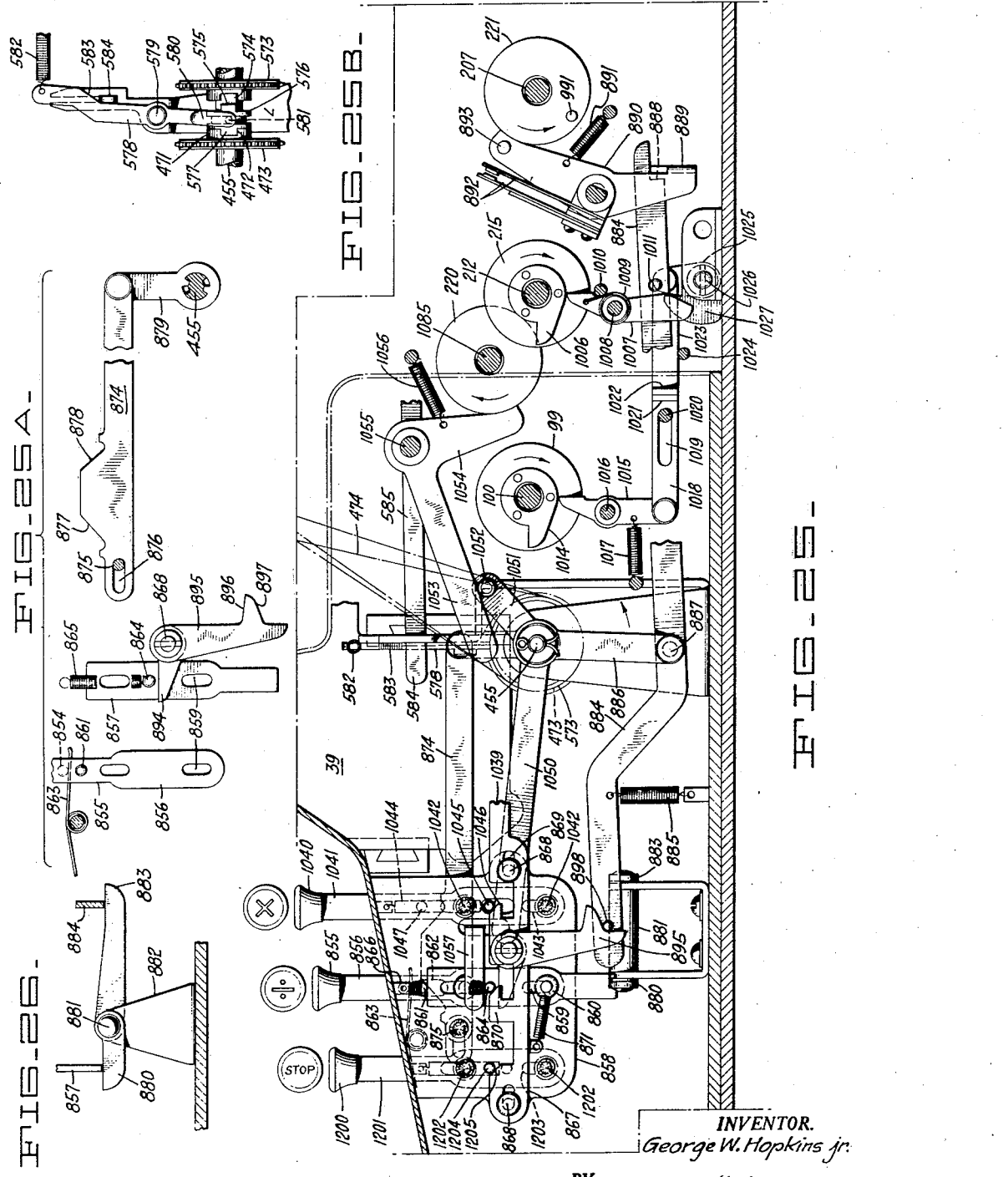

May 9, 1939. G. W. HOPKINS, JR 2,157,411
CALCULATING MACHINE
Filed May 8, 1931    19 Sheets-Sheet 16
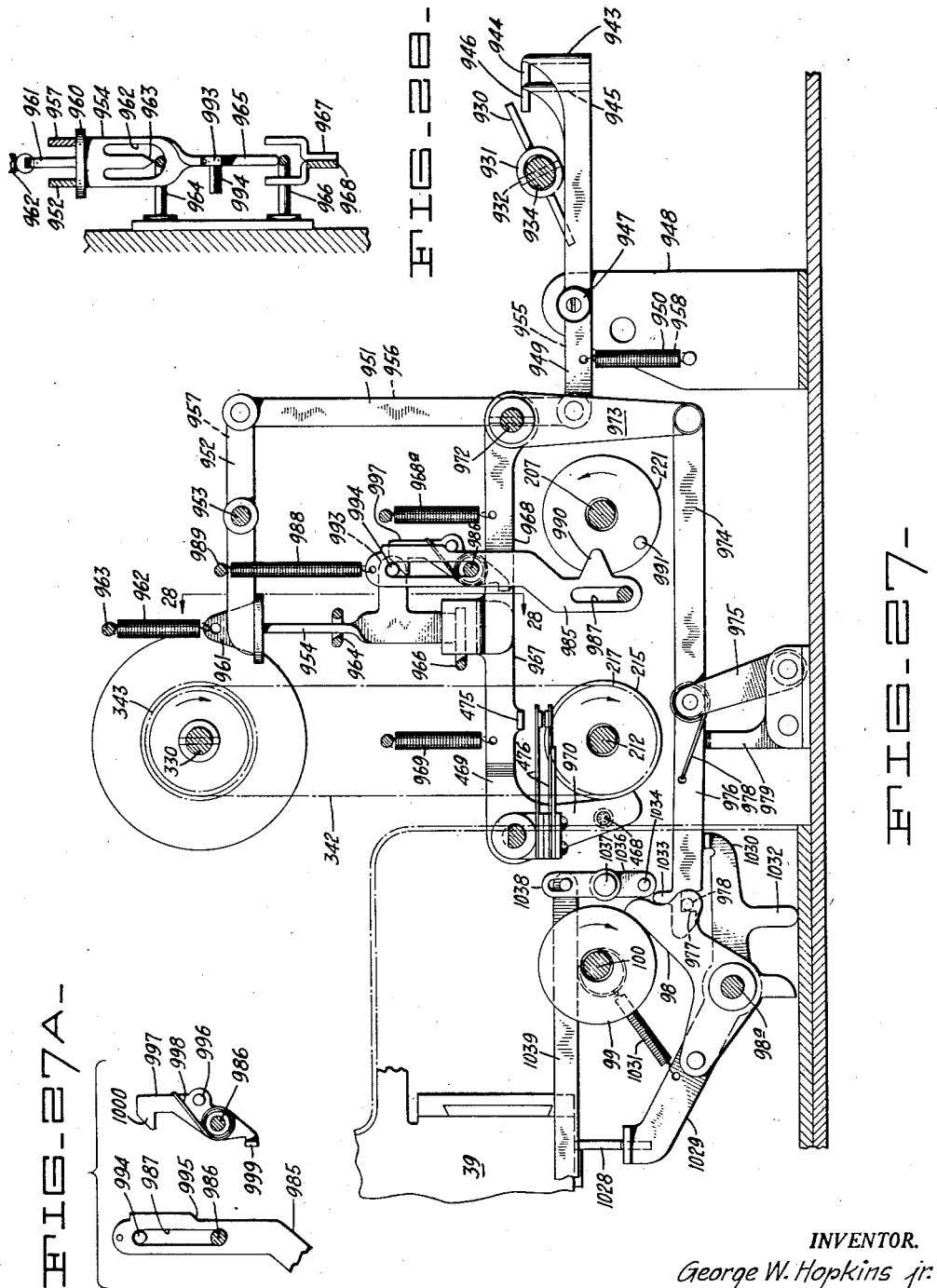
INVENTOR.
George W. Hopkins jr.
BY *[signature]*
ATTORNEY.
WITNESS
*W. Math*

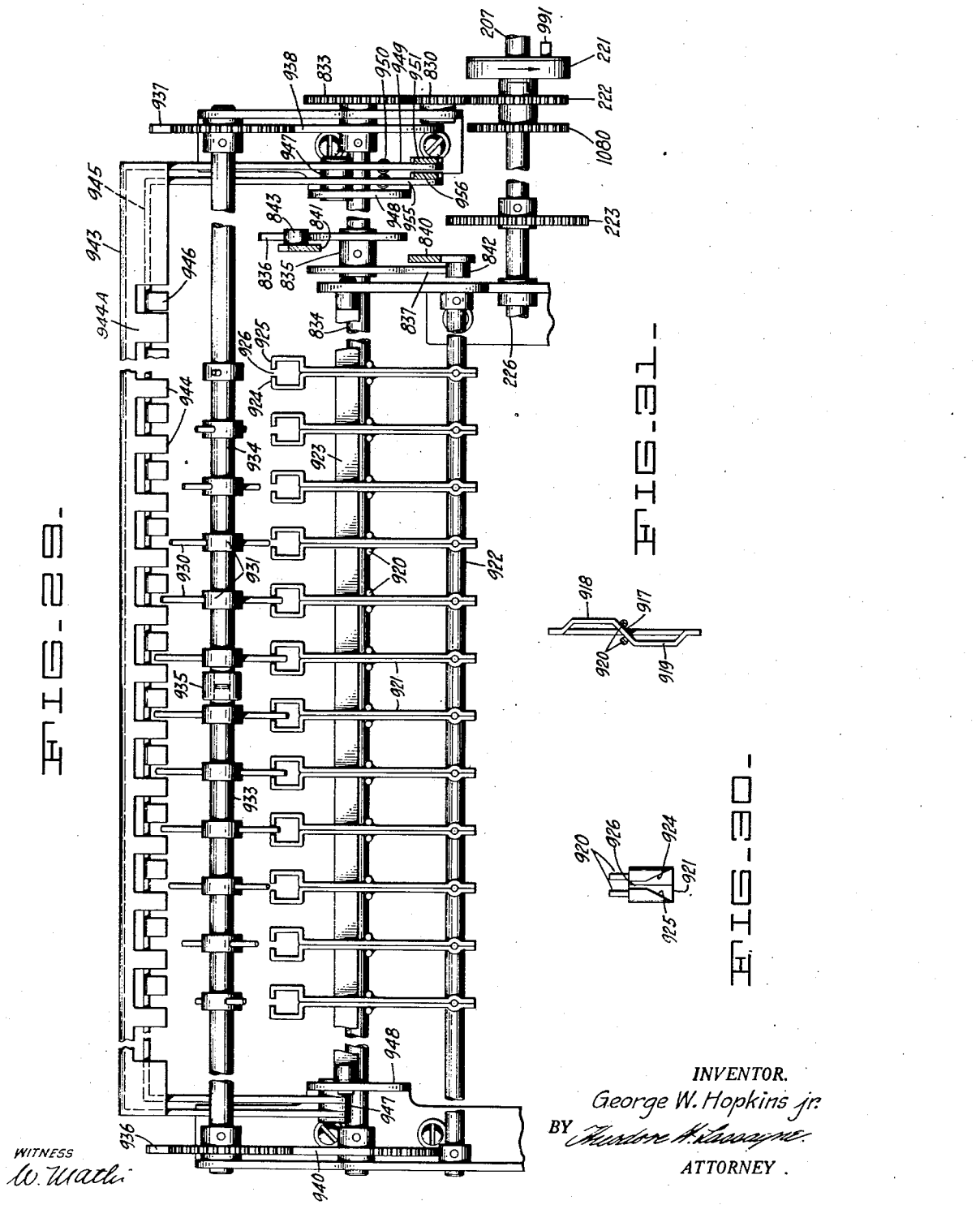

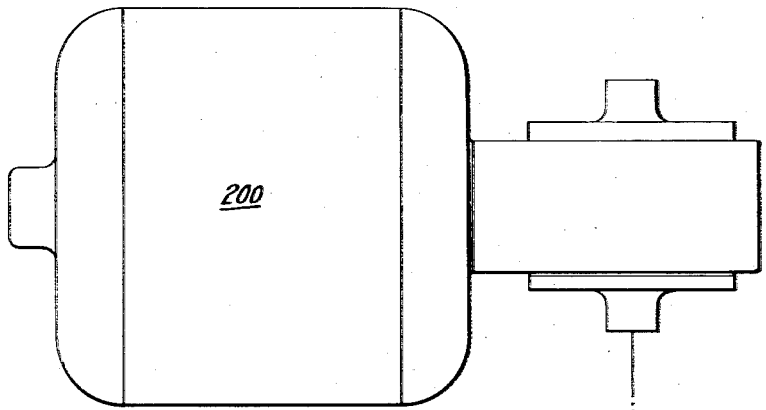
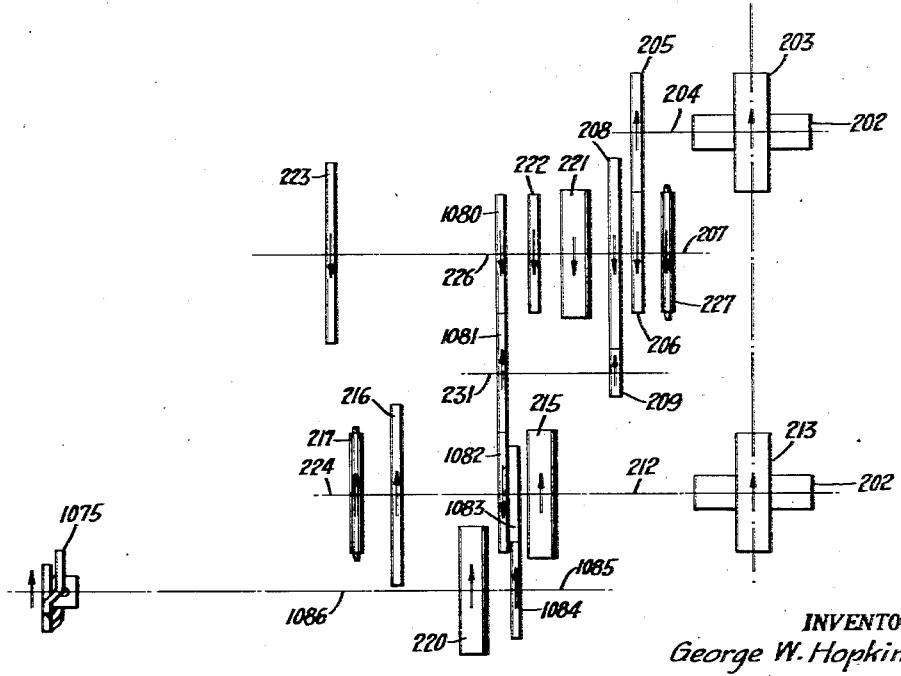
FIG_32_

May 9, 1939.   G. W. HOPKINS, JR   2,157,411
CALCULATING MACHINE
Filed May 8, 1931   19 Sheets-Sheet 19
FIG_33_
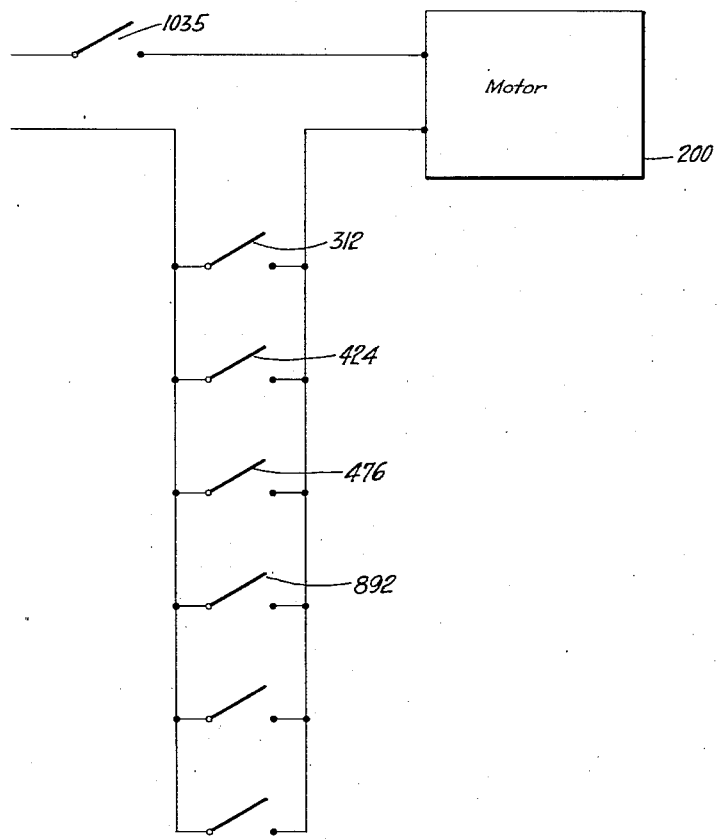
FIG_34_
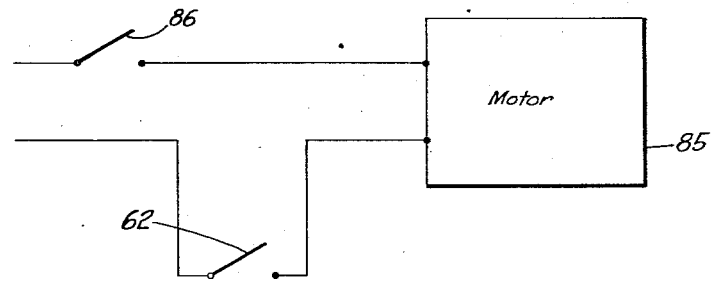
INVENTOR.
George W. Hopkins jr.
BY
ATTORNEY.
WITNESS Patented May 9, 1939

2,157,411

UNITED STATES PATENT OFFICE 2,157,411

CALCULATING MACHINE

George W. Hopkins, Jr., San Leandro, Calif., assignor to Marchant Calculating Machine Company, a corporation of California Application May 8, 1931, Serial No. 535,881

19 Claims. (Cl. 235—79)

The present invention relates to combined adding and calculating machines, and particularly to the type in which the values entered into an item register are utilized to control digitation on one or more registers provided for accumulating and totalizing operations. This machine is adapted to perform addition, subtraction, multiplication, and division in an entirely automatic manner upon manipulation of the proper controls. Such a machine is disclosed in my abandoned application for Letters Patent of the United States, No. 271,677, filed April 4, 1928, of which this application is a continuation in part.

It is an object of the invention to provide a combined adding and calculating machine whereby the adding machine may be used singly or in conjunction with a calculating attachment as a complete calculating machine.

Another object of the invention is to provide a combined adding and calculating machine in which the item register of the adding machine is used to control digitation in the calculating machine.

Another object of the invention is to provide a sensing mechanism whereby the values standing on a shiftable registering mechanism may be sensed in any shifted position thereof for controlling machine operation.

Another object of the invention is to provide automatic means for disabling that portion of the sensing mechanism which is not in operative position with respect to the displaceable registering mechanism.

Another object of the invention is to provide a shiftable item register in a key operated adding machine.

Another object of the invention is to provide improved resetting mechanism for a shiftable item registering mechanism in a key operated adding machine.

Another object of the invention is to provide a power drive for a key operated adding machine which is initiated by depression of any control key or by any value key of said adding machine.

Another object of the invention is to provide an accumulating mechanism which may be actuated either forwardly or reversely from the actuating mechanism, and which may be "split" to register separate items on various sections thereof, the sections being selectively operable to receive either positive or negative increments of movement.

Another object of the invention is to provide an improved transfer mechanism whereby a transfer may occur simultaneously within groups of the orders with both an independent actuator and an entrained mechanism whereby a large number of orders may be provided in the register.

Another object of the invention is to provide a plurality of markers for separating the numbers entered in a register into groups, said plurality of markers being simultaneously operated by a manual control.

Another object of the invention is to provide a totalizing register which is adapted to receive items either from the actuator or from the accumulating mechanism in either a positive or a negative sense.

Another object of the invention is to provide means whereby items may be transferred in either a positive or in a negative direction from a totalizing register to an accumulating register, or vice versa.

Another object of the invention is to provide two revolutions counters which may be actuated selectively in a reverse direction with respect to each other and to the actuating mechanism.

Another object of the invention is to provide a manual control for determining whether one or a plurality of registers will be zeroized upon operation of a single resetting control member.

Another object of the invention is to provide a general operation controlling means whereby single or plural positive or negative actuations of either the accumulator or the grand total register may be determined selectively.

Another object of the invention is to provide selective sensing means whereby any of a plurality of registering mechanisms may be sensed to utilize the values standing thereon in controlling machine operation.

Another object of the invention is to provide manual control for selectively enabling the sensing means for any one of a plurality of registering mechanisms.

Another object of the invention is to provide manually operable means for disabling the sensing mechanism for one or more registering mechanisms.

Another object of the invention is to provide automatic control mechanism for determining and enforcing a correct sequence of functional cycles in the solution of problems in division and multiplication.

Another object of the invention is to provide automatic control mechanism which may be selectively used to control any one of a plurality of automatic operations.

Another object of the invention is to provide automatic division mechanism whereby the operation of subtraction will be terminated in each order when the divisor has been withdrawn as many times as it can be withdrawn without producing an overdraft.

Another object of the invention is to provide mechanism whereby a multi-digit multiplication may be performed in an entirely automatic manner.

Another object of the invention is to provide mechanism whereby any automatic operation will be terminated when the necessary registrations have been made with the registering carriage in its last position.

Another object of the invention is to provide a special control member whereby any automatic operation may be terminated upon operation thereof.

Other objects will appear as the description progresses.

The invention possesses a plurality of advantageous features, some of which will be set forth at length in the following description, where that form of the invention which has been selected for illustration in the drawings accompanying and forming a part of the present specification shall be outlined in full. In said drawings, one form of apparatus embodying the invention has been shown, but it is to be understood that the invention has not been limited to such form, since the invention, as set forth in the claims, may be embodied in a plurality of other forms.

It is manifest that the invention may be embodied in any suitable combined adding and calculating machine in which the accumulating mechanism and the differential controlling mechanism therefor are relatively displaceable with respect to each other.

In the accompanying drawings forming a part of this specification:

Figure 1 is a plan view of the combined adding and calculating machine as the two are assembled for conjoint operation.

Figures 2, 3, and 4 together illustrate a longitudinal section through the combined adding and calculating machine in which are shown the various registers and the actuating mechanism therefor. The upper and lower sensing slides are also shown as well as the comparing mechanism therefor.

Figure 1:
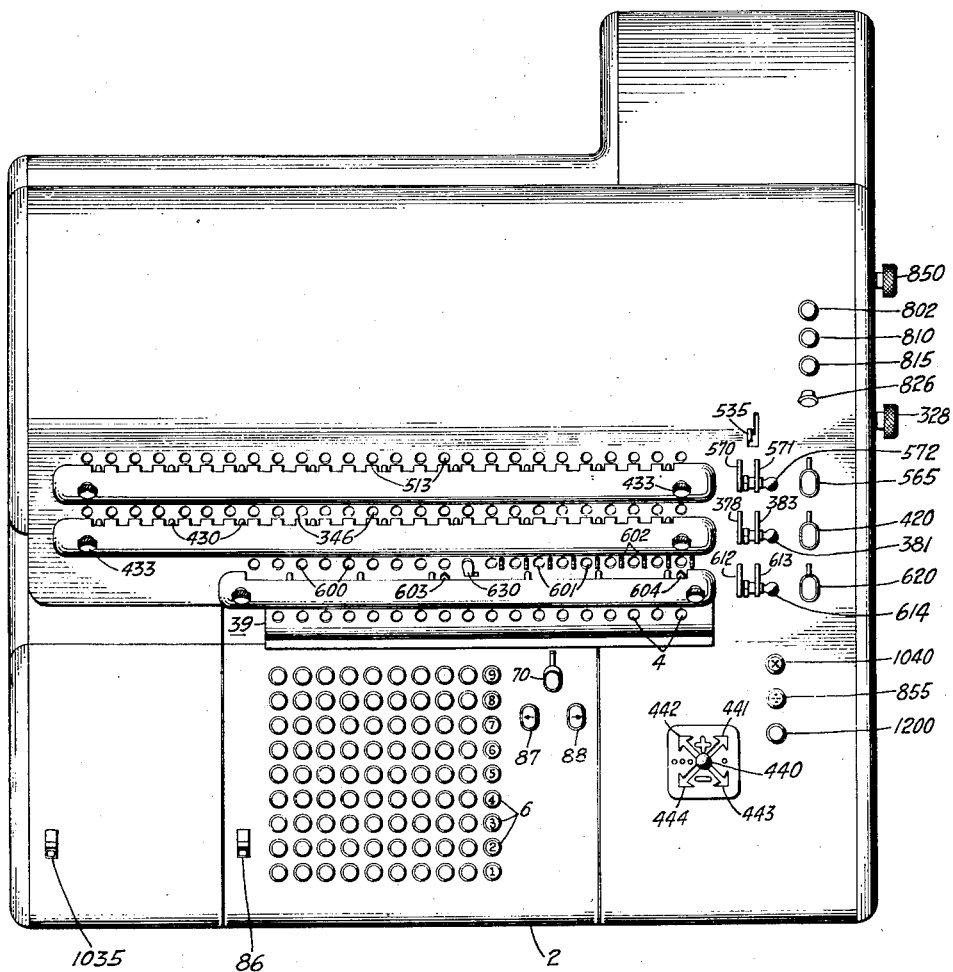

Figure 6 is a skeleton plan view of the shiftable item register carriage showing in detail the means for shifting the carriage in either direction, and the means for transmitting a drive to the drive shaft mounted in the carriage. It will be noted that the driving mechanism has been shown as a development view so that all of the gearing can be plainly seen. The item registering wheels are shown in detail as is also shown the movable slide secured to the rear edge of the carriage—the said slide being used in controlling sensing during the operation of automatic multiplication.

Figure 7 is a fragmentary plan view showing the mechanism whereby the releasing and restoring of the lower sensing slides are controlled by the actuator and the sensing clutches.

Figure 7A is a detail side elevation of the cam which controls the restoration of the lower sensing slides during rotation of the sensing clutch.

Figure 8 is a section taken along the line 8—8 of Figure 7.

Figure 8A is a detail view showing the relation of the restoring bail for the lower sensing slides and a switch controlled thereby so that the motor will be energized so long as the bail is in its releasing position.

Figure 9 is a fragmentary end elevation of certain of the mechanism shown in Figures 7 and 8.

Figure 10 is a front elevation of the accumulating mechanism with certain portions broken away to show the details thereof.

Figure 11 is a right sectional view taken along the line 11—11 in Figure 10, and shows the means for disengaging the overthrow preventer pawls during resetting operation, as well as the mounting of said pawls on their supporting shaft.

Figure 12 is a section taken along the line 12—12 in Figure 10, showing the means for disengaging the overthrow preventers during a resetting operation.

Figure 13 is a detail sectional view through an accumulating wheel and the various shafts upon which it is mounted, showing the means for resetting the said wheel to zero position.

Figure 14 is a developed plan view of an accumulating wheel showing the arrangement of the numerals inscribed thereupon.

Figure 15 is a development of a front elevation of the actuator, the drive therefrom to the accumulating wheels, and the transfer gears therefor.

Figure 16 is a fragmentary front view of the reversing gears for the accumulating mechanism, and the controls therefor.

Figure 17 is a fragmentary plan view of the accumulator mechanism, showing the decimal pointing mechanism therefor.

Figure 18 is a side elevation of the manual and automatic means for shifting the intermediate reversing gears for the three registers of the calculating machine. It also shows a special control lever for enabling the train of gears for transmitting actuation to the grand total register.

Figure 19 is a right side elevation of the resetting means for the three registers of the calculating machine, showing the drive therefor, the control keys, and the motor circuit closing means associated with each control key.

Figure 20 is a plan view of the universally mounted general operation control key, and the mechanism associated therewith. Also shown is a detail of the clutching arrangement for selectively reversing either the accumulator or the grand total register.

Figure 21 is a section taken on line 21—21 of Figure 20.

Figure 22 is a right side elevation of the sensing mechanism for the three upper registers of the calculating machine, and shows the control keys therefor whereby any one of the registers may be selected for sensing operations.

Figure 23 is a section taken on line 23—23 of

Figure 22 and shows one of the control keys for selecting a register for a sensing operation.

Figure 24 is a right side elevation of the upper sensing slides and the driving mechanism for the restoring and releasing means therefor.

Figure 25 is a fragmentary longitudinal section showing the automatic operation keys and a portion of the mechanisms controlled thereby.

Figure 25A shows detail views of various of the mechanisms shown in Figure 25.

Figure 25B is a detail front elevation of the clutching arrangement whereby the automatic reversing means may be caused to reverse the setting of the intermediate gears of the accumulator or the grand total register.

Figure 26 is another detail view of certain mechanisms shown in Figure 25.

Figure 27 is a right side elevation of certain of the control mechanism for automatic operations, including the control key which is set to enforce either an actuation or a shifting operation, after such operations have been determined by the comparing mechanism.

Figure 27A shows detail views of the latch for the control key and the actuating slide associated therewith.

Figure 28 is a rear detail view of the special control key taken along the line 28—28 in Figure 27.

Figure 29 is a plan view of the mechanism whereby a control is enforced as determined by the comparing mechanism.

Figure 30 is a detail rear view of an arm and the cams thereon for establishing a control determined by the comparing mechanism.

Figure 31 is a bottom plan of the lower part of the value comparing device in its normal position.

Figure 32 is a schematic plan view of the drive from the motor to the two clutches (the sensing and actuating clutches), and it also shows the drive for other mechanisms such as the resetting mechanism, restoring cams for the lower sensing slides, and also the driving mechanism for various mechanisms driven from either the actuator or the sensing clutches.

Figure 33 is a schematic view showing the circuit diagram for the motor of the calculating machine.

Figure 34 is a schematic view showing the circuit diagram for the motor of the adding machine.

Figure 35 is a detail view of the means for enabling those orders of the lower sensing slides which are in operative relation with respect to the shiftable registering wheels.

Figure 5:
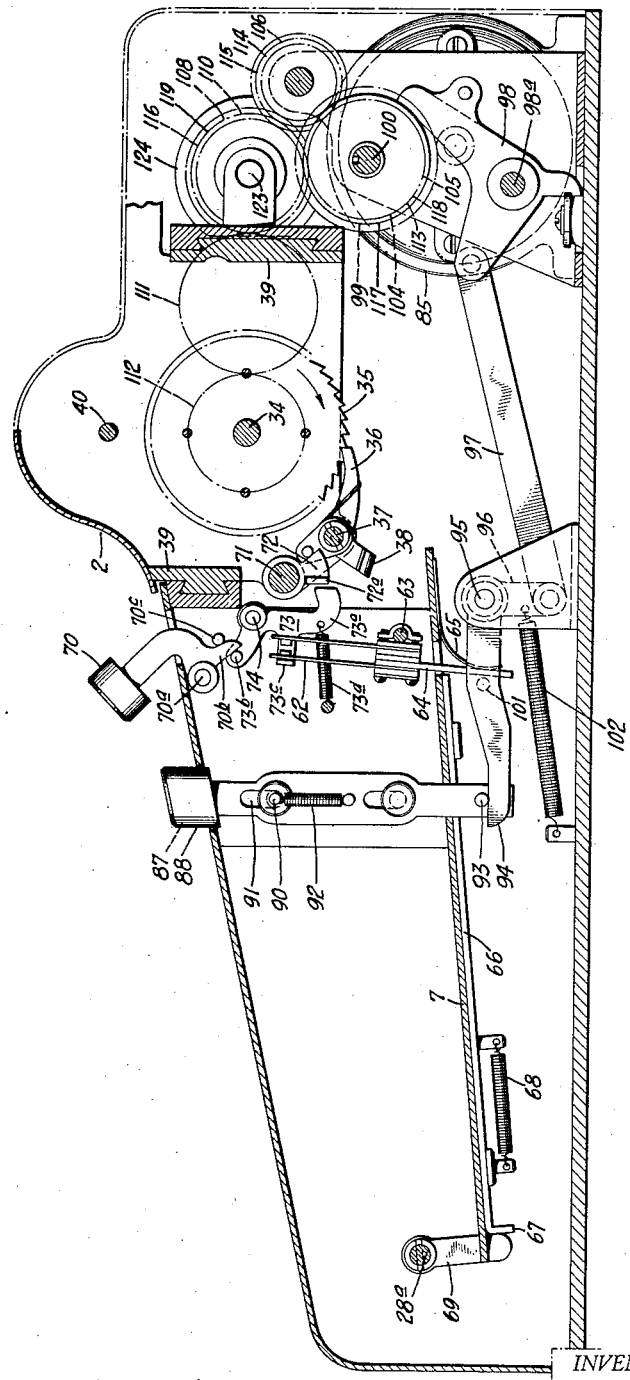
Figure 5 is a longitudinal section through the adding machine showing the resetting key, a shift key, and the mechanism controlled thereby. The view also shows the motor circuit closing means which is adapted to be operated by any of the value keys or control keys of the adding machine.

The machine as disclosed comprises an adding machine combined with a calcluating attachment, the arrangement being such that the adding machine may be used independently, or its item register may be used to control the digitation in the calculating attachment. The term "digitation" is herein used in reference to that portion of each cycle of operation of the actuating mechanism during which said mechanism operates to transfer the values set therein to the accumulating mechanism. The view in Figure 1 shows the attachment with the adding machine as the two would be operated together as a complete calculating machine, the frame of the calculating attachment being adapted to surround the adding machine on three sides, while Figure 5 shows a cross section of the adding machine without the calculating attachment.

The adding machine is of the general type shown in the patent to Vincent, No. 926,151, issued June 29, 1909. It is provided with numeral keys 6, a shiftable item register carriage 39 carrying registering wheels 4 which are adapted to be actuated by power derived from the motor 85, Figure 5, upon depression of a numeral key 6. The key 70 controls resetting mechanism for the item registering mechanism, while the keys 87 and 88 control mechanism for shifting the item register carriage selectively in either direction, depression of key 87 serving to determine a shift to the left, and the key 88 serving to determine a shift to the right. The key 86 (Figure 1) controls a switch which is placed in series in the circuit of motor 7.

Mechanism is provided in the calculating attachment whereby the values standing on the registering wheels 4 are sensed to set the selecting mechanism in the actuator during the digitation operation.

Means are provided whereby the operator can determine the duration and sign character of the registration on the accumulating wheels. This means comprises a control lever 440 (Figure 1) which when moved to the corresponding control position of the four shown in Figure 1 will determine either one positive actuation, one negative actuation, or a plurality of either positive or negative actuations.

Means are also provided to manually set the reversing gears between the actuator and the accumulator mechanism to either positive or negative position, this means being the levers 378 and 383 which are normally connected and operable together by knob 381. They may be operated separately, however, and one half of the accumulating mechanism is thereby reversed with respect to the other half. Key 420 controls power driven resetting mechanism for the accumulating wheels. Fingers 430 are decimal pointers and are adapted to be positioned by movement of either of the knobs 433 to indicate any desired position of the decimal point.

Totalizing wheels 513 comprise a grand total register which is adapted to be connected to the accumulator by movement of lever 535 to its rearward position. Thus the values transmitted to the accumulator from the actuator may be transmitted also to the grand total register in either the same direction or in an opposite direction, depending upon the setting of control knob 572. Key 565 controls power driven resetting mechanism for the grand total register. With lever 535 in its rearward position depression of key 420 will cause a transfer of the value standing on accumulating wheels 346 to the totalizing wheels 513 and conversely depression of key 565 will cause a transfer of the values standing on the totalizing wheels 513 to the accumulating wheels 346, the direction of this transfer being determined by the setting of levers 570—571.

Two sets of counting wheels 600—601 comprise two revolutions counters, each of which registers the number of actuations of the accumulating wheels in the respective orders. Whether the revolutions counter is being actuated reversely with respect to the accumulator mechanism depends upon the setting of levers 612, 613, and knob 614. The revolutions counters are provided with two actuators spaced nine orders apart so that values may be simultaneously entered into both of the revolutions counters, either in the same direction or in the opposite direction, depending upon the position of levers 612 and 613. Values may also be manually set on the right hand revolutions counter by means of knurled discs 602. Key 620 controls power driven resetting mechanism for the revolutions counter which may be utilized selectively to reset both revolutions counters simultaneously, or the right hand one only, depending upon the position of control lever 630.

Mechanism is provided whereby the values standing on any of the three registers in the calculating attachment may be sensed to be used in control of automatic operations, to be described hereinafter. Depression of key 802 will determine a sensing of the grand total register, and depression of key 810 will determine a sensing of the accumulator, while depression of key 815 will determine a sensing of the revolutions counter. Key 826 is a release key for the keys 802, 810, and 815. Knob 850 controls means whereby the sensing mechanism for all of the registers mounted in the calculating attachment may be disabled at will, while the knob 328 controls mechanism for disabling the sensing mechanism for the shiftable item register 39 of the adding machine.

Depression of key 855 enables mechanism which will automatically divide a number standing on the accumulating wheels 346 or a number standing on the totalizing wheels 513 by the number standing on the item registering wheels 4. The operation of division is entirely automatic and the mechanism will determine a plural figure quotient, the operation being stopped when the item register carriage has been shifted to its extreme right hand position.

Depression of key 1040 enables mechanism which performs a multidigit multiplication, the number standing on the item registering wheels 4 being multiplied by the number standing in the counting wheels 601 of the revolutions counter. The operation of the machine in automatic multiplication is entirely automatic and utilizes the same control mechanism used in the operation of automatic division.

Key 1200 is a stop key which upon depression will interrupt an automatic operation of the machine, regardless of the stage of the operation.

Key 1035 controls a switch which is in series in the motor circuit of the calculating machine.

THE ADDING MACHINE

Differential Mechanism

Figure 2:
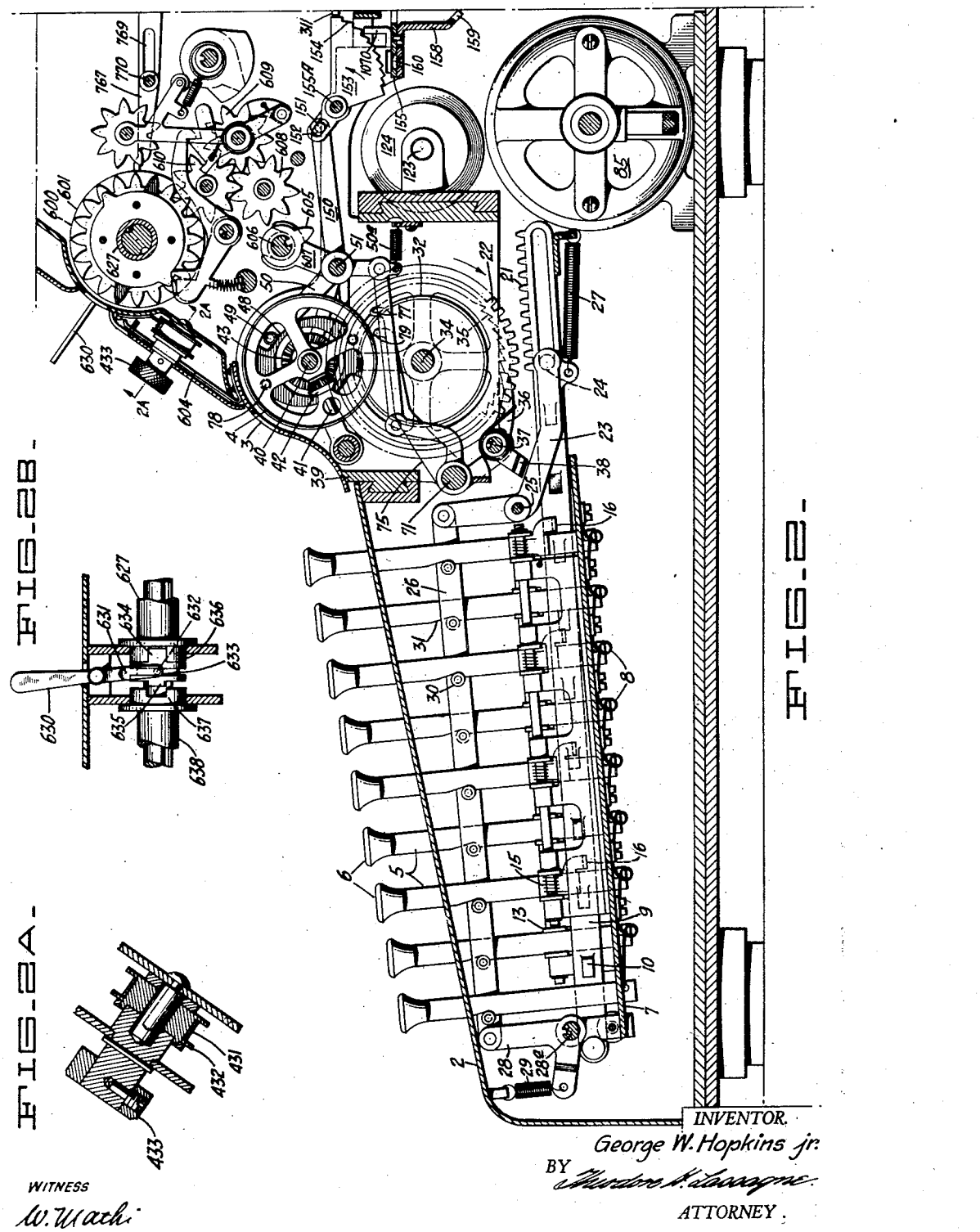
Figure 2A is a detail section of the control knob for the decimal pointers.
Figure 2B is a detail front elevation of the clutching arrangement whereby the left hand revolutions counter may be optionally zeroized upon operation of the resetting means.

*Figures 1 and 2*

The differential mechanism of the adding machine will only be described insofar as is necessary for an understanding of its operation, and reference is hereby made to the patent to Vincent, 926,151, for a complete disclosure of such mechanism.

Reference numeral 2 designates a suitable enclosing casing through sight openings 3 in the front of the elevated rear portion of which the numbers may be read singly upon a series of registering wheels 4. Through the top of forwardly extending portion of the casing, protrude key stems 5, surmounted by suitably inscribed buttons 6, being numbered as usual from 1 to 9. However, the buttons could also be inscribed with complemental numbers for use in subtraction, as is commonly known in the art. The key stems are arranged to slide vertically in the slots of the casing top, and the slots of a base plate 7 suitably supported within the casing, and such key stems are normally upheld by suitable springs 8.

The stems of a bank or row of keys are preferably offset alternately so that they stand in staggered relation to each other on opposite sides of a horizontally arranged slide bar 9, there being one of these slide bars for each row or bank of keys. Portions of each slide bar are set up first on one side and then on the other to form stop projections 10 to contact with the keys respectively. The sides of the key stems facing the slide bar are channeled to permit the free passage of said stop projections, but when any key stem is moved down by finger pressure on its button, a portion of the stem is carried in front of the nearest stop projection. The stop projections are normally at varying distances from the key stems with which they respectively cooperate, so as to provide for the necessary differential movement of the slide bar. The key stems are notched as shown at 12 in sides opposite those in which the channels 11 are formed, (Figure 4 of Vincent), these notches cooperating with the detent plates 13, hinged upon standards 14 (Figures 3 and 4 of Vincent) which rise from the bed plate 7 and are pressed by springs 15 into engagement with the key stem. Thus, when any key is depressed, it is caught and held down by the engagement of the associated detent plate 13 with the notch 12.

As will be hereinafter explained, the slide bar is driven forward upon depression of a key, and the corresponding movement is transmitted to the associated numeral wheel 4. As the slide bar, when thus driven forward, contacts with the depressed key stem, the latter is released by the displacement of the detent plate 13. To this end the latter is formed with a rearwardly and downwardly extending finger 16 (Figure 2), against which the stop projection 10 acts as it approaches the depressed key stem.

At the rear each slide bar is formed as a rectangular frame, the upper side of which constitutes a rack 21 for cooperation with a gear wheel 22 for transmitting movement to the registering wheel 4. Normally the rack is disengaged from the gear wheel as shown in Figure 2, but the depression of any key in the associated bank raises the rack into mesh with the wheel. To this end a pair of bellcranks 23 embrace the slide bar, having between them a roller 24 occupying the longitudinal slot provided by the open center of the rectangular frame-like portion of the bar. These bellcranks are pivoted upon a cross rod 25 and their upstanding portions are jointed to a horizontally extending link 26 which at its forward end is jointed to the upstanding arm of a bellcrank 28. The forwardly extending arm of the latter is normally upheld by a spring 29, which thus tends to lower the rear end of the slide bar 9, whose weight of course also tends to keep it in lowered position. The link 26 extends adjacent the key stems and carries a stud 30 for cooperation with each stem. The stems are formed with cam edges 31 so that upon depression of any key the link 26 will be moved forward by reason of the action of such cam edge upon the stud 30. Such forward movement of said link necessarily swings the upright arms of the bellcranks 23 and 28 forwardly and the consequent upward swing of the rearwardly extending arms of the former raises the rack 21 into mesh with the gear wheel 22.

Each gear wheel 22 carries a drum 32 containing a coiled spring 33 (Figures 5 and 7 of Vincent)

secured to a shaft 34 journaled in the carriage frame, which, when the motor is energized, constantly rotates in a direction to wind up the spring. The springs 33 are in frictional contact at their outer end with the interior surfaces of their respective drums 32, and with the wheels 22 unrestrained, the motion of shaft 34 will be transmitted to said wheel through the medium of said springs. However, each gear wheel 22 has formed with, or secured to it, a ratchet wheel 35, and the ratchet wheels are normally engaged by pawls 36 pivoted upon a cross rod 37 having downwardly extending tails 38 which cooperate with the bellcranks 23, respectively. So long as a rack bar is in lowered position out of mesh with the associated gear wheel 22, the pawl remains in engagement with the ratchet wheel and prevents turning of the gear wheel, the spring 33 slipping on the interior surface of the drum. However, it will be recalled that upon depression of a key, the bellcranks 23 are vibrated. Thus the upward movement of the rearwardly extending arms of the bellcranks 23 by elevating the forwardly extending arm 38 of the pawl will disengage the rearwardly extending portion thereof from the ratchet wheel. When this takes place the rack 21 will have been brought into mesh with gear wheel 22 and consequently the movement of the latter is transmitted to the rack and limited by the abutment of the latter against the depressed key.

It will also be remembered that as the stop projection on the rack bar approaches the depressed key stem, the detent of the latter is displaced and the key rises. The rise of the key permits the spring 29 to restore the bellcrank 23 to normal position, and throw the pawl 36 into engagement with the ratchet wheel. Since no movement of the gear wheel will take place except when in mesh with the rack, the latter is normally held in its rearward position by a spring 27 and upon its disengagement from gear wheel after measuring the movement thereof, said spring draws the rack bar back to its normal position.

THE SHIFTABLE REGISTERING MECHANISM

*Figures 1–6, 25, and 34*

One of the principal differences in the adding machine as disclosed in the instant application, and that disclosed in the Vincent patent referred to above, is that in the structure shown herein the registering mechanism and the actuating mechanism therefor have been mounted in a shiftable carriage. As shown in Figures 2 and 5, the assembly mounted on shafts 34 and 40 are all carried by a shiftable carriage which also carries other mechanism to be described later. Suitable mechanism for shifting the carriage is shown in Figures 5 and 6. This mechanism is similar to that shown in Patent No. 2,009,010 issued July 23, 1935, on application No. 179,437, filed March 30, 1927, by Carl M. F. Friden, and reference is hereby made to that application for a complete disclosure of such mechanisms as are not fully described herein.

As shown in Figure 6, the rear portion of the carriage frame is provided with a series of slots 125, the space between adjacent slots corresponding to the distance between adjacent ordinal numeral wheels. When the carriage is at rest in registering position these slots are in operative alignment with a worm 124 which is adapted to be rotated in either direction to shift the carriage to either the right or the left. As shown in Figure 1, two keys are provided, depression of either one of which serves to shift the carriage. Depression of key 87 serves to shift the carriage to the left, and depression of key 88 serves to shift the carriage to the right as indicated by the arrows shown on the keys. As the two keys 87 and 88 control mechanisms which are substantially identical in structure, only one of such mechanisms will be described in full, the other being described only insofar as it differs therefrom.

As shown in Figure 5, the key 88 is mounted for vertical sliding movement by pin and slot connections 90—91, being normally held in upright position by spring 92. On the lower end of the key stem is a pin 93 which overlies the forward end of an arm 94, and serves on depression of the key to rock the arm in a counterclockwise direction. The arm 94 is secured to the right hand end of a shaft 95 which is provided at its left hand end with a depending arm 96, to which a link 97 is pivotally secured. A spring 102 tends to hold arm 96, shaft 95, and arm 94 rocked in a clockwise direction, their movement in that direction being limited by engagement of the forward end of arm 94 with pin 93. The link 97 is connected to a clutch release dog 98, and the arrangement is such that upon depression of the key 87 the link 97 is rocked toward the rear of the machine and moves clutch release dog 98 out of engagement with the clutch housing, thereby enabling the clutch, as fully described in the application of Friden, referred to above.

The means whereby depression of a carriage shift key will close a circuit through the motor of the adding machine will be described hereinafter.

As shown in Figure 6, the housing of the clutch 99 is secured to a collar loosely mounted on a shaft 100, which is driven from the motor through gears 103 and 104. Also secured to this collar is a gear 113 which meshes with an idler gear 114 on a collar on shaft 107. Mounted on the other end of the collar is the gear 115 which meshes with a gear 116 loosely mounted on a shaft 123. The housing of clutch 117 which is controlled by key 87 is secured to a collar loosely mounted on shaft 100; also secured to this collar is a gear 118 which meshes with, and is adapted to drive a gear 119 loosely mounted on the shaft 123. Two discs 120 and 121, splined on the shaft 123 between the two gears 119 and 116 (Figure 6) are provided with oppositely acting ratchet clutch connections with the respective gears, so that upon engagement of clutch 99, the clockwise rotation of gear 116, viewed from the right in Figure 6, will be transmitted to shaft 123, and worm 124, through the disc 121; and correspondingly, upon engagement of clutch 117, the ensuing counter-clockwise rotation of gear 119 will be transmitted to shaft 123 and worm 124 through the disc 120. Reference is hereby made to the above-mentioned application No. 179,437 now patent No. 2,009,010 issued July 23, 1935 for a more detailed description of the ratchet clutch connections.

From the foregoing description it is apparent that when the clutch 99 is engaged the worm 124 will be rotated in a clockwise direction, viewed from the right in Figure 6, and in so rotating will be operative to shift the item register carriage 39 to the right. Correspondingly, when the clutch 117 is engaged a counter-clockwise rotation of worm 124 will result and the worm will operate to shift the item register carriage to the left. The worm 124 is so formed that during each rotation thereof it will move the carriage a distance corresponding to one ordinal displacement of the registering wheels 4 with respect to the differential controlling mechanism therefor.

Transfer Mechanism

The registering wheels 4 are loosely mounted on the supporting shaft 40 which extends from side to side of the shiftable carriage frame. These registering wheels are connected with each other and with the gear 22 by differential gearing. Thus each registering wheel has a radial shaft 41 carrying a beveled pinion 42 and the latter meshes with a beveled gear 43 journaled on the shaft 40 and carrying a spur pinion 44 (see Figure 6) in mesh with the associated gear wheels 22. The beveled pinion 42 of the units registering wheel meshes with a fixed beveled gear 45 (Figure 5 of Vincent) on one of the uprights of the supporting carriage frame work. Each of the beveled pinions 42 of the other registering wheels meshes with a beveled gear 46 loosely journaled on the shaft 40 and carrying a ratchet wheel 47, as shown in Figure 5 of the patent to Vincent. It will be obvious that with the beveled gears 46 held stationary, transmission of movement from the other gear wheels 22 to their associated registering wheels will be accomplished exactly the same as transmission of movement from the right hand gear wheel 22 to the units registering wheel. However, when the units wheel has registered up to its capacity, it should of course transfer one to the next higher wheel, and that wheel should transfer to the next, and so on. This is the purpose of the differential gearing above described, it being apparent that by advancing any one of the beveled gears 46 the associated registering wheel will be moved farther than if such beveled gear remained stationary. Such advance of said beveled gear can take place simultaneously with movement of the registering wheel by its gear wheel 22.

Each registering wheel, as shown, is inscribed with two series of numerals from 1 to 9 with intervening zeros (Figure 14). Consequently upon completion of a half rotation of a registering wheel, it should transfer one to the next higher wheel. The gearing above described is so proportioned and the ratchet wheels 47 so constructed, that the turning of any one of the latter to the extent of a single tooth will advance the associated registering wheel one step. Each registering wheel except the one farthest to the left carries on its side next the adjacent wheel of higher order, a cam disc 48 having two cam rises coacting with a roller 49 on an arm 50, pivotally supported by cross shafts or rods 51, and held in engagement with the cam disc by a spring 50a attached to a depending arm of the bellcrank 50—150 (Figures 2 and 6). This arm 50 carries at its forward end a pivoted pawl 52, pressed by spring 53 into engagement with the ratchet wheel 47 of the next registering wheel to the left, as shown in Figures 6 and 8 of the patent to Vincent. It will be seen that as the registering wheel of lower order turns, one of the cam rises of the disc 48 will elevate the arm 50 against the stress of its spring, and when the highest point of the cam rise passes the roller 49, the spring 50a will return said arm to its lower position. It should be noted that the relative rotated position of cam disc 48 and the position of arm 50 at all times represents the value then registered on the registering wheels 4. The elevation of arm 50 by the cam rise is sufficient to carry the pawl 52 backwardly over one of the ratchet teeth, and permit it to drop behind such tooth so that when the arm 50 lowers, the ratchet wheel will be advanced and a transfer will be effected as heretofore described. For further description of the details of mechanism for preventing overthrow in making a transfer, and for positively controlling the positioning of the gears 46, reference is hereby made to the patent to Vincent.

Resetting Mechanism

Means are provided whereby the depression of a key serves to control mechanism adapted to reset the registering mechanism to zero. The key 70 (Figure 5) is pivotally mounted at 70a and has a depending ear 70b which is normally held between a pin 70c mounted on the frame of the machine and a pin 73b carried on the upwardly extending arm of lever 73, lever 73 being spring pressed in a clockwise direction by spring 73d. The lower end 73a of lever 73 lies back of one of a series of depending lugs 72 securely mounted on shaft 71 in the frame of the carriage, one of these lugs 72 being provided for each order of the registering mechanism. Each lug 72 lies directly in front of a pin mounted on an upwardly extending tail of the pawl 36 in the same order (see Figure 5). Depression of key 70 rocks lever 73 and lug 72 in a counter-clockwise direction, rocking pawl 36 in a clockwise direction and releasing ratchet wheel 35 for rotation.

The right hand lug 72 is provided with an arm 72a which extends to the right thereof, the length of the arm 72a being such that it will always be in operative relation with the lower end 73a of lever 73, even though the item register carriage has been shifted to its extreme left hand position. Thus depression of the clear key 70 will cause the shaft 71 to be rocked and the pawls 36 to be disengaged in any operative position of the item register carriage.

Secured to the shaft 71 are a series of arms 75 (Figure 2). These arms have upwardly extending fingers 77 which are adapted to engage pins 78 mounted on the registering wheels to stop them at a definite position. For all orders higher than the units, this position is with the registering wheels 4 displaying the digit 9, but as the right hand arm 75 is shorter than the arms of higher order, its finger 79 is adapted to stop the units registering wheel at the zero position. The registering wheels having been thus arrested, a transfer will have been determined from the units wheel to the tens wheel and the resulting transitional carry will leave the registering wheels in their zero position. For a more complete description of this mechanism, reference is hereby made to the Vincent patent referred to above.

Power Drive

Means are provided whereby the motor 85 is energized only when in use, thus avoiding the objectionable features of a constantly running motor. As shown in Figure 34, there are two switches in the motor circuit; one of these is shown in Figure 1 at 86, and is the usual manual control switch. Switch 62, as shown in Figure 5, serves to energize the motor upon depression of any operation key. The switch 62, pivotally mounted on the stud shaft 63, is of the usual leaf spring contact type, and is provided with two upstanding spring arms which normally stand apart, as shown in Figure 5. An arm 64 extends downwardly through a slot in the intermediate plate 7, and adjacent thereto is a slide 66 which is mounted by a pin and slot connection on the lower side of plate 7. The forward end of the slide 66 has a downwardly extending nose 67, being spring pressed in a forward direction by spring 68. Adjacent the nose 67 is a downwardly extending arm 69 securely mounted on shaft 28a.

As will be remembered from a description of the operation of the keyboard mechanism, upwardly extending arms 28 are rocked forwardly upon the depression of a key in any order. As clearly shown in Figure 2, the arms 28 are keyed on shaft 28a, the keyway being wider than the key so that rocking of any arm 28 to the left will turn the shaft 28a without disturbing the position of the remaining arms 28, so that upon depression of a key in any order the shaft 28a is rocked in a counter-clockwise direction, and arm 69 mounted thereon, moves slide 66 to the rear of the machine. The slide 66 acting against the depending arm 64 will rock the switch assembly about shaft 63, the forward contact member being held against movement in that direction by an ear 73c of lever 73, the rearward contact member will be moved thereagainst and the circuit will be closed, energizing the motor. When the key is released and arm 69 rocks to normal position, slide 66 will be returned by spring 68, and leaf spring 65 will restore arm 64 to its normal position against the forward edge of the slot in plate 7, thus breaking the contact.

Means are provided whereby the motor will be energized upon depression of a shift key. A pin 101 mounted on arm 94 lies immediately in front of depending arm 64, so that, upon depression of key 88 and the resultant rocking of arm 94 in a counter-clockwise direction, pin 101 will move depending arm 64 to the right, as shown in Figure 5, and close the contact. Shift key 87 closes the circuit to the motor in the same manner.

Means are provided whereby the depression of the clear key 70 will close the circuit through the motor. As has been previously described, depression of this key rocks lever 73 about pivot point 74 in a counter-clockwise direction. The lever 73 is provided with a forwardly extending arm which has an ear 73c lying in front of the forward spring contact member, so that upon counter-clockwise rotation of the lever 73, the contacts will be closed, and when it is restored to normal position, the circuit will be broken.

Means are provided whereby the motor will drive the shaft 34 in any shifted position of the register carriage. As previously described, shaft 100 (Figure 6) is rotated from the motor through gears 103 and 104. Mounted on the shaft 100 is a gear 105 which through idler gear 106 drives gear 108 secured to splined shaft 109. A gear 110 is mounted on the splined shaft 109 for sliding movement thereon and for rotating movement therewith, the said gear being mounted in the carriage frame so as to move laterally therewith. Gear 110, through idler gear 111, drive gears 112 secured to shaft 34, Figure 5.

THE CALCULATING MACHINE

Driving Mechanism

*Figures 3, 7, 8, 9, 32, and 33*

Means are provided whereby the motor is energized upon the depression of any operation control key. As shown in Figure 33, there are a plurality of switches in parallel relation in the motor circuit, closing of any switch serving to energize the motor. The conventional manual control switch 1035 is also shown.

Figure 3:
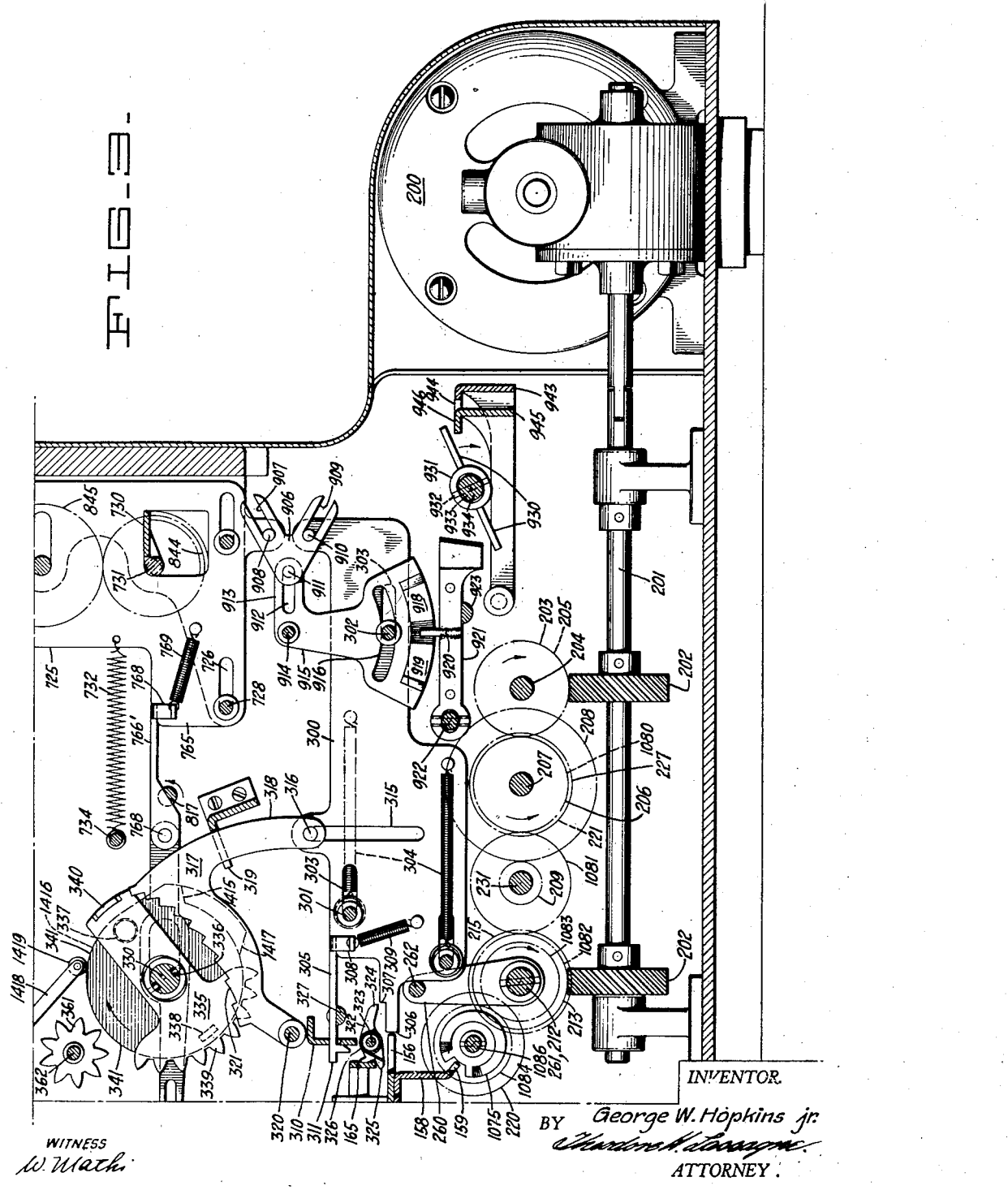

As shown in Figures 3 and 32, the motor 200 drives a shaft 201 and two worm wheels 202 mounted thereon, one of which drives a gear 203 mounted on a shaft 204. A gear 205, also mounted on the shaft 204 drives a gear 206 mounted on a shaft 207 which is the drive shaft for various mechanisms including a sprocket wheel 227 adapted to drive the resetting mechanism for the three registers of the calculating machine, a gear 208 which drives the restoring cams for the lower sensing slides through a gear 209, Figure 32, and the sensing clutch 221.

Mounted on shaft 201 is a second worm wheel 202 which drives a gear 213 mounted on a shaft 212, which is the driving shaft for the actuator clutch 215.

Differential Mechanism

*Figures 2, 3, 7, 8, 9, and 15*

Means are provided to form a representation of the values standing in the registering wheels to be used in controlling the selecting mechanism of the calculating machine. As has been previously described, the arm 50 (Figure 2) always has a position representative of the value standing on the corresponding registering wheel 4, due to the engagement of the roller 49 with the double cam 48. The arm 50 has a rearward extension 150 bearing a pin 151 which engages in the slotted forward extension 152 of a stepped sector 153 pivoted on a shaft 155A which is mounted in a rearward extension of the registering wheel carriage 39.

The sector 153 has ten steps 154 corresponding to the values 0 to 9, inclusive. As shown in Figures 2 and 3 the step corresponding to the value 0 is opposite nose 311 of feeler 305, to be later described. Any change in the values standing on the registering wheels 4 will cause a rocking of lever 50 and arm 150 due to the cam 48, and will position the sector 153 in accordance with the new value standing on the registering wheels 4 so that the step 154 which is representative thereof will be positioned on a horizontal line with the shaft 155A and nose 311.

Mounted on the base plate of the rearward extension of the registering wheel carriage 39 (Figures 2 and 6) is a plate 155 which is connected to the base plate by pin and slot connections 160—161. The rearward edge of the plate has a series of lugs 156, the notches intermediate the lugs being disposed opposite the corresponding sensing mechanism for that order, and also with the sectors 153 for that order. Rigidly connected with plate 155 is a downwardly extending plate 158 having downwardly extending lugs 159, the purpose of which will be later described.

Means are provided to sense the values as standing on the registering wheels 4 and to thereby set the selecting mechanism to a corresponding value. This means comprises a series of sensing slides, one of which is shown in Figure 3. The slides 300 are mounted on transverse shafts 301, 302 which engage in slots 303 provided in the slides 300, thus allowing a limited sliding movement thereof. Springs 304 attached to shafts 301 and to pins on the sensing slide 300 tend to move the slide toward the front of the machine. The slides 300, however, are retained in their rearward position by transversely extending rod 262 mounted on two upright arms 260.

Engaging in a notch in the forward and upper corner of each sensing slide 300 is a feeler 305 having a depending lug 308 at its rearward end to which is attached a spring 309 which normally holds the feeler in its horizontal position in engagement with the notch in the sensing slide. The feelers 305 are held against lateral movement by a comb 310. The forward nose 311 of the feelers 305 is adapted to engage the step 154 of the sector 153 which is positioned on a horizontal line therewith as shown in Figure 2. It will be evident from the foregoing that the movement of slide 300 to the left as limited by the engagement of nose 311 of feeler 305 with the cooperating step 154 of sector 153 will be representative of the value standing on the corresponding registering wheel 4.

Means are provided to utilize this movement of the sensing slide to control the selector mechanism of the actuator. As shown in Figure 3, each slide 300 is provided with a vertical slot 315, in which engages a pin 316 on a depending arm 318 of an arcuate stepped sector 317 pivoted on cross rod 320. Sectors 317 are held against lateral movement by a comb 319 in which the depending arms 318 engage. Due to the engagement of pin 316 in slot 315, any forward movement of slide 300 will result in a corresponding pivotal movement of the sector 317 in a clockwise direction.

Each sector 317 is provided on its upper edge with a series of steps 321, and as will be seen in Figure 3, each step of movement of slide 300 will bring one of the successive steps 321 into the peripheral line of rotation of the actuator segment 335. The actuator segment 335 is mounted on the actuator shaft 330 by diametrically opposed keys 336 engaging in keyways in the actuator shaft. Thus the actuator segment 335 will rotate with the actuator shaft, but will be capable of a lateral oscillation about an axis through the keys 336.

The segments 335 are normally held in a plane parallel to the accumulating wheels 346 and the sensing slide 300 by a compression spring 337 (Figure 15) which engages between the segment and a cam disc 341 mounted adjacent thereto on the shaft 330. The compression spring 337 acts to hold the opposite end of segment 335 in engagement with a lug 338 mounted on the cam disc 341. At its arcuate end the segment 335 is provided with nine teeth 339 adapted to engage the intermediate gear 361 when in normal position, to transmit movement to the accumulating wheels. At its other end segment 335 is provided with a lug 340 which is placed on the opposite side of the segment from the compression spring 337, and is adapted to engage the arcuate sector 317 on rotation of the actuator shaft. When lug 340 engages one of these steps 321 of the arcuate sector 317, the teeth 339 will be rocked to the right out of the path of intermediate gear 361, as shown in dotted lines in Figure 15.

In the position shown in Figure 3, the teeth 339 would be rocked out of the plane of intermediate wheel 361 before any of the teeth had engaged therewith. However, if the corresponding slide 300 had moved forward to set another of the steps 321 in the peripheral line of rotation of lug 340, a number of teeth 339 corresponding to the step 321 which is so positioned will engage the intermediate wheel 361 and transmit the value to the accumulating wheel 346, as will be later described. It will be apparent from the foregoing that the value transmitted to the intermediate gear 361 will depend upon the number of teeth 339 engaging the gear before the segment 335 is cammed to the left by engagement of lug 340 with one of the steps 321. Only nine steps 321 have been provided, these corresponding to the values from 0 to 8. There is no necessity for providing a step corresponding to the value 9 as the sensing slide 300, in moving a distance corresponding to that value, will rock the arcuate sector 317 to the right entirely out of the path of the lug 340. Consequently all of the teeth 339 will engage and actuate the intermediate gear 361.

Means are provided whereby the sensing slide for the registering wheels will be released to sense the values standing thereon by initial rotation of either the actuator clutch or the sensing clutch (Figures 3, 7, 8, and 9). The sensing slides 300 are held in their inoperative position by a rod 262 (Figure 3) extending transversely through the machine which is supported by two arms 260 mounted on a shaft 261. As shown in Figure 8, the right hand arm 260 is provided with a pin 259. When restoring rod 262 is in its rearward position, the pin 259 is engaged by a notch 258 in the forward end of a pawl 256 which is pivoted to a lever 253 at 255. The pawl 256 is held in engagement with a laterally extending lug 254 of lever 253 by a spring 257. At the rearward end of lever 253, a slot is provided which is engaged by a pin 252 on a link 250 which is mounted for vertical sliding movement on a shaft 231 by a slot connection 251. The lower end of link 250 is secured to a lateral extension 244 which is pivoted to a shaft 242 mounted in brackets 243. When the extension 244 is rocked downwardly, lever 253 will be rocked upon shaft 255 and lift the latching pawl 256 from engagement with the pin 259, thus releasing the arm 260 and the rod 262, allowing the slides 300 to move forwardly under the influence of springs 304 (Figure 3). The movement of arm 260 upon release thereof is limited by the engagement of its upper arm with an ear 263 (Figures 7 and 8) on the intermediate frame.

Means are provided to rock the extension 244 downwardly upon the initial rotation of either the sensing clutch or the actuator clutch. As shown in Figures 7 and 32, when the actuator clutch 215 is engaged the clutch housing will rotate, driving shaft 224 and a gear 216 mounted thereon. The gear 216 engages a gear 235 loosely mounted on shaft 231 (Figure 7). The ratio of these two gears is such that the gear 235 will receive an integral number of rotations for one rotation of the gear 216. Secured to the gear 235 is a disc 236 (Figure 7) which has a lost motion connection with a disc 237 also loosely mounted on the shaft 231, so that when the disc 236 is rotated, disc 237 will lag behind a number of degrees determined by the slot formed therein as shown in Figure 8. Secured to disc 237 is a disc 238 having a flat portion which is engaged by a centralizer lever 240, such as is commonly known in the art.

Each of the discs 236, 237, and 238 is provided with a peripheral notch (Figure 8) which when the discs are positioned in full cycle position are aligned on the under side of the respective discs. These notches are adapted to be engaged by the wedge end of a transversely extending member 245 mounted on the lateral extension 244 as shown in Figure 8. Upon rotation of the actuator clutch gear 216 drives gear 235 which drives the discs 236, 237, and 238. Upon rotation of these discs the wedge end 245 is forced out of the peripheral notches, and will rock the lateral extension 244 downwardly. As previously described, this will cause the pawl 256 to be lifted to release the shaft 262 and the sensing slide 300. The lost motion connection between discs 236 and 237 is provided so that the notches in said discs will not become aligned during successive rotations and undesirable oscillation of extension 244 is thus avoided. Such a connection is described in the patent to Friden 1,634,990 dated July 5, 1927, and reference is hereby made to said patent for a more complete description of such a mechanism.

When the sensing clutch 221 is engaged, the clutch housing drives shaft 226 and a gear 223 mounted thereon (Figures 7 and 32). Gear 223 drives a gear 230 loosely mounted on shaft 231. Secured to gear 230 is a disc 232 having a lost motion connection with a disc 233 to which is securely fastened a disc 234 which serves as a centralizing means for the mechanism, having a flat portion which is engaged by a centralizing lever 239. The discs 232, 233, and 234 are identical in construction with discs 236, 237, and 238, having the same functions. The wedge shaped member 245 extends beneath the six discs, three of which are driven by the actuator clutch, and three of which are driven by the sensing clutch. From the foregoing it will be apparent that upon rotation of either the actuating clutch or the sensing clutch the sensing slides 300 will be released through the mechanism described above.

Means are provided whereby the sensing slides for the registering wheels will be restored by power derived from the motor at the conclusion of an operation of the machine. The restoring means is normally disabled during rotation of the actuator clutch or the sensing clutch (Figures 7, 8, 9, and 32). As shown in Figure 8, the right hand lever 260 has a downwardly extending arm in which a pin 264 is mounted so as to extend on both sides thereof. When arm 260 is rocked to release the sensing slide 300, as shown in the dotted line position in Figure 8, pin 264 lies in the path of a cam 265 which is integral with one flange of a collar 268 splined on shaft 231 for sliding movement thereon, as shown in Figure 7. The cam 265 is normally held in operative position by a spring 266 engaging between a disc 267, secured to the end of a shaft 267a which is integral with the collar (Figure 9), and the side wall of an intermediate frame. As shown in Figure 32 the shaft 231 is driven by the engagement of a gear 209 secured thereto with a gear 208 mounted on shaft 207. The ratio between gears 208 and 209 is such that shaft 231 and cam 265 will receive an integral number of rotations for each rotation of shaft 207.

As shown in Figure 9, the left flange of the collar 268, which flange is integral with cam 265, is engaged by the nose 270 of a pawl pivoted at 269 to a lateral extension of bracket 243. The lower nose 272 of the pawl underlies the lateral extension 244 having engagement with a notch 273 on the under side thereof, as shown in Figures 8 and 9. It will be remembered that on rotation of either the actuator clutch or the sensing clutch, the extension 244 is rocked downwardly. This rocks the tail 272 of the pawl downwardly and the upward extension 270 thereof moves the cam 265 laterally on the shaft 231 to inoperative position; that is, the cam is moved out of alignment with pin 264.

Means are provided for rotating the shaft 231 by power derived from the motor after both the actuator clutch and the sensing clutch have been centralized in neutral position. It will be remembered that when both clutches have been centralized in full cycle position, the peripheral notches in the discs 232, 233, 234, 236, 237, and 238 will be aligned, and the wedge 245 will enter the notch, releasing the tail 272 of pawl 268 and allowing spring 266 to move cam 265 to operative position. Consequently, any rotation of shaft 231 after the actuator clutch and the sensing clutch have returned to full cycle position, will serve to rock members 260 and restore them to latching engagement with pawl 256.

Means are provided whereby only those sensing slides that are in operative relation with the registering wheels mounted in the shiftable carriage will be permitted to operate, this control being exerted by the shiftable carriage, and mechanism mounted thereon (Figures 2, 3, 6 and 35). Pivotally mounted on a shaft 323 extending transversely through the machine, is a series of pawls 322, there being one of these pawls for each sensing slide 300. Each pawl 322 is provided with a rearwardly extending nose 324 which is adapted to engage in a notch 307 formed in the forward edge of the sensing slide 300, and to hold the same against forward movement. The pawl 322 is normally urged to latching position by a spring 326. The pawl is provided with a rearwardly extending tail 325 which is adapted to engage a bar 165 mounted on the frame of the shiftable carriage.

The bar 165 is provided at each end with a cam edge 166, Figure 35, which, upon movement of the carriage in either direction will engage the tails 325 of pawls 322 and rock them to inoperative position. The bar 165 corresponds in length with the shiftable carriage and will serve to hold in inoperative position, those pawls which are associated with the sensing slides which are in position to sense the values standing on the registering wheels. Thus it will be seen that all the sensing slides 300 that are in operative relation with the registering wheels mounted in the shifting carriage, will be released from the latching pawls 322, while all those which are not in operative relation with the registering wheels in the shiftable carriage will be latched in inoperative position by the pawls 322.

Means are provided to disable simultaneously all the feelers mounted on slides 300. This means comprises a shaft 327 which extends transversely through the machine and is provided with notches in which the feelers 305 normally lie, as shown in Figure 3. The shaft 327 extends through the right hand side wall and is provided with a knob 328 as shown in Figure 1. By means of this knob 328 the shaft may be given a turn of approximately 90° which will lift the rearward end of feelers 305 from engagement with the sensing slides 300. This will prevent operation of the feelers even though the slides 300 should be released.

THE ACCUMULATOR

DIAL CONSTRUCTION

*Figures 1, 4, 10, 14, and 15*

Figure 4:
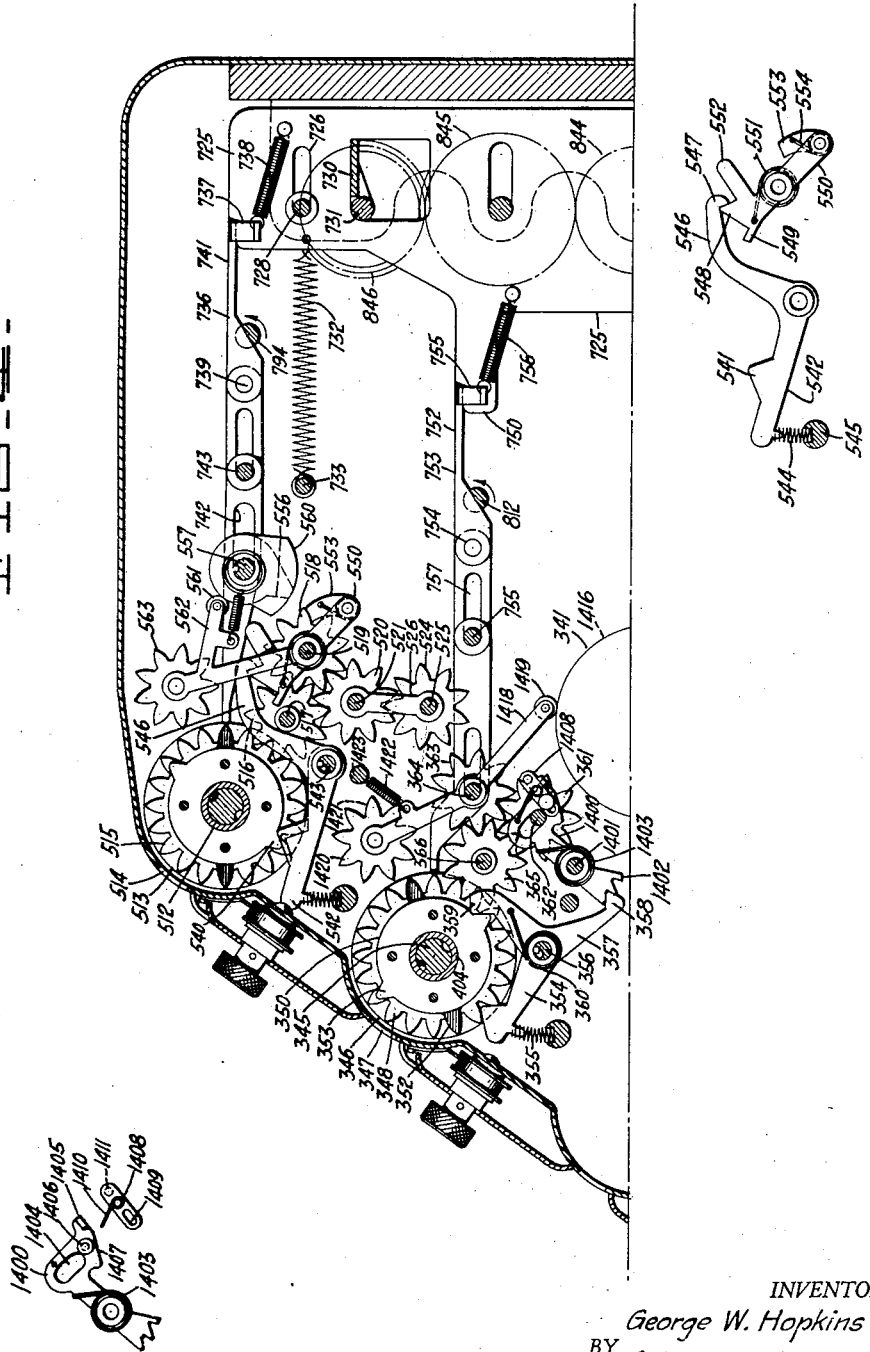
Figure 4A is a detail view of the transfer mechanism for the accumulating mechanism.
Figure 4B is a detail view of the transfer mechanism for the grand total register.

The accumulating wheels 346 are loosely mounted on a shaft 404 extending transversely through the machine. As shown in Figures 1 and 4, they are visible through a sight opening 347 in the casing of the calculating machine. The accumulating wheels are of the type having two series of numbers running from zero to nine. As the construction of the accumulating wheel dial and its associated mechanism is the same for each of the twenty-seven orders shown in Figure 1, only one of these will be described in detail.

Integral with the accumulating wheel 346 and on the right hand side thereof, is a gear wheel 348 having twenty teeth, this gear being adapted to receive varying increments of movement from the shiftable intermediate gear 365, either positively or negatively, depending upon the position of said shiftable gear, the control of which is to be later described. Immediately to the left of the numeral wheel 346 (Figure 10) is secured a double stepped plate sector 349, more clearly shown in Figure 22, the purpose of which will be later described. Secured to the double stepped plate sector 349 is a cam disc 350 having two diametrically opposed cam projections 353, the purpose of which will be later described. Secured to the cam disc 350 is a mutilated gear 351 (Figures 4 and 10) having two diametrically opposed teeth 352, the function of which will be later described. As shown in Figure 10, members 346, 348, 350, 351, and 349 are securely fastened together by pins 354, and are mounted as a unit on shaft 404. Loosely mounted on shaft 356 is a series of spring pressed pawls 354, the noses of which engage the teeth of gears 348 under pressure of springs 355 and serves to prevent overthrow of the accumulating wheels.

TRANSFER MECHANISM

Figures 3, 4, 4A, 10, and 15

The transfer mechanism for the accumulating wheels comprises means adapted to cause a combined entrained and independent actuator transfer for each group of numeral wheels, the independent actuator acting simultaneously within each group while for the various groups independent actuators operate successively. The portion of the transfer mechanism having an independent actuator provides for transfers which occur due to movement of accumulating wheels during digitation, while the entrained transfer mechanism takes care of any transfers which may occur due to accumulating wheels standing at 9 at the end of positive actuation and thereafter receiving a transfer increment in a positive direction, or due to accumulating wheels standing at 0 during negative actuation and receiving a negative carry.

The two cam projections 353 (Figures 4 and 10) on cam disc 350 are diametrically opposed to each other in position, and are so placed with reference to the accumulating wheel that when said wheel passes from 0 to 9, or 9 to 0, the projection 353 which is in the lower position will contact with the nose 359 of lever 357 loosely mounted on shaft 356, the said lever being spring pressed into engagement with the cam disc 350 by spring 360. Two such cam projections 353 are provided, since there are twenty numerals on an accumulating wheel, and consequently a carry must occur for each half rotation thereof.

The downwardly extending tail of lever 357 is provided with a nose 358 which engages a notch in the lower end 1402 of transfer lever 1400 which is pivotally mounted on shaft 1401, holding the transfer lever rocked in a counter-clockwise direction against the pressure of spring 1403. The upper end of transfer lever 1400 is provided with a slot 1404 (Figure 4A) which engages around the shaft 362, the shaft 362 being normally positioned in the right hand end of the slot when the transfer lever 357 is latched as shown in Figure 4. The right hand edge of the head of the transfer lever 1400 is provided with a cam surface 1407, the purpose of which will be later described.

Mounted on the side of the head of lever 1400 near the right hand edge, is a pawl 1408 (Figure 4A), which has a slot 1409 in which engages a pin 1406 secured to the transfer lever. Intermediate the two ends of the pawl 1408 a spring 1410 is fastened, the other end thereof being secured to the head of the transfer lever.

As shown in Figure 4, pawl 1408 lies normally in its lowest position, that is, with the pin 1406 in the upper portion of slot 1409, and a pin 1411 mounted on the upper end of the pawl immediately behind a tooth of the gear wheel 361 and with the pawl 1408 against a laterally extending lug 1405 of the transfer lever 1400. When the lever 357 is rocked to disengage the nose 358 from the forward notch in the lower end of transfer lever 1400, the spring 1403 rocks the transfer lever to the right, moving the left hand end of the slot therein against the shaft 362, and allowing the nose 358 to engage the forward notch in said lever. The pin 1411 on pawl 1408 encounters the next lower tooth on gear 361 and is cammed outwardly thereby against the action of spring 1410, until it passes the point of said tooth, when it will snap behind the same, at which time the transfer lever 1400 has completed its movement to the right.

It will we understood that transfer lever 1400 and pawl 1408 are tripped by the cam tooth 353 secured to an accumulating wheel in one order and will cooperate with the adjacent pinion 361 of the next higher order. The movement of transfer lever 1400 to the right places the cam edge 1407 in the path of a cam surface 1415 on a cam disc 1416 (Figure 3) mounted on the actuator shaft, so that during the rotation of the actuator following the digitation portion of the cycle the transfer lever 1400 will be rocked back to the left. Pin 1411 having engaged behind the notched tooth of the wheel 361 of the next higher order, will move the same one step, being returned to the position shown in Figure 4. Thus whenever during digitation, an accumulating wheel passes from 0 to 9, or from 9 to 0, the independently actuated transfer mechanism will take this carry over to the accumulating wheel of next higher order through the mechanism described above. As described hereinafter under the heading of "Reversing mechanism" intermediate gear 365 (Figures 4 and 15) is adapted to be shifted laterally to engage gear 361 and gear 348 to determine entry of negative increments or to engage gear 363 and gear 348 to determine entry of positive increments. The cam rises 1415 are so positioned within each group of orders that they will act simultaneously, but each succeeding group will be slightly staggered as will be later described.

Means are provided whereby a simultaneous entrained transfer may occur within each group of accumulating wheels. Pivotally mounted on a shaft 364 (Figure 4) is a lever 1418 carrying at its lower end a roller 1419 to cooperate with a cam disc 341 having a cam rise 1417 as shown in Figure 3. The upper end of the lever carries a pair of idler gears 1420—1421 mounted on a stub shaft, the gears 1420, 1421, and the lever 1418 being normally held in the position shown in Figure 4, by spring 1422 connected to shaft 1423. The idler gears 1420 and 1421 are adapted, when rocked to the left, to engage gear 1420 with the teeth 352 of the gear 351 of one order, and idler gear 1421 with gear 348 of the next higher order. Thus, whenever a tooth 353 passes through the position where it will mesh with the gear 1420, a one will be carried to the next higher order in either a positive or a negative direction, depending upon the direction of rotation of the accumulating wheel 346.

Upon rotation of the actuator immediately after the digitation portion of the cycle, the cam rise 1417 will engage roller 1419 and rock the idler gears 1420 and 1421 into active position. If the accumulating wheel is standing at 9 after digitation, the tooth 352 will lie immediately above a tooth of gear 1420, while if the accumulating wheel is standing at 0, the tooth will lie immediately below the active tooth of gear 1420. Should this accumulating wheel receive a transfer from the one of next lower order, this transfer will in turn be carried to the one of next higher order, due to tooth 352 and idler gears 1420—1421. Correspondingly, in negative actuation, after the conclusion of the digitation, any accumulating wheels which stand at zero will be in a position to transfer a negative 1 to the accumulating wheel of next higher order.

It will be seen that the two means of transferring from one accumulating wheel to that of next higher order will never interfere, as one is operative only during digitation and the other is operative only after digitation. Should the numeral wheel be standing at any value other than 9 or 0, neither of the teeth 352 will be in a position to engage the gear 1420, so that no erroneous registration could result from a transfer being imparted to that wheel. If during positive actuation an accumulating wheel stands at 0 after digitation, a transfer to this wheel will step the tooth 352 away from the gear 1420 instead of in a direction to actuate it. The converse is also true should the accumulating wheel be standing at 9 after digitation in a negative operation.

It will be understood that the idler gears 1420 and 1421 are only employed between the orders within a group of accumulating wheels. The size of the group may vary according to the accuracy of the machine, as the only limit to the size of a group is the amount of back lash in the entrained gearing. Whenever the entrained gearing from order to order becomes so long that there is danger of losing a carry, the group should be ended, and between adjacent groups an independently actuated transfer mechanism is provided and, the actuators between successive groups being staggered, a transfer between groups will not be lost. Such a mechanism as has been described is especially advantageous in view of the large capacity of registering wheels which could be used with only a small portion of the cycle used for transfer purposes.

ZERO SETTING MECHANISM

*Figures 10, 11, 12, 13, and 19*

Means are provided whereby upon depression of a special resetting key the accumulating wheels will be returned to their zero position by power derived from the motor. As shown in Figures 10 and 12 the shaft 345 is provided at its left hand end with a square portion 400 which fits into a correspondingly shaped opening in the left hand side frame, holding the shaft 345 against rotation. The shaft 345 is provided with a pair of diametrically opposed longitudinal semi-circular grooves 401 which correspond to the two zero positions of the accumulating wheel. Surrounding the shaft 345 is a tubular shaft 404 which is rotatably mounted on said shaft and is provided with a plurality of circular apertures 403, each aperture having its center along the vertical center line of the accumulating wheel 346. In each circular aperture 403 is a steel ball 402 which normally rests in one of the longitudinal semi-circular grooves 401 of the shaft 345 (Figure 10). The accumulating wheel discs are rotatably mounted on the tubular shaft 404, and are provided at their inner periphery with a pair of diametrically opposed lugs 405 which contact with the said tubular shaft. These lugs 405 correspond to the two "zeros" of the accumulating wheel. As shown in Figures 10 and 13, the width of the circular openings 403 in the tubular shaft are less than the width of the lugs 405, so that the accumulating wheels 346 are held securely against any movement other than a rotational one.

When it is desired to reset the numeral wheels to zero, the tubular shaft 404 is rotated by means to be described later, and upon rotation thereof the ball 402 will ride out of the groove in stationary shaft 345 and roll around its periphery. When the ball is in contact with the outer periphery of shaft 345 it extends far enough to engage the inner peripheral lugs 405 of the accumulating wheel discs 346, carrying them with it until it drops in the opposite notch 401. Any accumulating wheel which is not standing at zero will have its lug 405 spaced away from alignment with the notches 401, so that they are in position to be engaged by the ball 402 and to be positively returned until they are again in alignment with the notches 401 when the accumulating wheel will stand in its zero position. Those accumulating wheels which are in the zero position when rotation of tubular shaft 404 is started will not be turned thereby, as the ball 402 will not ride out into its engaging position until it has been moved past the lug 405.

Means are provided whereby the overthrow preventer pawls will be disengaged from the accumulating wheels during a resetting operation. Each overthrow preventer pawl 354 is keyed to the supporting shaft 356 (Figure 11) the keyway being wider than the key so that each pawl may oscillate on the shaft without moving the same, while any counter-clockwise movement of the shaft will rock all of the pawls 354. Secured to the left hand end of shaft 356 is an arm 406 upon the upper end of which is mounted a roller 407 (Figure 12). The roller 407 is spring pressed into engagement with the periphery of a cam disc 409 secured to the left hand end of shaft 404 and normally lies in one of two diametrically opposed depressions 408 in said disc.

When shaft 404 and disc 409 are rotated the roller 407 will be forced out of the depression and the shaft 356 will be rocked to disengage the pawls 354 from the gears 348 during rotation of said shaft 404. The pawls 354 will be held in their disengaged position until the roller 407 enters the other notch 408, i. e., when the resetting operation has been completed.

Means are provided whereby the tubular shafts 404 will be turned through one-half rotation upon depression of the resetting key by power derived from the motor. As shown in Figure 10, the shaft 404 is provided adjacent its right hand end with a gear 411 which meshes with a gear 412 (Figure 19) mounted on a stub shaft journaled in the right hand side wall of the frame and an intermediate wall. The gear 412 meshes with a gear 413 secured to the clutch housing of a clutch 414 similar in construction to clutches 215 and 221 which have been previously described. The driven part of the clutch is mounted on shaft 421 upon which a sprocket wheel 422 is also mounted, the sprocket wheel 422 being connected by a chain 423 with a sprocket wheel 227 mounted on shaft 207 (Figures 19 and 32). A clutch release dog 415 for clutch 414 is mounted on the stub shaft referred to above and is connected by a link 417 with the lower end of a bellcrank lever 418 loosely mounted on shaft 410.

The upper arm 419 of the bellcrank extends through the casing of the machine and is provided with a finger button 420 (Figures 1 and 19). The clutch release dog is maintained rocked in its clutch disengaging position and the key 420 is maintained in its elevated position by a spring 416 which is connected to the lower end of the clutch release dog and the shaft 410 (Figure 19). The ratio of the gearing 413, 412, and 411 is such that the tubular shaft 404 will receive one half a rotation for a complete rotation of the clutch housing 414.

Means are provided whereby a circuit through the motor will be established upon depression of the resetting key. This means comprises a switch 424 (Figures 19 and 33) which is adapted to be closed by the clutch release dog 415 when the same is moved to clutch releasing position.

REVERSING MECHANISM

*Figures 1, 4, 15, 16, and 18*

Means are provided to transfer the movement the intermediate gears 361 receive from the actuating segments, either positively or negatively to the accumulating wheel 346. As shown in Figure 15, the wide intermediate gears 361 mesh with broad gears 363 for half of their width. The gears 365 are adapted to be shifted to engage either with the gears 361 and transmit the movement directly therefrom to the gear 348 adjacent accumulating wheel 346, or to engage with the intermediate idler gears 363, thus transmitting movement from the gears 361 through 363, 365, to the gears 348. As seen in Figure 4, when the actuation is transmitted directly from 361 through 365 to 348, the numeral wheels will be rotated in a negative direction, whereas when the actuation goes through 361, 363, 365 to 348, the actuation will be in the opposite direction, or positive.

Means are provided to permit manual adjustment of the reversing mechanism whereby all the accumulating wheels will be actuated either positively or negatively, or whereby one portion of the accumulating wheels will be actuated positively while the other portion will be actuated negatively. As shown in Figure 16, the right hand group of the shiftable intermediate gears 365 are provided with spacing hubs 367, and are rotatably mounted on a shaft 366, being secured for lateral adjustment therewith by suitable means. The left hand portion of the gears 365 are mounted in the same manner on a shaft 368. The shafts 366 and 368 are mounted in an intermediate support, and in the side frames of the machine, respectively for lateral adjustment therein.

The shaft 366 is provided at its right hand end with an extension 370 which is provided with two V notches 371 and 372 into which a spring pressed ball 373 is adapted to engage to hold the shaft in either of its adjusted positions. Adjacent its right hand end the extension 370 is provided with a notch 374 in which a cam flange 375 of a lever 376 engages, the lever 376 being an extension of a collar 377. The outer end of collar 377 is provided with an arm 378 which extends through the casing of the machine as shown in Figure 1.

At its upper end the lever 378 is provided with a well 379, into which the end of a spring pressed pin 380 is adapted to engage. The pin 380 is provided with a knob 381 which permits it to be withdrawn from the well 379. The pin 380 is mounted in a collar 382 carried by a lever 383 which extends through the casing from a transverse shaft 384, the shaft 384 being mounted within the collar 377 previously described. Near its right hand end the shaft 384 is provided with a collar 385 to which is secured a sprocket wheel 392, the purpose of which will be described hereinafter. The left hand end of shaft 384 is provided with an arm 389 having a cam flange 390 engaging with a notch 391 in the left hand end of shaft 368. The shaft 368 is provided with two V notches with which a spring pressed ball engages said notches and said ball being similar in construction to the V notches 371 and 372, and the spring pressed ball 373 on the right hand end of extension 370.

From the foregoing it will be apparent that when the arms 378 and 383 are rocked downwardly, that is, toward the front of the machine, the arms 376 and 389 will be correspondingly rocked and the cam flanges 375 and 390 will move shafts 366 and 368 to the left, thus shifting the intermediate gear 365 to the position shown in dotted lines in Figure 15; that is, to transmit the actuation to the accumulating wheels in a negative direction.

It will also be evident from the foregoing that half of the reversing gears may be shifted to subtracting position, thus leaving one half in position to transmit the actuation positively and the other half in position to transmit the actuation negatively. If the pin 380 is withdrawn from engagement with 379, and the operator moves the lever 383 forwardly by itself, the shaft 384 and arm 389 are rotated, cam flange 390 serving to move shaft 368 to the left. As arm 378 has not been moved, the intermediate gears 365 mounted on shaft 366 will remain in position to transmit the actuation in a positive direction.

DECIMAL INDICATORS

*Figures 1, 2, 2A, and 17*

Means are provided whereby a plurality of markers may be positioned simultaneously to indicate different ordinal divisions of a number standing in the accumulating wheels. The markers comprise a plurality of upright arms 430 which are secured to a flexible band 431 at distances apart corresponding to three ordinal places of the accumulator. The endless belt 431 runs over two spools 432 mounted beneath the outer casing of the machine, said spools being provided with knobs 433 which extend above the casing and by which the belt 431 may be adjusted. The upper part of the casing immediately beneath the accumulating wheels is notched (Figure 17) having projecting lugs opposite the accumulating wheels and apertures in between the same. The length of the decimal markers 430 is such that when they are intermediate two adjacent accumulating wheels they will be seen through the apertures, but if not properly positioned will be concealed by the projecting lugs (Figures 1 and 17). On the upper end of the markers 430 any suitable designation may be provided, such as a comma or a period.

THE GRAND TOTAL REGISTER
DIAL CONSTRUCTION AND ACTUATION
Figures 1, 4, and 18

Loosely mounted on a transverse shaft 512 are a series of twenty-seven totalizing wheels 513 which are visible through sight openings 514 in the casing of the calculating machine. The construction of the totalizing dials is identical in every respect with the construction of the accumulating dials 346, as well as the assembly secured thereto. Consequently such construction will not be described in detail and reference is hereby made to such description of the accumulating dials and the totalizing mechanism will only be described in those particulars in which it differs from the accumulating mechanism.

Secured to the side of the totalizing wheel 513 is a twenty-tooth gear 515 which is adapted to receive actuation from shiftable gears 516 mounted on a shaft 517. The gear 516 is adapted to mesh either with a gear 518 mounted on a transverse shaft 519, or with a gear 520 which meshes with the gear 518 and with the gear 516 in one of its shifted positions, as will be later described. The gear 520 is mounted on a transverse shaft 521, and meshing therewith is a gear 524 which is loosely mounted on a transverse shaft 525, said shaft 525 being supported by depending links 526 (Figures 4 and 18). The gear 524 is adapted to receive actuation from the gear 363 (Figures 4 and 18) either from the actuator or from the accumulating wheels 346, as will be later described. The movement transmitted to the gear 524 will be transmitted to the totalizing wheels 513 through the gear train previously described.

Means are provided whereby the grand total register may be selectively engaged to receive actuation from the drive transmitting mechanism therefor. As shown in Figure 18, the right hand link 526 is provided with a downwardly extending arm 527 which is provided with a roller 528, the purpose of which will be later described. The link 526 is also provided with a horizontal rearward arm 529, to the end of which is attached a spring 530, the spring being secured to a transverse shaft at its other end (Figure 18) so that it constantly urges the link to rotate in a clockwise direction, thus tending to move the idler gear 524 into mesh with the gear 363 to enable drive transmitting mechanism for the totalizing wheel.

Intermediate its ends the rearward arm 529 is provided with a pin 531. The pin 531 engages in a slot 532 in a link 533, which is pivotally secured at its upper end to the rearward arm 534 of a bellcrank lever, the upper arm 535 of which extends through a slot in the casing (Figures 1 and 18). The slot in the casing is provided with two positions to which the arm 535 can be moved. It is shown in Figures 1 and 18 in the forward position, in which position it holds the link 533 up, which holds the intermediate gear 524 from engagement with gear 363. However, when the arm 35 is moved to its rearward position, that is, in the right hand portion of the slot shown in Figure 1, the link 533 will be moved downwardly, allowing spring 530 to rock the link 526 to engage the gear 524 with the gear 363. With the gears 524 and 363 engaged, the grand total register wheel 513 is adapted to receive actuation either from the actuator through the intermediate gears 361 and 363, or from the gear 348, the intermediate gears 365, 361, and 363, as will be later described.

Means are provided for superseding the control of setting lever 535 to disable the drive transmitting mechanism during transferring operations. A separate transfer mechanism being provided for the grand total register, it is necessary to disengage the intermediate gears thereof from the actuating gears 363 during transferring operations. Mounted on the actuator shaft (Figure 18) is a cam 536 which has an operative edge 537 which is adapted to engage the roller 528 at the beginning of a transfer operation. The arm 527 will consequently be rocked to the right, as viewed in Figure 18, disengaging the gear 524 from the gears 363. The high part of the cam extends through a distance on the circumference euqal to the portion of the cycle occupied by transferring operations, the slot 532 being provided to permit pin 531 to ride upwardly therein. When the high portion of the cam 536 has passed the roller 528, the gears 524 will be moved under the influence of the spring 530 to engage again with the gears 363.

TRANSFER MECHANISM
Figures 4 and 4B

The transfer mechanism for the grand total register operates in the same manner as that for the accumulator, which has been previously described. However, there are some differences in structure which will be described, and as these differences relate only to a transfer resulting from movement of the accumulator wheels during digitation, no description of the operation of a transfer resulting from a transfer to a wheel of lower order is deemed necessary.

As shown in Figure 4, the nose 540 of the cam disc for tripping the independently actuated transfer during digitation operations is adapted to engage the nose 541 formed on the forward arm 542 of a bellcrank lever pivoted on a shaft 543. The nose 541 is pressed into engagement with the cam disc by means of compression spring 544 engaging between the arm 542 and a shaft 545, being seated therein. The rearward arm 546 of the bellcrank lever is provided with a hook nose 547 (Figure 4B) which is adapted to engage either a shoulder 548 on the upper end of the transfer lever 550, or an ear 549 at the forward upper end thereof. As shown in Figure 4B, it is engaged with the projection 548, thus holding the transfer lever in its inoperative position. The transfer lever 550 is loosely mounted on a shaft 519 being spring pressed in a clockwise direction by a spring 551. On its upper end, extending to the right (as shown in Figure 4) the transfer lever is provided with a finger 552, the purpose of which will be later described. Pivoted to the lower end of the transfer lever is a pawl 553 which is spring pressed in a counter-clockwise direction by spring 554. The nose of pawl 553 is adapted to engage one of the teeth of the gear 518, as shown in Figure 4.

When an accumulator wheel passes between 9 and 0 during digitation, the bellcrank lever 542, 546 is rocked in a counter-clockwise direction sufficiently to disengage its hook end 547 from the projection 548 and allow the transfer lever to swing to the right under the influence of spring 551 until the hook end 547 engages the ear 549. During this movement the pawl 553 will have been cammed outwardly by the tooth immediately to the rear thereof, and, after having been cammed outwardly thereby, will snap in behind the tooth under the influence of spring 554.

The rocking of the transfer lever in a clockwise direction will have moved the finger 552 on the upper end thereof into the path of a cam 556 secured to a shaft 557, the shaft 557 being driven from the actuator shaft and in time therewith. The cam 556 will, in striking the finger 552, rock the transfer lever in a counter-clockwise direction. The pawl 553, having engaged behind the next lower tooth, will move the same, thus advancing the gear train and the totalizing wheel 513 one unit.

The cam 560 (Figure 4) rocks, through the roller 561 and arm 562, the idler gears 563 into engagement for the entrained carry. This mechanism is similar in all respects to the mechanism described with relation to the accumulator and operates in the same manner.

ZERO SETTING MECHANISM

Figures 1 and 19

The resetting mechanism for the totalizing wheels 513 is identical in all respects with the resetting mechanism for the accumulating wheels 346, and so will not be described in detail. The drive for the resetting mechanism for the totalizing wheels 513 is transmitted from the gear 422 (Figure 19) to a gear 566 and gear 567 which drives the resetting clutch for the totalizing wheels. The engagement of the clutch is controlled by a bellcrank, to the upper end of which a key button 565 is attached, said upper end extending through the casing of the machine.

REVERSING MECHANISM

Figures 1 and 18

Means are provided whereby the totalizing wheels 513 may receive actuations either positively or negatively from the actuator or from the accumulating wheels 346. This reversing mechanism is identical with that provided for the accumulating wheels 346, and hence no detailed description of such mechanism will be given. The controls for this mechanism are shown in Figures 1 and 18, comprising the lever arms 570 and 571 with the adjusting knob 572. The lever arm 571 controls the reversing mechanism for the left half of the totalizing wheels 513, while the lever 570 controls the reversing mechanism for the right half of said wheels. By means of the knob 572 and the pin attached thereto, the two lever arms 570 and 571 may be operated together to reverse all of the totalizing wheels at the same time.

DECIMAL INDICATORS

Means are provided to designate desired groups of the totalizing wheels 513, as shown in Figure 1. This means is identical in construction and operation with the means previously described which performed the same function for the accumulating wheels 346, and reference is made to that description for a complete disclosure of such mechanism.

TOTAL TRANSFER

From the foregoing it is apparent that with the lever 535 in its rearward position and the intermediate gear 524 engaged with the gears 363 (Figure 4) depression of resetting key 420 for the accumulating wheels 346 will result in transmitting the values standing thereon to the accumulating wheels 513 in either a positive or negative direction, depending upon the setting of lever 570 and 571.

It is also apparent that with the accumulating mechanism and the totalizing mechanism split, a number standing on the right hand portion of the accumulating wheels can be transferred positively to a portion standing on the right hand of the totalizing wheels 513, while a number standing on the left hand portion of the accumulating wheels 346 can be transferred either positively or negatively to the left hand portion of the totalizing wheels 513.

It is also evident that values can be introduced simultaneously into the accumulating wheels 346 and the totalizing wheels 513, and that by clearing the accumulating wheels with the lever 535 in its forward position, and keeping the lever 535 in its rearward position during actuation, a total may be stored on the wheels 513 while the separate items may be read on the accumulating wheels 346.

THE REVOLUTIONS COUNTERS

DIAL CONSTRUCTION AND ACTUATION

Figures 1, 2, 18, and 19

Two revolutions counters of nine orders each are mounted in the frame of the calculating machine, as shown in Figure 1, their shafts being disposed end to end. The left hand counting wheels 600 are identical in construction with the accumulating wheels 346 which have been previously described. The right hand counting wheels 601 are also constructed in the same manner except that they are provided on the right hand end of the assembly with knurled discs 602 which provide means for manually setting values on this revolutions counter. The casing is indented around the openings through which said knurled discs are manipulable in order that said discs may be accessible for operation without undue increase in the size thereof.

Means are provided for imparting one increment of movement to each revolutions counter in its respective order for every actuation of the accumulating wheels 346. Two single tooth actuators 605 are provided which are spaced apart a distance corresponding to the distance between the two units orders of the revolutions counters. As each of the actuators 605 is identical in construction, only one of them is shown and will be described. The actuator 605 (Figure 2) is splined to a shaft 606 which extends transversely through the machine and is driven in time with the actuator by suitable gearing from the actuator shaft. The said actuators 605 are mounted for sliding movement on the shaft 606 and are carried by supports 607 secured to the shaft 51 in the item register carriage, the support 607 being bifurcated at its upper end to embrace a groove in the collar secured to the actuator 605.

Thus the single toothed actuators 605 are rotated in time with the actuator, and are positioned laterally, by movement of the shiftable item register carriage, into cooperative relation with the respective intermediate gears 608 to which they will impart an increment of movement which will be transmitted either positively or negatively to the counting wheels 600 or 601, respectively.

Means are provided to indicate the operative position of the single toothed actuators with respect to the counting wheels, and the effective position of the registering wheel carriage with respect to the accumulating and totalizng mechanisms. This means comprises two pointers 603 and 604 (Figure 1) which are secured to the top of the casing 39 of the registering wheel carriage (Figure 2) in alinement with the respective single toothed actuators. The pointers extend upwardly beneath and beyond an intermediate part of the casing of the calculating machine to indicate the counting wheels which are actuated by the respective actuators in that position of the carriage. In Figure 1 the registering wheel carriage is shown in its extreme right hand position so that the pointer 603 is positioned beneath the units counting wheel 600 and the pointer 604 is positioned beneath the units counting wheel 601.

TRANSFER MECHANISM

Figures 2 and 4B

The transfer mechanism for the revolutions counters is identical in every particular with the transfer mechanism provided for the totalizing wheels 513, except for the number of orders provided, there being no provision for a transfer from the counting wheels 601 to the counting wheel 600 of the lowest order. However, if desired, such transfer mechanism could readily be provided by placing suitable lateral extensions on the transfer lever of the highest order counting wheel 601.

ZERO SETTING MECHANISM

Figures 1, 2, 2B, and 19

Means are provided whereby the counting wheels 600 of the left hand revolutions counter and the counting wheels 601 of the right hand revolutions counter may be reset simultaneously upon depression of a special resetting key by power derived from the motor, or the counting wheels 601 alone may be reset to zero upon depression thereof. The resetting mechanism controlled by the key 620 (Figure 19) is similar in most respects to that provided for the accumulating mechanism, and will only be described insofar as it differs therefrom. As shown in Figure 19, the drive for the resetting shaft is transmitted from gear 422 to a gear 621 through a gear 622 which is secured to the shaft of the resetting clutch for the revolutions counters.

Means are provided whereby the resetting shaft for the left hand revolutions counter may be selectively coupled to the resetting shaft for the right hand revloutions counter for drive therewith. This means comprises a lever which has an upper portion 630 (Figure 2B) extending through the casing of the machine to serve as a control member therefor. The lower portion 631 of the lever is bifurcated and to each arm of the bifurcation is attached a pin 632 which is received in a groove of a collar 633 which is provided with two lugs 634 and 635, integral with the flanges thereof. The lug 634 constantly engages a notch in a collar 636 secured to the resetting shaft 627 of the counting wheels 601. The shorter left hand lug 635 is adapted to be received in a notch in a collar 637 which is secured to the resetting shaft 638 of the counting wheels 600.

With the handle 630 in the left hand position, as shown in Figures 1 and 2B, the lug 635 is not in engagement with the notch in the collar 637, and consequently the drive from the shaft 627 will not be transmitted to shaft 638 and upon depression of the resetting key 620, the counting wheels 601 alone will be reset to zero. If the handle 630 is moved to its right hand position, the notch in collar 637 will receive the lug 635 therein, and, as the lug 634 is long enough to remain in engagement with the notch in the collar 636, any rotation of the shaft 627 will be transmitted to the shaft 638. Consequently, with the handle 630 in its right hand position, depression of the resetting key 620 will result in resetting both sets of counting wheels to zero position.

REVERSING MECHANISM

Figures 1 and 18

Means are provided whereby the counting wheels 600 and 601 may be actuated reversely with respect to each other or to the actuator. This reversing mechanism is identical in construction with that described in connection with the accumulating mechanism except that no automatic control is provided therefor. Similar manual controls are provided, these controls comprising the levers 612, 613, as shown in Figures 1 and 18, with the connecting control knob 614. The lever 612 controls the direction of actuation of the counting wheels 601, while the lever 613 controls the direction of actuation of the counting wheels 600.

DECIMAL INDICATORS

The revolutions counters 600 and 601 are provided with pointers which may be set to indicate any desired grouping of the numbers standing on the counting wheels, this mechanism being identical in structure and operation with that described with reference to the accumulating wheels 346.

GENERAL OPERATION CONTROL MEANS

Figures 1, 18, 20, 21, 22, 25 and 25B

Means are provided whereby single or plural, positive or negative actuations may be determined by manipulation of a single control means. As shown in Figure 1, control key 440 when moved to position 441 will cause a single positive actuation of the accumulating wheels, while movement thereof to position 442 will cause any desired number of positive actuations of said wheels. Movement of lever 440 to position 443 will cause a single negative actuation of the accumulating wheels, while movement to position 444 will cause any desired number of negative actuations thereof.

The general operation control key 440 is pivoted for universal movement at 445 (Figures 20 and 21), and has a lower extension 446 to the end of which a spring 447 is attached, the other end of the spring being fastened to the base plate. The spring 447 serves to hold the general operation lever 440 in its neutral or central position. An intermediate plate 451, Figure 20, is slotted to form positions therein for the lower part 446 of the control 440 corresponding to the positions 441—444 to which the upper part may be moved.

Means are provided whereby movement of the lever 440 toward the rear of the machine will initiate positive actuation of the accumulating wheels by ensuring the positioning of the reversing gears therefor in their positive operation position, and by engaging the clutch. Immediately in front of the lower extension 446 of lever 440 is a cross rod 448 which is supported at each end by arms 449 mounted for rocking movement on stud shafts 450 which are mounted in two projecting ears of an intermediate plate 451. The right hand arm 449 projects upwardly further than the left hand arm, and has pivotally secured to its upper end a link 452. The rearward end of link 452 is pivotally secured by a pin 453 to an arm 454 which is keyed to a shaft 455. The forward end of a link 457 is mounted for sliding movement on pin 453 by means of a slot 456 formed therein, and secured to the rearward end thereof is a pin 458 having a head 459 which overlies the forward edge 460 of a plate 461. The pin 458 extends through a slot 462 formed in an intermediate plate 463 and is guided thereby for horizontal movement only. The plate 461 is provided with a slot 464 in which engages a pin 465 secured to the standard 463. A spring 466, secured to an ear 467 on plate 461 and to the standard 463, tends to rock the plate 461 about pin 465 in a clockwise direction to maintain a rearwardly extending hook shaped end 461A thereof in engagement with a pin 468 on the clutch release dog 469 of the actuator clutch 215.

From the foregoing it will be apparent that on rearward motion of the upper end of lever 440, and the consequent forward motion of the lower end 446, link 452 will be pulled forwardly, rocking the arm 454 in a counter-clockwise direction, pulling link 457 forwardly, thereby pulling plate 461 forwardly. The hook shaped end 461A being engaged with pin 468 will rock the clutch release dog 469 out of engagement with the clutch housing which permits engagement of the clutch. Movement of the clutch release dog of the actuator clutch to releasing position is utilized to energize the circuit through the motor. The upper arm of the clutch release dog 469 (Figure 27) is provided with a lateral lug 475 which is adapted on downward movement thereof to engage the upper of a pair of spring contact members 476 and depress the same to contacting position, thereby making a circuit through the motor 200.

Means are provided whereby counter-clockwise movement of arm 454 will ensure the positioning of the intermediate gears for positive actuation of the accumulating wheels. The shaft 455 is provided with a pair of diametrically opposed keyways 470, (Fig. 21), into which are adapted to engage a pair of diametrically opposed lugs or keys identical with keys 488 of member 484 which are formed on the inner periphery of arm 454. A sprocket wheel 473 (Figures 18, 20, and 21) is normally clutched to the shaft 455 as will be hereinafter described and is connected by a chain 474 with the sprocket wheel 392 (Figures 16 and 18) so that counter-clockwise rotation of sprocket wheel 473 will cause clockwise rotation of sprocket wheel 392. As will be recalled from the previous description of sprocket wheel 392, such rotation will set the reversing gears 365 in position to transmit actuation in a positive direction to the accumulating wheels.

Means are provided whereby movement of lever 440 toward the front of the machine will engage the clutch and position the reversing gears to transmit the actuation to the accumulating wheels in a negative direction. Immediately to the rear of the lower end 446 of lever 440 is a rod 480 which is supported in two arms 481 pivotally secured to ears of the intermediate plate 451. The right hand arm 481 is provided with a downwardly extending arm 482, to which is pivoted the forward end of link 483 which is pivotally secured, at its rearward end by means of a pin 487, to the lower end of an arm 484. A link 485, similar in all respects to link 457, is mounted for sliding movement on pin 487 by slot 486 and its rearward end is secured to the pin 458. The arm 484 is keyed to the shaft 455 by means of keys 488 which engage the keyways 470 formed in said shaft. The keys 488 (Figure 21) are in alignment with the keys by means of which the arm 454 is connected to the shaft 455.

From the foregoing it will be apparent that upon forward movement of lever 440 the lower end 446 will move rearwardly, moving therewith the rod 480, and rocking the arm 482 and link 483 forwardly. This movement of link 483 will rock the lever 484 in a clockwise direction, pulling the link 485 forwardly, thereby engaging the clutch 215.

It will be apparent that clockwise movement of arm 484 will rotate shaft 455 in a clockwise direction as well as the sprocket wheel 473 clutched thereto through the medium of lugs 488 engaging in keyways 470. Rotation of the sprocket wheel 473 in a clockwise direction will produce counter-clockwise rotation of sprocket wheel 392 and as shown in Figures 16 and 18, such rotation of sprocket wheel 392 will rock the arms 376 and 389 to move the intermediate gears 365 into a position to transmit the actuation to the accumulating wheels in a negative direction. The shaft 455 is shown in Figure 21 in the position it occupies when the intermediate gears 365 are in the position to transmit an actuation to the accumulating wheels in a positive direction, that is, the manual control levers 378, 383 are in the position shown in Figure 16. When the levers 378, 383 are moved forwardly to set the intermediate gears 365 in their subtracting position, shaft 455 will be rotated by means of sprocket wheel 392, chain 474, and sprocket wheel 473 (Figure 18) in a clockwise direction (Figure 21), and will be positioned so that the upper and lower keys 488 and the corresponding keys formed on arm 454 will contact the opposite sides of the respective keyways than as shown in Figure 21, but no movement of arms 454 and 484 will result. From the foregoing it will be seen that when the intermediate gears are in their positive position, the movement of the keys formed on the arm 454 will be an idle one, but should the intermediate gears be set in their subtracting position, the keys on arm 454 will be operative to rotate the shaft 455 to its positive position and thereby set the intermediate gears to the same position. Arm 484 and keys 488, integral therewith, operate in the same manner in determining negative actuation of the accumulating wheels.

Means are provided whereby movement of lever 440 to the right into either of the two positions 441 and 443, as shown in Figure 1, will enable mechanism to limit the rotation of the actuating clutch to one cycle. The lever 440 is mounted for transverse rocking movement in a rectangular frame 490 which is pivotally secured by pins 491 to two ears 492 depending from the top casing of the machine. The frame 490 is provided with an extension 493 which is positioned behind the rearward ear 492 and to which is secured a downwardly extending arm 494. The arm 494 contacts with the end 495 of a lever 496, the end 495 resting upon the upper edge of the supporting plate 498 mounted on the machine base.

The lever 496 is pivoted at 499 and has at its rearward end a nose 500 which engages a flange 501 on a collar 502 which is splined to the shaft 224, the shaft 224 being the driven shaft of the actuator clutch 215. The collar 502 is provided on its right hand flange with a cam 503, which, as shown in Figure 20, is normally held in its inoperative position by a spring 504. The hook end 461A on plate 461 is provided with a lateral extension 505, which when the cam 503 is positioned in its operative position, is adapted to be engaged thereby to release the clutch dog 469.

The above described mechanism operates to limit the actuator clutch to a single rotation in the following manner: movement of lever 440 to the right will move extension 494 to the left, rocking lever 496 in a clockwise direction. The nose 500 of lever 496 moves the collar 502 and cam 503 against the pressure of spring 504 into alignment with the lateral extension 505 of the hook end 461A of plate 461. Upon rotation of the actuator the cam 503 will engage the lateral extension 505 and lift the hook end 461A from engagement with pin 468, rocking plate 461 about pin 465 against the tension of spring 466. Thus, whenever lever 440 is moved to the right only a single operation of the actuator clutch is possible, as during the last portion of the cycle of the first operation, the cam 503 will lift the latch for the clutch release dog, allowing it to engage in the clutch housing and disengage the clutch.

When lever 440 is moved to the left, however, arm 494 will not rock lever 496 and the operation will not be interrupted by this arrangement.

Means are provided whereby the general operation control means may be used to control the entering of items into the grand total register (Figures 18, 20, 21, 22, and 25B). A second sprocket wheel 573 (Figure 25B) is loosely mounted on shaft 455 and secured thereto is a collar having a notch 574 which is adapted to receive a lug 575 formed on a grooved collar 576 which is splined on the shaft 455. The collar 576 is held normally in the position shown in Figure 25B in which a lug 577 formed on the left hand flange thereof is engaged with a notch 472 in the collar 471 of sprocket wheel 473, thereby clutching said sprocket wheel to the shaft 455.

The collar 576 is held in the position shown in Figure 25B and is adapted to be shifted therefrom by means of a lever 578 which is pivoted at 579 to an upstanding portion of the bracket supporting the shaft 455. The lower end 580 of lever 578 is bifurcated to embrace the collar 576 and is provided with a pin 581 on each arm of the lower end thereof which is engaged in the groove of the collar 576. To the upper end of the lever 578 is fastened a spring 582 which tends to hold the lever 578 and collar 576 in the position shown in Figure 25B.

The upper arm of lever 578 is offset to form a cam edge 583 on the right hand side thereof with which is engaged the forward part 584 of a lever 585 (Figures 22 and 25) said forward part 584 being adapted on upward movement thereof to rock the lever 578 to shift the lug 575 into engagement with the notch 574 (Figure 25B) thereby clutching the sprocket wheel 573 to the shaft 455 and enabling the control for the reversing gears 516 of the totalizing mechanism. The means whereby the lever 585 is rocked upon depression of a special control key 802 will be described hereinafter.

SELECTIVE SENSING MECHANISM

*Figures 3, 4, 22, 23, 24, and 29*

Means are provided for sensing the value standing on any one of the three registers of the calculating machine. This means comprises a series of sensing slides 725 (Figures 3, 4, and 24), there being one of these sensing slides for each order of the registering mechanisms, and as all of the slides 75 are identical in construction, only one will be described in detail.

Each slide is provided with three longitudinal slots 726 (Figure 24) in which anti-friction rollers 727 mounted on shafts 728 engage. Each sensing slide 725 is provided with a pair of square apertures 729 which are engaged by a pair of bails 730 mounted on transverse shafts 731, the said bails being normally held in a horizontal position thereby holding the sensing slides in their right-hand position against the action of springs 732 which constantly urge said slides forwardly. The bails 730 are adapted to be oscillated in a clockwise direction through an angle of approximately 90° to release the sensing slides 725 for sensing movement, as will be later described.

The upper left-hand corner of each slide 725 is notched at 735 to form an abutment for the rear end of a feeler 736 (Figures 4 and 22), the rearward end of the feeler being provided with a downwardly extending lug 737 to which is attached a spring 738, the other end of said spring being fastened to the sensing slide 725. The spring 738 serves to maintain the feeler 736 in engagement with the sensing slide 725 except at such times as the connection is broken by means to be later described.

The feeler 736 is mounted for limited sliding movement on the shafts 557 and 743 by means of slots 742 formed therein, said slots being equal in length to the slots 726 formed in the sensing slides 725, and the rearward part 741 is pivoted to the forward part 739.

The feeler 736 is provided at its forward end with a nose 744 which lies in a horizontal line with the axis of the shaft on which the totalizing wheels of the grand total register are mounted. The nose 744 is adapted to engage a step of the double stepped cam selector 511 secured to the totalizing wheel 513. As shown in Figure 22, it will be seen that on release of the sensing slide 725 the feeler 736 will be moved toward the front of the machine until the nose 744 contacts with that step which lies in a horizontal line to the axis of the shaft on which the totalizing wheels of the grand total register are mounted.

In the middle portion of its forward edge the sensing slide 725 is provided with a forwardly extending projection 750, the upper corner of which is notched at 751 (Figures 22 and 24) to form an abutment for the rearward end 752 of a feeler 753. The rearward end 752 of feeler 753 is pivoted to the main portion at 754, and is provided with a downwardly extending lug 755a to which is fastened a spring 756, the other end of which is fastened to the sensing slide 725.

The main portion of the feeling lever 753 is provided with two slots 757, the rearward slot engaging a shaft 755, and the forward slot engaging the shaft 364, this shaft being the one on which idler gears 363 are mounted (Figure 4). The forward end of feeler 753 projects upwardly and forms a nose 759 which lies in a horizontal line through the axis 345 upon which the accumulating wheels 346 are mounted. As shown in Figure 22 the zero step of the double stepped cam sector 349 lies in this horizontal line.

The lower forward edge of the sensing slide 725 is provided with a projection 765, the upper corner of which is notched at 766 to form an abutment for the pivoted rearward end 766' of a feeler 767, which is provided with a downwardly projecting ear 768, to which is fastened a spring 769, the other end of said spring being secured to the sensing slide 725. The feeler 767 is slotted at 769, the rearward slot 769 engaging the actuator shaft 330, and the forward slot 769 engaging a transverse shaft 770. The forward end of feeler 767 is formed as a nose 771 which lies in a plane horizontal with the tubular shaft 627, on which the counting wheels 601 are mounted.

The sensing mechanism for the revolutions counters differs from that of the accumulator and the grand total register, in that the feelers 767 are provided only in the nine orders of the counting wheels 601, whereas feelers 736 and 753 are provided for all orders of the machine. However, if desired, and the ordinal capacity of the machine were increased, the feelers 767 could be provided for counting wheels 600 as well as the counting wheels 601. In this event the feelers for the revolutions counters should be split, so that either half could be disabled at will. The reason for this will become apparent in the description of the operation of automatic multiplication.

Means are provided whereby any of the three registers of the calculating machine may be selected for value sensing operation by depression of a control key. On a stub shaft 780 (Figure 22) secured to the right hand side wall of the frame, an arm 781 is pivoted and at the forward end of said arm is pivoted at 782, a link 783, which extends upwardly therefrom, being pivoted at 784 to an arm 785 which is pivotally secured to the right hand side wall at 786. The arms 781 and 785 are so pivoted to the side wall of the frame and to the link 783 that they maintain a parallel relation. The arm 785 is provided with a rearward extension 787 which engages a notch 788 in the rear wall of the machine, being held against the side of the notch 788 by a spring 789, which tends to hold the arms 781 and 785 rocked in a counter-clockwise direction, thus holding the link 783 in its lowest position.

The link 783 is provided with a lateral extension 790 at its upper end, the topmost portion of which forms a shoulder 791 which underlies a pin 792 provided on the rearward arm of a spring-pressed lever 793 (Figures 22 and 23) mounted on a shaft 794 for lateral movement by a collar 795 which has a pin and slot connection 796, 797 with the shaft 794. Said collar and said lever are spring pressed to the right by a spring 798 (Figure 23).

As shown in Figure 4, each shaft 794 is cut away to form a notch which is normally engaged by the cam edge formed on the rearward end of the feeler 736 so that rotation of shaft 794 will lift the rearward end 741 of the feeler 736 from engagement with the abutment 735 of the sensing slide. The lever 793 is provided with a forward extension 799 (Figure 23) which underlies a beveled end 800 of the key stem 801 of a key 802. The lower end of the key stem 801 opposite the beveled portion 800 is notched to form an abutment 803 which overlies the forward end 804 of a bellcrank lever loosely mounted on the shaft 794. The bellcrank lever is provided with a downwardly extending arm 805 having a roller 806 which lies immediately in front of the link 783.

Depression of key 802 will first cause a shifting of collar 795 on shaft 794 due to the fact that the cam edge 800 is constantly in engagement with the forward end 799 of the lever 793. During the latter part of the downward movement of the key 802 the abutment 803 will rock the bell crank lever 804, 805 in a counter-clockwise direction. Pin 806 acting against the link 783 will swing the link upwardly to disable the feelers 753 and 767 as will be hereinafter described. It is to be noted that the rotation of the bellcrank lever 804, 805 will cause no corresponding rotation of the shaft 794 as the rearward end of the lever 793 has been moved to the left so that pin 792 does not overlie the upper edge 791 of the lateral extension 790, and consequently, the upward movement of link 783 is not operative to disable the upper feelers 736.

A key 810 (Figures 1 and 22) is provided with a stem 811 extending downwardly into the machine which cooperates with mechanism mounted on a shaft 812, the said mechanism being identical in every particular with the mechanism described in relation to key 802, the shaft 812 being notched similarly to shaft 794 for cooperation with the feelers 753. A key 815 having a stem 816, cooperates with mechanism mounted on a shaft 817, the said mechanism being identical in every particular with the mechanism described as being mounted on shaft 794, and serving the same purpose with relation to the feelers 767.

The keys 802, 810, and 815 are normally held in their upright position by compression springs 820 (Figure 22) and on the side of each key stem is provided a beveled lug 821 which, upon depression of the key, is adapted to pass through an opening in a stationary bracket 822 camming a slide 823 to the right, as shown in Figure 22, the slide 823 being a latching slide which, when the lug 821 has passed beneath it, will snap over the upper edge of said lug, holding the depressed key in depressed position. The slide 823 is mounted for sliding movement on bracket 822 by means of studs 824, and is normally spring pressed to the left by compression spring 825. The left hand end of slide 823 is provided with a portion which extends upwardly through the casing to form a key 826, said key serving to release any of the depressed keys 802, 810, and 815 upon movement thereof.

The operation of the mechanism for selecting a register for value sensing operation will be described with reference to a selection of the grand total register. Upon depression of the key 802, the first operation is the camming to the left of the associated lever 793, so that its pin 792 will no longer overlie the edge 791 of the lateral extension 790. During the further depression of the key the notched edge 803 will contact with the arm 804 of the corresponding bellcrank lever 805, and rock the said bellcrank lever in a counter-clockwise direction. The pin 806 contacting with the link 783 will cause said link to rock upwardly and to the right.

This upward movement will cause the two edges 791 which are associated with the feelers which are to be disabled to engage the pins 792 to rock the levers 793 in a counterclockwise direction, turning the corresponding shafts 812 and 817 in a counter-clockwise direction, which serves to lift the rear end of feelers 753 and 767 out of engagement with the sensing slide. The key 802 being latched in depressed position, will hold the feelers 753 and 767 in inoperative relation to the sensing slide until said key is released from depressed position. The description of the operation has been given with relation to the depression of key 802, but it will be understood from the foregoing, that upon depression of key 810 the feelers 736 and 767 will be disabled, while upon depression of key 815 the feelers 736 and 753 will be disabled. Consequently, depression of one of the respective keys 802, 810, and 815 will select the corresponding register for value sensing operation.

Means are provided whereby depression of the key for selecting the grand total register for value sensing operation will also enable the automatic control mechanism for the intermediate reversing gears for said register. Pivoted to the upper arm of the bellcrank lever 804, 805 associated with the key 802 is a link 807 (Figure 22) which is connected at its lower end with the rearward arm of lever 585. As previously described the forward arm 584 of lever 585 underlies the cam edge 583 on the upper arm of the shifting fork 578 so that upward movement of said arm will serve to clutch the sprocket wheel 573 (Figure 25B) to the shaft 455. Thus, upon depression of the key 802, the reversing control shaft 455 will be operative to set the intermediate reversing gears when a control therefor has been determined either by the general operation control means or the automatic division key.

Means are provided to release the sensing mechanism for operation under control of a special sensing clutch (Figures 24, 29, and 32). As shown in Figure 32, a gear 222 is provided on the shaft 226 driven from the sensing clutch 221. The gear 222 meshes with a gear 830 (Figure 24), said gear being secured to a shaft 831 mounted in an intermediate bracket 832 secured to the base plate of the machine. The gear 830 meshes with a gear 833 secured to shaft 834 which is also mounted in the intermediate bracket 832. The ratio of the gears 833, 830, and 222 is such that the gear 833 receives one rotation for every rotation of gear 222.

Also secured to shaft 834 is a collar 835 (Figure 29) having two cam projections 836 and 837 on the respective flanges thereof, said cam projections being diametrically opposed with respect to each other. Pivoted on a shaft 838 is a gear sector 839 having two downwardly extending arms 840 and 841 (Figure 24). The downwardly extending arm 840 is provided with a roller 842, the said arm being offset so that the roller 842 lies in the plane of cam projection 837. As shown in Figure 24, the cam 837 has a flat end portion with which the roller 842 is in engagement when the sensing clutch is in full cycle position holding the gear sector 839 rocked in its right hand position. The downwardly extending arm 841 has a roller 843, the roller 843 lying in the plane of cam projection 836, being engaged therewith as shown in Figure 24 when the sensing clutch is in full cycle position.

When the collar 835 is rotated in a counter-clockwise direction as indicated by the arrow in Figure 24, the cam projection 837 will be moved from beneath the roller 842 and the cam projection 836, acting on roller 843, will swing the gear sector 839 in a counter-clockwise direction. The teeth of the gear sector 839 are adapted to engage a gear 844 (Figure 24) mounted on the right hand end of shaft 731 previously described. The gear 844 meshes with a gear 845 which drives a gear 846 secured to the right hand end of the upper shaft 731. A second set of gears 844, 845, and 846, are provided on the left hand ends of the respective shafts described above in order to secure uniform operation of the bails 730.

As previously described, the holding bails 730 for the upper sensing slide are secured to the two shafts 731 and a counter-clockwise rotation of the gear sector 839 will rotate the gears 844 and 846 in a clockwise direction, swinging the bails 730 in the same direction, releasing the sensing slide 725 to be pulled to the left by springs 732.

The number of teeth on the gear sector 839 are such as to give the gear 844 a rotation of substantially 90°, the ratio of the radii of the gear sector and the gear being such as to give a rapid movement of bails 730, thus providing for a quick release of the sensing slides upon operation of the sensing clutch.

The gear sector 839 will stay rocked in its left hand position until near the end of the rotation of the sensing clutch when the cam projection 837 will engage the roller 842 and restore the gear sector to the position shown in Figure 24. In this restoring movement gear sector 839 will again drive gears 844, 845, and 846 to restore the bails 730 to the position in which they serve to hold the sensing slides in their inoperative position.

Means are provided for manually disabling the sensing mechanism for all three registers of the calculating machine. As shown in Figure 1, a knob 850 is provided on the outside of the right hand side wall. This knob is secured to a shaft 851 which extends through the casing, having on its inner end a cam sector 852 (Figure 22) which underlies the lower arm 781 of the mechanism for selectively disabling the feelers for the upper slide. As shown in Figure 22 rotation of shaft 851 will through the cam sector 852 rock the link 783 upwardly which will serve, in the event that none of the keys 802, 810, or 815 are depressed, to disable the feelers for all three registers of the calculating machine.

AUTOMATIC DIVISION

GENERAL OPERATION

Division is performed in this machine by subtracting the divisor as many times in each order from the dividend as it can be withdrawn without producing an overdraft. The carriage is then shifted so that the subtraction process can be resumed in the next lower order. This sequence of operation is carried forward until the carriage is shifted into its extreme right hand position, where it operates mechanism to stop the machine after registration of the quotient figure in that order.

It will be seen that this differs from the automatic division machines of the prior art in that the over-subtraction operation, commonly known as an overdraft, and the necessary corrective addition operation following the overdraft are eliminated.

At the beginning of the operation it is necessary to ascertain whether or not the divisor can be subtracted in the order in which it is standing with relation to the dividend. Consequently, upon depression of the division key the first operation that occurs is a sensing of the dividend values standing in the accumulator and of the divisor values standing in the item register. As previously described, the sensing slides are allowed to move toward the forward part of the machine, the distances which they are moved being representative of the values standing on the respective numeral wheels.

In order to determine whether a subtraction should occur or whether it is necessary to shift to the next lower order, it must be determined whether the dividend is greater than or less than the divisor. Consequently the values standing on the upper slides which are representative of the dividend, and the values standing on the lower slides, which are representative of the divisor, are compared in the respective orders.

In order to make this comparison the values from the two slides in each order are transmitted to a comparing mechanism which sets control mechanism in each order according to whether the digit of the dividend is greater than or less than the corresponding digit of the divisor. In case the two digits should be equal, the control mechanism for that order remains in inoperative position.

It is also apparent that in order to successfully use these values, that the setting of these control members must be utilized in the highest order first. That is, if the highest order digit of the dividend is greater than the highest order digit of the divisor, a subtraction may occur, whereas if it is smaller than the highest order of the divisor, a subtraction should not occur. In the event that the two values are equal, no control is exercised from that order, but is exercised from the highest order in which an inequality occurs. Consequently, the setting of the control members is sensed successively from left to right.

A common control member is provided which is capable of being set to two control positions, in one of which it will determine an actuation, and in the other of which it will determine a shift of the item register. This control member is adapted to be set from the highest order in which an inequality occurs, and once it is set from such order, any remaining inequalities which are sensed in the lower orders will be ineffective to change such setting.

At the conclusion of the sensing operation the control member is operated and will either open a shift clutch or the actuator clutch, depending upon whether the divisor was found to be greater than, or less than the dividend. At the conclusion of an actuating or a shifting operation, the sensing clutch is again opened in order to determine the nature of the next succeeding operation.

This sequence of operations is repeated until the carriage reaches its extreme right hand position, in which position it trips mechanism which will stop the machine at the conclusion of the registration in that order.

DIVISION MECHANISM

*Figures 1, 2, 3, 4, 25, 26, 27, 28, and 29*

A key 855 is provided, depresion of which initiates the operation of automatic division. As shown in Figures 25 and 25A the key 855 is formed in two parts, the upper of which projects upwardly through the casing and is provided with a finger button and a lower part 857 which is disposed entirely within the casing. The parts 856 and 857 are mounted on opposite sides of a frame 858 depending from the top portion of the casing for limited vertical sliding movement by means of pin and slot connections 859, 860. The upper part 856 of the division key is provided with a pin 861 which extends through a slot 862 in the intermediate frame 858 and overlies the lower part 857 of the division key and is adapted to depress the same upon depression of the upper part 856. A second pin 854 on the stem 856 overlies a spring 863 which constantly urges the upper part of said key to raised position.

The lower part of the division key 857 is provided with a stud 864, to which is fastened a spring 865, the spring being fastened at its other end to a depending lug from the casing 866. The spring 865 tends to hold the lower portion 857 in its raised position.

Means are provided for latching the lower part 857 of the division key in depressed position. As has been previously described, upon depression of the upper part 856, the pin 861 which extends through the slot 862 in the intermediate frame 858 depresses the lower part 857 of said key. A slide 867 is mounted by pin and slot connections 868, 869 to the intermediate frame 858 and is provided with a latching hook 870 having a cam portion underlying the pin 864 on the lower part 857 of the division key. Upon depression of the part 857 the pin 864 acting against the cam edge of hook 870 will cam the slide 867 to the left against the tension of a spring 871 secured to a lug depending from the slide and the lower pin 860. When the part 857 is completely depressed, the slide 867 moves back to the right so that the hook 870 overlies the pin 864 thereby holding the part 857 in depressed position.

Means are provided whereby depression of the division key 855 will set the intermediate gears of the register upon which the dividend has been set to subtraction position. This means comprises a link 874 (Figures 20, 25, 25A) which is secured for sliding movement at one end to the intermediate frame 858 by pin and slot connection 875, 876. The slide 874 is provided adjacent its forward end with an upstanding lug having two opposite cam surfaces 877 and 878 (Figures 25 and 25A). The cam edge 877 underlies the pin 861 which, as has been previously described, is mounted on the key stem 856, so that upon depression of said key stem the slide 874 will be cammed to the right as shown in Figure 25. At its rearward end, the slide 874 is connected to an upstanding arm 879 secured to the shaft 455. Thus, movement of the slide 874 to the right will produce clockwise rotation of the shaft 455, and, as previously described, such clockwise rotation will set the reversing gears for the selected register to subtraction position.

Means are provided whereby depression of the division key 855 will engage the sensing clutch to initiate a sensing operation. The lower part 857 of the division key overlies a lever arm 880 (Figures 25 and 26) secured to a shaft 881 mounted in a bracket 882, and secured to the other end of said shaft and extending in a direction opposite from the lever arm 880 is a second lever arm 883 which underlies the forward end of a link 884. Thus depression of the lower part of the key 857 will rock the shaft 881 in a counter-clockwise direction (Figure 26), rocking the lever arm 883 upwardly, carrying the link 884 therewith for a purpose to be later described. As shown in Figure 25, the forward end of the link 884 is normally held in the position shown by a spring 885 secured to the link and the base plate. The link 884, intermediate its ends, is secured pivotally by a pin 887 to a depending arm 886, loosely mounted on shaft 455. The pin 887 thereby serves as a pivot point whereby upward movement of the forward end of link 884 will produce downward movement of the rearward end of said link. The rearward end of link 884 is provided with a notch 888 which, when the said end is lowered, is adapted to engage a laterally extending lug 889 of the clutch release dog 890 for the sensing clutch 221.

From the foregoing it will be seen that on initial depression of key 855 the link 884 is given a clockwise rotation, engaging its notch 888 with the lower end of the clutch dog 889, thus moving it to a position where longitudinal movement thereof toward the rear of the machine will engage the sensing clutch.

Means are provided to give the link 884 a longitudinal movement toward the rear of the machine during the last part of the depression of the division key 855. The pin 864 on the lower part 857 of the division key overlies a lever 894

(Figures 25 and 25A) secured to the shaft 868 which is mounted in the intermediate frame 858, said lever arm 894 being slightly spaced from said pin. On its right hand end there is secured to the shaft 868 a downwardly extending arm 895 which is provided near its lower end and on the right hand side thereof, with a lug having an upper inclined face 896 and a lower cam face 897. Normally engaging the lower cam face 897 is a pin 898 mounted on the forward end of link 884.

As will be recalled, upon the initial depression of the division key, the link 884 is rocked upwardly and this movement occurs very rapidly due to the lengths of levers 880 and 883 (Figure 26). This upward movement will cause the pin 898 acting against cam face 897 to move the lever 895 to the left until the arm 894 is engaged by the pin 864 during the downward movement thereof. Due to such engagement the arm 895 will be returned toward the right during the latter part of the depression of key 855 and the link 884 will be moved toward the rear of the machine by means of the combined action thereon of arm 883 and arm 895. This movement will continue until the pin 898 has been moved above the cam surface 897 at which time the link 884 will be released from rearward movement and the pin 898 will lie above the inclined surface 896 which will have moved therebeneath. Such rearward movement of link 884 as described above will be operative to rock the clutch release dog 890 to open the sensing clutch.

As provision is made for latching the lower part 857 of the division key in its depressed position the link 884 will be retained by arm 883 in position to engage the clutch release 890 and open the sensing clutch upon reciprocation thereof.

Means are provided for maintaining a circuit through the motor while the sensing clutch is engaged. During releasing movement of the clutch release dog 890 (Figure 25) a pin 893, mounted thereon, is adapted to engage one of a pair of spring contact arms 892 and move the same to contacting position where it will be maintained by said dog until the sensing clutch again reaches its full-cycle position.

It will be recalled that upon the initial movement of the sensing clutch both the lower sensing slides 300 and the upper sensing slides 725 will be released to move forward distances corresponding to the values standing on the respective numeral wheels of the item register and the accumulator. In the following description it will be assumed that the dividend has been set upon the accumulator, but it is to be understood that it could as well be set upon the grand total register, the operation being the same in either event.

Means are provided whereby the movement of the upper sensing slide and the lower sensing slide in each order are used to compare the values standing in the corresponding numeral wheels, and determine whether the value digit of the dividend be greater than, equal to, or less than the corresponding digit of the divisor. This mechanism will only be described in relation to one order, it being understood that duplicate mechanism is provided in each order of the machine. It should be kept in mind that the movement of the upper slide 725 will represent the digit of the dividend, while the movement of the lower slide 300 will represent the digit of the divisor.

As shown in Figure 3, a two-armed floating lever 906 is provided, the upper arm being slotted at 907 to engage a pin 908 secured to an ear depending from the upper sensing slide 725, the normal position of this pin being in the bottom of the slot 907. The lower arm of the lever 906 is slotted at 909. Engaging in the slot is a pin 910 on an upstanding ear of the lower sensing slide 300. The pin 910 normally seats in the top of the notch as shown in Figure 3 when the slide is in its normal position. At a point corresponding to the intersection of the center line of the slots 907 and 909 a pin 911 is secured to the lever 906. The pin 911 engages in a horizontal slot 912 in the upper arm 913 of a lever pivoted at 914.

The floating lever 906 is used to compare the values of the respective digits of the dividend and the divisor as measured by the movement of the upper sensing slide 725 and the movement of the lower sensing slide 300. As seen in Figure 3, movement of the upper sensing slide 725 to the left will, through the pin 908, tend to rock the lever 906 around the pin 910 as a pivot point, with a resulting downward movement of the pin 911 and a rocking of the lever pivoted at 914. Correspondingly, forward movement of the lower sensing slide 300 will, through pin 910, move the lower arm of the lever 906 forward, tending to rock it around the pin 908 as a pivot point, and rock the arm 913 of the lever pivoted at 914 in a counterclockwise direction.

In the event that both the upper and the lower sensing slides move forward the same distance, the only result will be a sliding of pin 911 in the slot 912. However, should the value of the digit of the dividend be greater than that of the divisor, the upper slide 725 will move forward a greater distance than the lower slide 300, which will result in a counter-clockwise movement of the floating lever 906 around the pin 910 as a pivot point, the pin 911 moving downwardly and rocking the arm 913 downwardly. If the value of the digit of the dividend be less than the value of the digit of the divisor, the movement of the upper sensing slide 725 will be less than the movement of the lower sensing slide 300. The longer movement of the lower sensing slide will cause a clockwise movement of lever 906 with the pin 908 serving as a pivot point and a corresponding upward movement of pin 911 will result, said pin rocking the arm 913 upwardly.

The downwardly extending arm 915 of the lever pivoted at 914 is provided with a widened flange portion in which is formed an arcuate slot 916 in which the shaft 302 is engaged to guide the arm 915 in its movement. The lower edge of the widened portion of the arm 915 is formed as a double cam flange 917 (Figures 3 and 31), the central portion of which is in the vertical plane of the upper portion of the arm 915. The rearward cam flange 918 extends to the right of said plane (Figure 31) while the forward cam flange 919 extends to the left thereof.

Engaging the cam edge of the arm 915 are a pair of pins 920 (Figures 3, 29, and 31) which are formed on and extend upwardly from the outward edges of an arm 921 which is secured to the shaft 922 for a limited lateral pivoting movement thereon. As the pins 920 engage the lower cam edge of the arm 915, movement of the arm 915 to the left (Figure 3) will cause the cam edge 918 to become effective to move the arm 921 to the right (Figure 31) while if the arm 915 is rocked to the right, the cam edge 919 will become effective and will cam the arm 921 to the left (Figure 31).

The rearward end of the arm 921 is bifurcated to form two cam surfaces 924 and 925 between which a central opening 926 is provided (Figures 3, 29 and 30). The two cam surfaces 924 and 925 and the central opening 926 are representative of the three conditions that can be present in the relation between the two digits in any order. That is, if the dividend is greater than the divisor, the cam edge 924 will be presented in operative relation to certain members to be described later. If the dividend is equal to the divisor in that order, the opening 926 will remain in its normal operative position, while if the dividend is less than the divisor, the cam edge 925 will be moved into the operative position. As shown in Figure 29, all of the arms 921 are in their normal position, or in the position they would retain in case every digit of the dividend were equal to the corresponding digit of the divisor, that is, with the opening 926 in effective position.

Means are provided to sense successively from left to right the control to be exercised as determined in each order, and to enforce said control as determined in the highest order in which an inequality occurs. In each order, a pair of diametrically opposed pins 930 are provided, said pins being mounted in a collar 931 which is secured to its supporting shaft for rotation therewith, and a limited lateral oscillation thereon by means of a pin 932 (Figure 3). The pins 930 are divided into two approximately equal groups and two driving shafts 933 and 934 are provided therefor (Figure 29), the inner ends of said shafts being mounted in a bearing 935. The outer ends of the shafts 933 and 934 are journaled in supporting brackets and have secured thereto mutilated driving gears 936 and 937, respectively.

As shown in Figure 3, the pins 930 are adapted to be rotated in a clockwise direction so that each pin in its forward horizontal position will be adapted to engage either the cam 924, the cam 925, or pass through the opening 926, the positioning of the opposite pin at this time being utilized to effect the control determined as will be later described. As shown in Figure 29, the successive pairs of pins 930 are in a staggered relation from left to right, so that the left hand pin 930 will engage its corresponding control member slightly ahead of the one of next lower order, so that the setting of the control members is sensed from left to right.

Two separate groups of pins 930 with driving shafts therefor, are provided in order to obtain a large ordinal capacity without making the lag between any two successive teeth 930 so small as to fail to allow time for the control of the higher order to be exercised if it be in a controlling position. In Figure 29, only a portion of the pins 930 on each of the shafts 933 and 934 have been shown. However, it will be understood that the highest order pins on the shaft 933 will correspond in their positioning to the highest order pins mounted on the shaft 934; that is, with the pin 930 of the highest order immediately beneath the control cams 925 and 924.

Means are provided whereby the drive shafts 933 and 934 will receive successive rotations of 180 degrees during a portion of the cycle of rotation of the sensing clutch. As previously described, the gear 222 is driven from the sensing clutch (Figure 29) and drives a shaft 834 through the gear 830 and gear 833 mounted on said shaft. Also mounted on the shaft 834 near the right hand end thereof, is a mutilated gear 938 (Figures 24 and 29) having the larger portion of its periphery smooth, the teeth thereon being adapted to mesh with the mutilated gear 937 which has two portions of its periphery provided with teeth and intermediate the two groups of teeth two smooth surfaces 939 (Figure 24), the surfaces being adapted to conform to the smooth portion of the mutilated gear 938. The arrangement is such that while the smooth portion of the gear 938 is passing by the point of contact of the two gears, no rotation of gear 937 will result. The number of teeth on the gear 938 are sufficient to produce a rotation of the gear 937 through 180°, and bring the second smooth portion 939 into contact with the smooth portion of the gear 938.

On the left hand end of the shaft 834 a mutilated gear 940 is provided which is adapted to mesh with the gear 936, the gear 940 being identical in all respects with the gear 938, except that the relative position of the teeth during rotation of the sensing clutch is such that the teeth of the gear 938 will engage the gear 937 after the operative engagement of the teeth on the gear 940 with the gear 936. The teeth on the gear 940 are spaced away from the point of engagement with gear 936 so that sufficient time is allowed upon rotation of the sensing clutch before engagement thereof for the upper and lower sensing slides to move forward, and the control cams 924 and 925 to be positioned according to the difference in the digits in each order. The teeth on the gear 938 are so positioned with reference to the point of contact with the gear 937 that the gear 936 will have rotated through 180° and sufficient lag thereafter to enable the lowest order pins 930 of the upper group to have exercised any control determined therein before the highest order pins 930 of the lower group will be in position to exercise such control.

Means are provided which are adapted to be operated by the control pins in the highest order in which a difference in the digit values occurs to initiate either an actuation or a carriage shift. In the event that the dividend is greater than the divisor, an actuation should occur, that is, the divisor can be subtracted at least one more time in that order. However, should the divisor be greater than the dividend, the carriage should be shifted so as to subtract in the next lower order should the sensing there determine an actuation.

Two bails 943 and 945 are provided which extend across the machine immediately to the rear of the pins 930 and which are pivoted to stub shafts 947 in uprights 948 from the base plate. Bail 943 is provided with a series of lugs 944 which lie immediately to the left of the path of movement of the pins 930 in their normal position. The bail 945 is provided with a series of forwardly extending lugs 946 which lie immediately to the right of the normal path of movement of the pins 930.

The bails 943 and 945 and the lugs thereon are so arranged that if the forward pin 930 does not receive any lateral movement, the rearward pin will pass through the opening between adjacent lugs 944 and 946. However, should the forward pin 930 strike the cam surface 924 due to the positioning of members 921, it will be cammed to the right and the resultant movement of the rearward pin 930 to the left will cause said pin to strike the lug 944 of the bail 943, rocking the bail downwardly. If the arm 921 has been moved to the left so that the cam surface 925 will be in the path of the upwardly moving forward pin 930, it will be cammed to the left and the resultant movement of the rearward pin 930 to the right will cause said pin to strike the lug 946 of the bail 945, rocking that bail downwardly.

Means are provided whereby rocking of bail 943 downwardly will set mechanism to determine an actuation, if such bail be the first to be depressed; whereas this same mechanism will be set to determine a shifting operation if the bail 945 be the first to be depressed. An arm 949 (Figure 27) of the bail 943 extends forwardly from the supporting shaft 947 and to it is attached a spring 950, the other end of said spring being secured to the bracket 948 holding the bail in its normal horizontal position as will be hereinafter described. Pivotally secured to the forward end of the arm 949 is a link 951 which is pivotally secured at its upper end to the forwardly extending arm of a lever 952 pivoted to a shaft 953. The forward end of said lever overlies the top of a control key 954, the function of which will be later described.

The bail 945 at its right hand end is provided with a forwardly extending arm 955 (Figure 29) similar to the arm 949 on bail 943. Pivotally secured to the forward end of arm 955 is a link 956 which is pivotally secured at its upper end to a lever 957 mounted on the shaft 953 so that the forward arm thereof overlies the top of the control key 954. The bail 945 is held in its normal horizontal position by a spring 958 (Figure 29) which serves to hold the forward arm of lever 957 against a rod 989 (Figure 27) overlying said lever and the lever 952, thereby serving as a stop for the said levers and the bails connected thereto.

The control key 954 is provided with a flat head 960 upon which the two forward arms of the levers 952 and 957 rest (Figure 28). At the center the key is provided with an upwardly extending projection 961 to which is fastened a spring 962 secured at its other end to a pin 963 which is mounted on the side wall of the machine. Immediately beneath the head thereof the said key 954 is provided with a flat transverse portion in which a U-shaped slot 962 is formed. Intermediate the arms of the U-slot 962 a sharp-nosed projection 963 (Figure 28) is provided which normally lies immediately over a rod 964, both ends of which are secured to the side frame of the machine.

The control of the bails 943 and 945 is exercised as follows: if the bail 943 is depressed, a downward movement of the forward arm of lever 952 will result, which will first position the noise of projection 963 to the right of the rod 964 (Figure 28) and further movement of 952 will cause the left hand arm of the U-slot 962 to engage the rod 964. If the bail 945 is rocked, the forward arm of the arm 957 will be rocked downwardly, positioning the noise of projection 963 to the left of the arm 964, and thereafter moving the right hand arm of the U-slot 962 down over the rod 964.

The lower end of the control key 954 is also formed with a flat portion 965 which extends in a direction transverse to that of the upper flat portion containing the U-slot 962. The lower edge of the flat portion 965 overlies a rod 966 which is secured to the side wall of the machine. It will be evident from the foregoing that if the forward arm of the lever 952 is depressed the end of the flat portion 965 will be positioned to the right of the rod 966, while the rod 964 will have passed into the left hand arm of the U-slot 962. Whereas, if the forward arm of the lever 957 is depressed and the rod 964 moves into the right hand arm of the U-slot 962, the lower end 965 will have been positioned to the left of the rod 966.

Thus, after either one of the bails have been depressed the control key will be positively positioned either with its lower end to the right of the rod 966 or its lower end to the left thereof, and any further control exercised by the lower order pins 930 can not affect this setting, but can only result in a further depression of the key 954. Means whereby the control key 954 is latched in its set position will be hereinafter described.

When the control key 954 has been set to determine an actuation, it lies to the right of the pin 966 and in that position will overlie the end 967 of the upper arm of the actuator clutch release dog 469, said end being formed with an upstanding flange to guide the end 965 of the control key against the lever arm. From the foregoing it will be seen that upon further depression of the control key 954 by means to be presently described, it will rock the arm 967 downwardly, thereby moving the clutch release dog out of engagement with the clutch housing to release the actuator clutch to initiate a subtraction operation.

If a carriage shifting operation is determined, the lower end of the control key 954 will be moved to the left of the rod 966 and will overlie an arm 968 secured to the right hand end of a transverse shaft 972, the end of said arm being provided with an upstanding flange portion which serves to guide the downward movement of said control key 954. An arm 973, secured to the other end of shaft 972, is connected to a link 974 which is pivoted at its forward end to a supporting arm 975 which is pivotally secured at its lower end to a bracket on the base plate. A forwardly extending arm 976 is pivoted to the arm 975 and a notch 977 in the forward end thereof is held normally in engagement with a pin 978 on the shifting clutch release dog 98 by means of a spring 978 which presses said arm 976 downwardly against a stop member 979.

Means are provided whereby the control key 954 will be depressed by power derived from the sensing clutch to initiate either a shift or an actuation near the conclusion of the rotation of the sensing clutch. A link 985 (Figures 27 and 27A) which is mounted for vertical sliding movement by pin and slot connections 986, 987, is held normally in its upper position by a spring 988, the upper end of the spring being secured to the rod 989 and on the lower end of said link is provided a nose 990 which lies in the path of a pin 991 mounted on the housing of the sensing clutch (Figure 27). Near the end of the cycle of rotation of the sensing clutch the pin 991 will strike the nose 990, depressing the link 985. The lower end 965 of the control key 954 is provided with a lateral extension 993 which is provided with a pin 994 which lies in the upper portion of the upper slot 987. Consequently when the link 985 is moved downwardly by the engagement of pin 991 with the nose 990, it will carry the control key 954 with it to engage and depress one of the arms 967 or 968, depending upon the setting of the control key.

Means are provided for latching the control key 954 in its set position, such means being adapted to be released upon actuation of the control key by the sensing clutch. The upper portion of the link 985 is provided with an extension on its rearward edge, the lower part of which forms a cam surface 995 (Figures 27 and 27A) which lies immediately above a pin 996 formed on a pawl 997 which is mounted on the shaft 986. The pawl 997 is normally held in the position shown in Figure 27 by a spring 998 which tends to rotate the pawl in a counter-clockwise direction, holding a lug 999 formed thereon in engagement with the forward side of the link 985. The pawl is provided with a nose 1000, the beveled upper portion of which lies immediately underneath the pin 994.

Upon the initial depression of the key 954 to its set position by the forward end of either of levers 952 or 957, the pin 994 will cam the pawl 997 to the right, and when the pin passes the nose of the pawl, the nose will be forced over the pin 994 by the spring 998 and will latch the key 954 in its set position. From the foregoing description it will be apparent that the control key 954 may be set from any one of the successively effective control pins 930, as the control determined thereby is not exercised until all of said pins have passed their effective position.

The latch for the control key 954 is adapted to be released upon depression of said key to initiate the operation which is determined by the setting thereof.

When the slide 985 is depressed by the sensing clutch, the cam surface 995, acting against the pin 996 on the pawl 997, will cam the pawl to the right, disengaging its nose from the pin 994 and allowing the key 954 to be retracted to its normal position by the spring 962 attached to the upstanding flange 961 of the control key.

Means are provided whereby the pair of pins 930 corresponding to the lowest order of the machine must always determine either an actuation or a shift, said means being provided to ensure correct operation in the event that all of the digits of the dividend above the units are equal to all of the corresponding digits of the divisor. The right hand lug 944A of the actuation bail 943 is extended to close the space between it and the shift lug 946 in that order so that in the event that the values of the digits of the dividend and divisor in that order are equal, and the pins 930 rotate in their normal path in a plane perpendicular to the axis on which they are mounted, the rearward pin 930 will strike the lug 944A and determine an actuation instead of passing idly as in the higher orders.

Means are provided whereby either the actuator clutch 215 or the shift clutch 99 will open the sensing clutch near the end of their cycle of rotation during automatic operations. Mounted on the right hand face of the actuator clutch housing 215 is a cam 1006 (Figure 25) which is adapted to engage a lever 1007 toward the end of the rotation of the actuator clutch. The lever 1007 is pivotally secured to a shaft 1008, being normally spring pressed in a clockwise direction by a spring 1009 against a stub shaft 1010. The lower end of the lever 1007 lies immediately in front of a pin 1011 which is mounted in the link 884 extending on both sides thereof, the lever 1007 being adapted to engage the portion of the pin extending to the right hand side of the link.

When the cam 1006 engages the upper end of the lever 1007, the lever will be rocked in a counter-clockwise direction and the lower end thereof, acting on the pin 1011, will thrust the link 884 toward the rear of the machine. If the lower portion 857 of the division key is latched in depressed position, the forward end of link 884 will be raised and the notch 888 will engage the lug 889 on the lower end of the sensing clutch release dog 890 so that this rearward movement of the link 884 will disengage the clutch release dog, releasing the clutch for rotation.

Mounted on the right hand face of the clutch housing of the clutch 99 is a cam 1014 similar to the cam 1006 mounted on the actuator clutch housing. The cam 1014 is adapted to engage the upper arm of a lever 1015 which is pivotally secured to a shaft 1016 (Figure 25) and to the lower arm of said lever 1015 a short link 1018 is attached which has a slot 1019 engaged by a shaft 1020. The lever 1015 and the link 1018 are held in the position shown in Figure 25 by means of a spring 1017 which is attached to the said lever. The rearward end of the link 1018 is provided with a lateral extension 1021 which abuts a similar extension 1022 on a link 1023 which is supported intermediate its ends by a stub shaft 1024. The link 1023 is pivotally secured at its rearward end to a short arm 1025 on a shaft 1026 which is provided adjacent its right hand end with an upstanding arm 1027, which, when the link 84 is in lowered position, lies immediately in front of the portion of the pin 1011 which extends to the left hand side of the link 884. Link 1023 is maintained in engagement with the link 1018 by a suitable coiled spring on shaft 1026.

Thus, when the cam 1014 strikes the upper end of the lever 1015, the links 1018 and 1023 will be moved toward the rear of the machine, rocking the shaft 1026 in a clockwise direction, causing the arm 1027 to engage the pin 1011 and thereby force the link 884 rearwardly to release the sensing clutch when the rearward end of said link is in engagement with the clutch release dog 890.

The links 1018 and 1023 are formed separately so that when the adding machine proper is removed from the calculating attachment this connection may be broken.

The positioning of the cams 1006 and 1014 on the actuator clutch housing and the shift clutch housing, respectively, may be varied according to the portion of the cycle required for the active function of the respective clutches. During rotation of the actuator clutch 215, the cam 1006 does not become operative until the digitation and transfer operations have been completed. During rotation of the shift clutch, the cam 1014 does not reach operative position until the item register has been shifted to the next ordinal position.

Means are provided whereby the operation of automatic division will be terminated when the item register carriage enters its extreme right hand position and the subtractions necessary therein have been performed. A lug 1028 (Figure 27) is secured to the bottom of the shiftable carriage frame 39 and is so positioned that, when the item register enters its extreme right hand position, the cam surface of the lug will engage and depress the forward arm of a lever 1029 loosely mounted on the shaft 98A. The rearward arm of said lever is provided with a lateral extension 1030 which underlies the arm 976 and is adapted to raise the same upon depression of the forward arm of said lever. The lever 1029 is held in the position shown in Figure 27 by a spring 1031 attached to the forward arm of said lever and the shaft 100; the said spring tends to move the said lever in a clockwise direction, the movement thereof being limited by the engagement of a downward extension 1032 of said lever with the base plate.

The movement of the arm 976 to disengage the same from the shifting clutch release dog 98 is utilized to enable mechanism whereby the machine will be stopped if the divisor is greater than the dividend when the carriage is in its extreme right hand position. The arm 976 is provided with an upstanding ear 1033 which is adapted to be positioned immediately forward of a pin 1034 on an arm 1036 by upward movement of said arm 976. The arm 1036 is secured to the left hand end of a transverse shaft 1037 to the other end of which an arm 1038 is fastened. The said arm 1038 is provided with a pin and slot connection with a rearward extension 1039 of the latching slide 867 for the lower part 857 of the automatic division key.

Thus, when the carriage is in its extreme right hand position and the divisor is greater than the dividend, the mechanism which is operable in other positions of the carriage to initiate a shifting operation, becomes effective to release the automatic division key and stop the operation. Upon release of the lower part 857 of the automatic division key, the same will rise under the influence of spring 865 (Figure 25) and allow the spring 885 to pull the forward end of link 884 downwardly and thereby disable the operative connection of the same with the sensing clutch release dog 890 as the pin 898, acting against the inclined surface 896 will cam the arm 895 to the left (Figure 25) until the pin 898 is released therefrom.

OPERATION OF THE DIVISION MECHANISM

The operation of the automatic division mechanism will be described in connection with the solution of a problem, the particular numbers being selected so as to show the different conditions which the mechanism is required to meet and which are provided for by the means above described.

As an example, the division of the number 32.4081 by the number 27 has been chosen, it being assumed that four decimal places are desired in the quotient figure. An inspection of the two numbers shows that to obtain four decimal places, the total quotient will contain five digits, so that the item register carriage must be spaced at least five places to the left of its home or right hand position. The dividend 32.4081 is entered into the accumulator, the revolutions counters are reset to zero, and the divisor 27 is entered into the item register in alignment with the digits 3 and 2 of the dividend, which is the preferable arrangement though such alignment is not necessary to correct operation of the mechanism.

Having selected the accumulator to be used in the operation rather than the grand total register, the key 810 is depressed to enable the feelers for the accumulating wheels and to disable the feelers for the totalizing and counting wheels. If desired, the division can be performed by entering the dividend in the grand total register, depressing the key 802 to enable the feelers for said register and moving the lever 535 to its rearward position to connect the grand total register to the actuating mechanism.

If it is desired to obtain the complement of the quotient, one of the revolutions counters can be reversed with respect to the other by means of the levers 612 and 613. The decimal indicator for the revolutions counter is set between the fourth and fifth orders and from an inspection of the two numbers it can be determined that the integral part, the quotient, will contain one digit. The operations above described having conditioned the machine for operation, the division key 855 is depressed. Upon depression of the division key the pin 861 (Figures 25 and 25A) mounted on the upper part 856 of said key acting against the link 874 will rock the shaft 455 and rotate sprocket wheel 473 in a clockwise direction. The said wheel acts through the chain 474 to rotate the shaft 384 (Figure 16) which, through the cams 375 and 390, shifts the reversing gears 365 for the accumulating wheels so that they will transmit the actuation in a negative direction thereto.

The lower part 857 of the division key is latched down by the hook 870 moving into engagement with the pin 864 and in the downward movement thereof said lower part operates by means of the arms 883 and 895 to engage the rearward end of the link 884 (Figure 25) with the sensing clutch release dog 890 and to move the link rearwardly. The rearward movement of link 884 rocks the release dog 890 to permit engagement of the sensing clutch 221 and to close the contacts 892 thereby energizing the motor circuit and initiating rotation of the sensing clutch.

The first effective operation during the cycle of rotation of the sensing clutch is the releasing of the upper and lower sensing slides for value sensing operation. The actual positioning of the lower sensing slides to represent the values of the digits of the divisor is delayed by means and for purposes to be described in connection with the automatic multiplication mechanism.

Upon rotation of the sensing clutch the discs 232, 233 and 234 (Figures 7 and 8) will rock the wedge 245 downwardly moving the link 250 downwardly, releasing the latch 256 from engagement with the pin 259 on the arm 260 thereby releasing the lower sensing slides. The lower sensing slides 300 will move forward under the influence of springs 304 until their respective feelers 305 engage the respective steps 154 of the sectors 153 (Figure 2) which are positioned in a horizontal line with the feelers. The sixth and fifth order slides are thereby permitted to move forward distances representative of the values 2 and 7, respectively, while the remaining slides are stopped in their zero positions.

Upon initial rotation of the sensing clutch, cam 837 (Figure 24) moves from engagement with roller 842 and cam 836 acting against roller 843 rocks the sector 839 which acts, through the gears 844, 845, and 846 to swing the bails 730 to their releasing position, thus allowing the sensing slides 725 to move to the left under the influence of springs 732. As previously described, the key 810 has been depressed so that the feelers 736 and 767 are disabled while the feelers 753 for the accumulator mechanism are in operative position. The forward movement of the upper sensing slides 725 will be limited to zero position in all orders of the accumulator in which no number has been set, while in the six orders in which the digits of the dividend are set the slides 725 will be moved distances corresponding to the values of said digits.

As shown in Figure 3, the upper slides 725 and the lower slides 300 transmit their movement to the corresponding two-armed levers 906. In the sixth order the upper slide 725 will have moved a distance corresponding to 3, and the lower slide a distance corresponding to 2 so that the pin 908 will have moved the upper arm of the lever 906 one step farther than the lower arm will have been moved by the pin 910. Consequently, the pin 911 rocks the upper arm of the lever 915 downwardly, causing the cam 918 in the sixth order to position the arm 921 of that order so that the cam surface 924 is in the path of movement of the pin 930. Thus the comparing mechanism shows that the dividend is greater than the divisor in the highest order in which an inequality occurs.

The positioning of the cam 924 in the path of the pins 930 in the sixth order is utilized to initiate a subtraction operation. Rotation of the sensing clutch also causes rotation of the shafts 933 and 934 which carry the pins 930 through the medium of gears 830, 833, shaft 834, and gears 938 and 940. However, the rotation of the pins 930 is delayed due to the spacing of the teeth of the gear 940 from their operative position with respect to the gear 937 (Figure 24) to allow ample time for positioning the comparing mechanism. During rotation of the shaft 934, the forward pin 930 in the sixth order will be cammed to the right by the cam 924 and the rearward pin will be moved correspondingly to the left and will strike the lug 944 in the sixth order, rocking the bail 943 downwardly (Figure 27).

The bail 943, through arm 949, link 951, and lever 952, acts on the control key 954 (Figure 28) to move the projection 963 to the right of the rod 964 and the lower end 965 to the right of the rod 966. Due to the fact that the control key is thus positioned by the pin in the order where the first inequality occurs, the lower orders can have no effect on the control key as it is latched in its set position below the effective stroke of movement of the levers 952 and 957 by engagement of the pin 994 under the hook-shaped end 1000 of the latching dog 997 (Figures 27 and 27A).

Near the end of the cycle of rotation of the sensing clutch, the pin 991 mounted on the clutch housing will strike the extension 990, moving the link 985 downwardly, carrying with it the control key 954 which will strike the upper arm 967 of the clutch release dog 469 for the actuator clutch 215, thus initiating a rotation of the actuator which will cause the divisor to be subtracted from the dividend in the highest orders thereof.

At the conclusion of this rotation, the number standing in the six lower orders of the accumulator will be 054081, the zero and the 5 being positioned opposite the 2 and the 7 standing in the item register. During this actuation the revolutions counters actuators will have entered a positive and a negative 1 in the respective fifth order counting wheels.

Toward the end of the rotation of the actuator clutch 215, the cam 1006 (Figure 25) mounted thereon will strike the upper end of lever 1007, moving the lower end of said lever against the pin 1011 mounted on the link 884, rocking the link rearwardly against the lug 889 of the clutch release dog 890, again opening the sensing clutch.

Upon opening the sensing clutch the sequence of operation will be the same as that heretofore described, except that in the highest order in which an inequality occurs, that is, in the sixth order, the digit of the dividend being zero is less than the digit of the divisor 2, so that the forward pin 930 will strike the cam surface 925 (Figure 29) and the rearward pin will be moved to the right to hit the lug 946 of the shift bail 945. The bail 945 will act through the lever 955, link 956, and lever 957 to rock the control key to the left, positioning the projection 963 to the left of rod 964, and the lower end 965 to the left of rod 966, in which position it will be latched by the pawl 997 as previously described, the pin 991 on the sensing clutch again moving the key downwardly. The key will contact with the arm 968 mounted on shaft 972 (Figure 27) and the arm 973 on the other end of said shaft will move the link 974 rearwardly to rock the clutch release dog 98 of the shift clutch 99 out of engagement with the clutch housing, thus initiating a rotation of the shift clutch.

As shown in Figure 6, engagement of the shift clutch 99 will cause the worm 124 to move the item register carriage to the right. The worm 124 is given sufficient idle movement to allow the lower sensing slides 300 to be restored to and latched in retracted positions, so that the feelers 305 will not interfere with the shifting operation.

Near the conclusion of the rotation of the shift clutch 99, as shown in Figure 25, the cam 1014 engages the upper end of the lever 1015, rocking the link 1018 attached to the lower end of the lever forwardly, causing the arm 1027 to engage the pin 1011 to again rock the clutch release dog 890 of the sensing clutch, releasing said clutch for rotation.

The shifting of the carriage has resulted in positioning the 2 and the 7 of the divisor opposite the digits 5 and 4 of the dividend. This will also have resulted in positioning the actuators for the revolutions counters in cooperative relation with the respective fourth order counting wheels.

Upon opening of the sensing clutch at the conclusion of the shifting cycle, the digits 5 and 4 of the dividend will be compared to the digits 2 and 7 of the divisor. The first order in which an inequality occurs is that in which the digit of the dividend is 5 and of the divisor is 2. Consequently, this will result in the control mechanism being set to determine the opening of the actuator clutch in the same manner as has been described. At the conclusion of this actuation, the sensing clutch will again be opened and the number standing in the accumulator being at this time 027081, the first order in which an inequality will occur will be in the second order where the 8 is standing in the dividend and a 0 in the divisor. Consequently, another actuation will be determined. This having been carried out, the sensing clutch will again be opened.

As a result of the last actuation the number standing in the accumulator is 000081, the digit 2 of the divisor being opposite the 0 in the fifth order. The comparing mechanism will determine a shift as in the first inequality occurring, the dividend being less than the divisor.

At the conclusion of the shifting operation, the sensing clutch will again be opened, and as the digits of the divisor are still standing opposite two zeros in the dividend, another shift will be determined. Thus the actuator of the revolutions counter has been shifted past the third order without making a registration therein, the first three digits of the quotient being 1, 2, and 0.

When the sensing clutch is again opened by the shift clutch, the 2 of the divisor will be standing opposite the 0 in the third order of the dividend, and the 7 of the divisor opposite the 8 in the second order dividend. Consequently, in the highest order inequality the digit of the dividend is again less than the digit of the divisor, and the comparing mechanism will determine another shift. Thus the actuator of the revolutions counter has been shifted past the third order without making a registration. The first four digits of the quotient are then, 1, 2, 0, 0, and the digit 2 of the divisor is positioned beneath the digit 8 of the dividend.

The shifting clutch having again opened the sensing clutch, and the cycle of sensing operations having been initiated, the 8 of the dividend being greater than the 2 of the divisor, an actuation will be determined and the number 27 will be subtracted from 81, leaving the number 54 in the accumulator standing opposite the number 27 in the item register.

The actuator clutch having again initiated the operation of the sensing clutch, the two numbers are compared and the digit 5 being greater than the digit 2, another actuation is determined, and 27 is again subtracted from the dividend, leaving 27 standing in the dividend, and again initiating rotation of the sensing clutch.

The numbers being compared, it is found that all of the digits of the dividend are equal to the aligned digits of the divisor. Consequently, none of the cam surfaces 924 and 925 are positioned to control the pins 930. However, as has been previously described, in the lowest order of the machine the lug 944 on the bail 943 is wider than any of the other lugs and extends across the opening normally left between the lug 944 and its companion lug 946 of the shift bail 945 (Figure 29) so that though no inequality occurs in any of the orders, nevertheless the bail 943 will be rocked downwardly to initiate an actuation, so that the divisor will again be subtracted from the dividend. This will remove all of the numbers from the accumulator register, leaving zeros standing therein, while the quotient figure 3 will have been registered positively and negatively in the respective units orders of the counting wheels.

The sensing clutch having been engaged by the actuator clutch during the latter portion of its cycle, the sensing mechanism will be operated and the comparing mechanism will determine that a shift should occur. However, as the item register carriage will have been shifted into its extreme right hand position, the arm 976 (Figure 27) will have been lifted from engagement with the pin 978 on the clutch release dog 98 by the movement of lever 1029 resulting from the engagement of the cam projection 1028 on the carriage frame with the forward arm thereof. The upward movement of arm 976 will have positioned the ear 1033 thereon in front of the pin 1034 on the arm 1036, so that the rearward movement of the arm 976 will operate through arm 1036, shaft 1037, and arm 1038 to move the latching slide 867 (Figure 25) to release the lower part 857 of the division key therefrom.

From the foregoing it is apparent that upon completion of the registration of the lowest order quotient figure the machine will be stopped and the automatic division mechanism will be restored to its normal inoperative position.

At the conclusion of the operation, the quotient 1.2003 will be registered in the counting wheels 601, while the complement thereof, 999987997, will be registered in the counting wheels 600. The divisor will still be standing in the item register, and the remainder, zero for the problem solved, in the accumulating wheels.

If it be desired to have all three factors at the conclusion of a calculation, the total register can be connected to receive actuation positively while the accumulator is being actuated negatively. Thus, at the same time the divisor is being subtracted from the dividend registered on the accumulating wheels, it will also be registered additively in the grand total register, and at the conclusion of the operation the dividend will stand therein.

AUTOMATIC MULTIPLICATION

GENERAL OPERATION

Multiplication is performed by setting a multi-digit multiplier into a revolutions counter and determining therefrom the number of actuations necessary in each order in producing the desired product, the multiplicand being entered in the shiftable item register.

The number set in the revolutions counter is utilized to control the number of actuations in each order by means of the automatic control mechanism described in connection with the operation of automatic division. The multiplier standing on the counting wheels is divided by "one," and it will be evident that this will produce the number of actuations in each order which correspond to the digits of the multiplier of that order.

As the multiplicand is standing on the shiftable item registering wheels, it is necessary to provide means for superseding the control of these registering wheels when a sensing operation for control is to be made. This mechanism is enabled only during automatic multiplication as in automatic division the number standing on the shiftable item registering wheels is sensed for control operation as well as for actuating operation, whereas in automatic multiplication the number standing on the shiftable item registering wheels is sensed for controlling digitation but this setup must be superseded to cause the value 1 to be sensed in the units order during control sensing operations.

To perform the solution of the problem in automatic multiplication, the following manipulation of the keyboard controls is necesary. The multiplicand is set in the registering wheels 4 by depression of the numeral keys 6, and the multiplier is set in the counting wheels 601 by means of the knurled discs 602. The carriage is shifted to the left until the pointer 604 indicates the highest order of the multiplier. The lever 612 should be set to subtracting position so that the actuator for the counting wheels 601 will subtract, while the lever 613 would be left in addition position in order that the increments of movement imparted to the counting wheels 600 will be positive. The key 815 is depressed in order to select the counting wheels for sensing by the upper sensing slides, and the multiplication key 1040 is depressed.

With the controls set as above, and upon depression of the multiplier key 1040, the mechanism provided will proceed to perform the multiplication, and register the product in the accumulating wheels 346 either positively or negatively as may be determined by the setting of levers 378 and 383. If desired, it can also be entered in the totalizing wheels 513 in either a positive or negative sense.

MULTIPLICATION MECHANISM

*Figures 1, 6 to 9 inclusive, 24 to 29 inclusive, and 32*

Means are provided, operation of which controls mechanism to initiate the operation of automatic multiplication. A multiplication key 1040 is mounted for vertical sliding movement on the intermediate plate 858 by pin and slot connection 1042, 1043. The key 1040 is held normally in its raised position by a spring 1044 which is attached to a depending ear from the upper casing of the machine and to a pin 1045 secured to the key stem 1041.

Means are provided for latching the multiplication key in its depressed position, said means comprising a latching hook 1046 on the latching slide 867, which has been previously described. The upper cam edge of the hook 1046 normally lies in contact with the pin 1045 secured to the key stem (Figure 25) and upon depression of the key the pin 1045 will move the latching slide 867 to the left, and when the key is fully depressed the pin 1045 will be engaged beneath the hook 1046 of the latching slide.

Means are provided for ensuring the positioning of the intermediate gears for the accumulating wheels to transmit the actuation to said wheels in a positive direction. Secured to the key stem 1041 is a pin 1047 which is adapted to engage the cam edge 878 formed on the link 874 (Figure 25A). When the said link is in its right hand position, depression of the key will move the link to the left through the action of the pin 1047 on the cam edge 878, and thereby will rock the shaft 455 in a counter-clockwise direction. Such counter-clockwise movement of the shaft 455 will, through sprocket wheel 473 and chain 474, set the intermediate gears for the accumulating wheels in a position to transmit the actuation positively to said wheels in a manner which has been previously described.

Means are provided whereby a special cam control clutch will be engaged upon depression of the multiplication key to enable the mechanism for automatically setting a 1 divisor into the machine. This means comprises a bellcrank lever loosely mounted on the shaft 455, the forward arm 1050 of which underlies the pin 1045 secured to the key stem 1041. The other arm 1051 of the bellcrank is provided with a roller 1052 which underlies an arm 1053 of the clutch release dog 1054 of the cam control clutch 220 (Figure 25). The clutch release dog 1054 is loosely mounted on a shaft 1055 and is normally urged to engaging position by a spring 1056. The drive for the clutch 220 and the mechanism controlled thereby are described hereinafter.

Means are provided whereby the automatic control mechanism utilized in the performance of automatic division will be enabled upon depression of the multiplication key. This means comprises an offset lateral extension 1057 of the key stem 1041, which extends through a slot in the intermediate frame 858 and overlies the pin 864 which is secured to the lower part 857 of the division key. It will be recalled from a previous description of this mechanism that depression of this key serves to engage the sensing clutch 221, and that upon engagement of the sensing clutch, the upper and lower sensing slides will be released.

Means are provided for restoring the lower sensing slides at the beginning and at the end of each cycle of rotation of the sensing clutch. This means comprises a cam 1060 (Figure 7) which is formed similarly to the restoring cam 265, and is adapted to cooperate with the portion of the pin 264 which extends to the left of the arm 260 as viewed from the left in Figure 7. The cam 1060 is secured to the collar 268 intermediate its ends by means of a pair of diametrically opposed pins 1061, said collar also carrying the cam 265, as previously described. The distance of the cam 1060 from the pin 264 in its normal position (Figure 7) is sufficiently great that when the collar is moved to position the cam 265 out of operative relation with said pin 264, the cam 1060 will remain out of operative relation thereto. The cam 1060 is normally held in a position perpendicular to the shaft 231 by a leaf spring 1062 (Figure 7), and the flanges of the supporting collar are bevelled on opposite sides of said collar to allow a slight pivotal movement of the cam 1060 about the pins 1061.

This provision for a slight pivotal movement of the cam 1060 is made so that the collar supporting said cam may be moved laterally to bring the cam into operative position and the cam will yield should its position be such as to engage the end of the pin 264. The spring 1062 serves to bring the cam into its normal position after rotation of said cam has carried it beyond the pin 264.

The means for moving the cam 1060 into operative position with respect to the pin 264 comprises a cam disc 1063 (Figures 7 and 7A) secured to the shaft 226 which is provided with two cam rises 1064 and 1065. The cam rise 1064 is adapted to engage the disc 267 which is mounted on the end of the supporting collar 268, thereby moving the cam into operative position with the pin 264 early in the cycle of the sensing clutch, as may be seen in Figure 7A, whereas 1065 of the cam disc 1063 is adapted to move such cam 1060 into operative position near the conclusion of the rotation of the sensing clutch.

From the foregoing it is seen that the cam 1060 is operative to restore the lower sensing slides 300 at the beginning of each cycle of the sensing clutch, and near the end thereof. These restorations are necessary in the operation of automatic multiplication, as the lower sensing slides must be utilized to sense the multiplicand for digitation during operation of the actuating clutch, and for sensing the divisor 1 for comparison with the multiplier during the rotation of the sensing clutch. Consequently the lower sensing slides must be restored between the successive operative portions of the cycles of rotation of the actuating clutch and the sensing clutch.

The lengths of the cam rises 1064 and 1065 are such that the shaft 231 will receive slightly more than one rotation while the cam 1060 is in operative position. This occupies a very small portion of the cycle of the sensing clutch, as the ratio between the gear 208, which is driven in time with the sensing clutch, and the gear 209, the driving gear for the shaft 231 (Figure 32), is very great. The cam 1060 must be in the operative position for slightly more than one rotation of the shaft 231, so that should it be in alignment with the pin 264 when first cammed into operative position, it will still be operative to engage the same, rocking the arm 260, and thereby serving to restore the sensing slides 300 to normal position.

Means are provided whereby a setting of the number 1 will be made in the lowest order of the shiftable registering mechanism for sensing by the lower sensing slide, which is in operative relation thereto, during the sensing for operation control. As shown in Figure 6, the slide 155 is provided with a series of slots or notches which are normally disposed opposite the forward projections 306 of the lower sensing slides (Figure 3), so that the slides are free to move forward to allow the feelers 305 to engage the stepped sectors 154 to sense the number standing on the item registering wheels.

The slides 158 and 155 are mounted for a limited sliding movement on the frame of the shiftable registering carriage by means of the pin and slot connections 160, 161. When the slide 155 is moved to the right, the lugs 156 thereon are disposed in the path of the projections 306 of the lower sensing slides and in this position the slide 155 will prevent movement of all of the lower sensing slides except that one which is positioned in operative relation with the lowest order of the shiftable registering mechanism. The lowest order lug 157 is cut away a distance corresponding to one step of movement of the sensing slide so that with the slide in its right hand position the value 1 is sensed by the sensing slide disposed opposite said lug 157.

Means are provided for superseding the control of the stepped sector 153 in the units order of the item registering wheels while sensing for operation control. If the stepped sector 153 be in the position shown in Figure 2, the zero step 154 is positioned opposite the nose 311 of the feeler 305, and in this event would prevent forward movement of the sensing slide 300 in operative relation thereto. To avoid this possibility in sensing for operation control, a cam lug 1070 is mounted on the slide 155 having a cam surface 1071 which is adapted on movement of the slide 155 to the right (Figure 6) to engage stepped sector 153 and raise the same until the step 154, representing the value 1, is disposed opposite the nose 311 of the feeler 305.

Means are provided whereby the setting slide will be shifted to determine a sensing of the value 1 in the lowest order of the shiftable registering mechanism during sensing for operation control. This means comprises a cam disc 1075 (Figures 3 and 32) which is driven in a timed relation from the sensing clutch, the effective cam surface thereof engaging the slot 159 of the slide 158 disposed opposite thereto and move the said slide to the right (Figure 6), moving therewith the slide 155. The effective length of the cam disc 1075 is such that it will hold the slides 155 and 158 in operative position during substantially the complete cycle of rotation of a sensing clutch, at the end of which it will allow the same to move to inoperative position. The cam disc 1075 is provided with a notch (Figure 3) which is in alignment with the slide 158 when the said cam disc is in full cycle position, so that the carriage may be shifted freely when the sensing clutch is in full cycle position, but will be held against shifting movement during rotation of the sensing clutch and the cam disc.

Means are provided for driving the cam disc 1075 in a 1 to 1 ratio from the sensing clutch (Figure 32). A gear 1080 is secured to the shaft 226 driven from the sensing clutch, and meshes with a gear 1081 loose on a shaft 231, which meshes with a gear 1082 loose on the shaft 224. Secured to the gear 1082 is a gear 1083 also loosely mounted on said shaft, which meshes with a gear 1084 of equal size, the gear 1084 being secured to the driving shaft 1085 of the cam control clutch 220. When the clutch 220 is engaged it drives the shaft 1086 on which the sensing control cam disc 1075 is mounted.

The other mechanism utilized in the operation of automatic multiplication has been described in connection with the operation of automatic division, and no further detailed description of such mechanism is deemed necessary. The relation of the mechanism previously described and that described in this section will be apparent from the ensuing description of the operation.

OPERATION OF THE MULTIPLICATION MECHANISM

As the operation of the automatic multiplication mechanism can be understood more clearly from a description thereof in connection with the solution of a problem, such a description will be made herein. The problem selected for solution is the multiplication of 68,934 by 2,603.

Before depression of the multiplication key, the following manipulations of the keyboard controls are made. The multiplicand 68,934 should be entered in the item registering wheels 4 by depression of the numeral keys 6, while the multiplier 2,603 is set in the counting wheels 601 by means of the knurled discs 602. The lever 613 is set to addition position to determine positive actuation of the counting wheels 600, while the lever 612 is set to determine negative actuation of the counting wheels 601.

The key 815 is depressed to select the feelers 767 for the counting wheels 601 to control movement of the upper sensing slides 725 and to disable the feelers for the accumulating wheels and the totalizing wheels. The shiftable item register carriage is moved so that the pointer 604 is opposite the highest order digit of the multiplier; that is, the digit 2. The machine is then conditioned for the operation of automatic multiplication, and the multiplication key 1040 is depressed.

During the downward movement of the multiplication key 1040, the pin 1047 (Figure 25) acting against the cam edge 878 of the link 874 will ensure the setting of the intermediate gears for the accumulating mechanism in a position to transmit actuation positively thereto. The pin 1045 acting against the arm 1050 will rock the clutch release dog 1054 to clutch engaging position where it is held until the end of the operation, due to the fact that the hook end 1046 engages the pin 1045 and latches the multiplication key in depressed position.

The laterally extending arm 1057 of the multiplication key is operative to depress the lower part 857 of the division key which is latched in its depressed position. It will be recalled that when the lower part of the division key is depressed, the rearward end of the link 884 is moved into engagement with the clutch release dog 890 and is operative to rock the same to allow the sensing clutch 221 to be engaged and to close the contacts 892.

Upon rotation of the sensing clutch, the lower sensing slides are released by means of the discs 232, 233, 234 (Figure 7) acting against the wedge 245 (Figure 8) to move the link 250 downwardly and release the latching pawl 256 from the right hand arm 260.

The upper sensing slides are also released and allowed to move forward upon initial rotation of the sensing clutch. The flat end of the cam 837 (Figure 24) moves from engagement with the roller 842 and the cam 836, acting against the roller 843, moves the right gear sector 839 forward, releasing the bails 730 and allowing the upper slides 725 to move forward. As the feelers for the counting wheels 601 are in operative position, the upper sensing slides are thereby positioned to represent the values of the respective digits of the multiplier.

The next operation under control of the sensing clutch is the restoring of the lower slides 300 by means of the cam 1060 (Figure 7) which is moved to operative position by the cam flange 1064 of the cam disc 1063 driven from the sensing clutch. At the beginning of the operation such restoration is an idle one and the sensing slides move forward immediately after release of the arm 260 from the cam 1060.

Upon rotation of the sensing clutch, the cam clutch 220 being engaged, the cam disc 1075 will have started rotating and will become operative while the lower sensing slides are in their restored position. The cam disc 1075 will engage the slide 158 (Figures 3 and 6), moving the same to the right, carrying therewith the upper slide 155 (Figure 6) and positioning the lugs 156 of the upper slide in the path of the projections 306 of the lower sensing slides. This setting will be maintained through approximately the entire cycle of rotation of the sensing clutch, and when the lower slides again move forward, the value 1 will be set in the order corresponding to the lowest order of the shiftable registering mechanism by means of the lug 157 (Figure 6).

The upper and lower sensing slides on moving forward, position the comparing members 906 (Figure 3) and as the highest order inequality is in that order in which the value 2 of the multiplier and the value 1 are set, the lower arm 915 in said order is moved to the left (Figure 3), the cam edge 918 becoming effective to position the cam surface 924 (Figures 29 and 30) of that order in the path of the forward control pin 930.

The drive for the control pins 930 is so timed that it becomes effective shortly after the restoration of the sensing slides; that is, sufficient time is allowed for all of the comparing mechanisms to be set and the respective cam surfaces 924 and 925 to be positioned before the pins 930 of highest order reach their operative position.

The cam surface 924 being positioned in the path of the forward pin 930, the rearward pin 930 will be cammed so as to strike the lug 944 of the actuation bail 943 in that order. This will, through the links 951 and lever 952, position the control key 954 so that the point 963 and the end 965 lie to the right of the rods 964 and 966 respectively; that is, in position to initiate an actuation. Near the end of the rotation of the sensing clutch, after all of the pins 930 have passed their effective position, the pin 991 on the clutch housing of the sensing clutch 221 (Figure 27) strikes the projection 990 of the link 985, forcing the control key 954 downwardly against the rearward arm 967 of the actuator clutch release dog 970, thus engaging the actuator clutch. When the clutch release dog 970 is rocked out of engagement with the clutch housing, it closes the contacts 476 to keep the motor energized after the sensing clutch has been stopped and allows the actuator clutch to be engaged.

During the last part of the cycle of rotation of the sensing clutch the upper and lower sensing slides are restored by means of the cams 837 (Figure 24) and 1060 (Figure 7), the said cam 1060 being moved to effective position by the cam rise 1065 on the cam disk 1063.

The rotation of the actuator will be effective to enter the number 68,934 into the accumulating mechanism, and to subtract 1 from the highest order of the multiplier. At the end of the sensing cycle the lower sensing slides have been restored by cam 1060 (Figure 7) and the slides 156 and 158 are returned to ineffective position by the movement of cam 1075 (Figure 3) to full cycle position. Thus when the actuator clutch cycle begins, the lower sensing slides are again released, this time by discs 236, 237, and 238 (Figure 7), and set the selecting devices in accordance with the multiplicand registration. After the digitation and transfer portion of the cycle of the rotation of the actuator clutch, the cam 1006 attached to the clutch housing 215 will, through the lever 1007, pin 1011, and link 884, again engage the sensing clutch for the second sensing operation.

The sequence of operation is the same during this cycle of the sensing clutch as the one previously described except that the control of the comparing mechanism is exerted in the second order of the multiplier as the highest order inequality occurs therein and the second digit 6 of the multiplier being greater than the value 0 sensed in the lower sensing slide of that order, another actuation will be determined, and the actuator clutch is again initiated in the manner described above.

The second rotation of the actuator clutch will again enter the multiplicand in the accumulating register and subtract 1 from the counting wheel 601 of the highest order of the multiplier, and at the conclusion of the rotation thereof, rotation of the sensing clutch is again initiated.

During the third rotation of the sensing clutch, the comparing mechanism of the highest order of the multiplier will show an inequality in which the divisor is greater than the dividend; that is, the value 1 which is automatically set in the machine for sensing operations is compared with the value 0 now standing in the highest order of the multiplier, and a shifting operation is determined from the control exercised in this order. The carriage will therefore be shifted one position to the right.

The operative part of the shifting worm 124 (Figure 6) is spaced sufficiently far away from the full cycle position thereof that ample time will be allowed for the sensing clutch to stop and for the cam 265 (Figure 7) to become operative to restore, through the medium of the arm 260 and the rod 262, the lower sensing slides 300, where they will be latched by the latching pawl 256 (Figure 8).

Near the end of the rotation of the shifting clutch, the cam 1014 carried on the clutch housing 99 thereof (Figure 25) will, through the medium of levers 1015, 1027, and link 884, initiate rotation of the sensing clutch.

In this order the multiplier digit being 6, the comparing mechanism determines and initiates six actuations in which the mupltiplicand is entered into the accumulating wheels, the third order counting wheel 601 is returned step by step to zero, while six are added in the corresponding order of the counting wheels 600. However, on the seventh sensing operation, the 1 divisor will be greater than the zero standing in that order of the multiplier, and the carriage will be shifted one place to the right. In this position of the carriage the first sensing operation will determine another carriage shift, as the second order digit of the multiplier is zero, which, when compared with the 1 divisor will determine a shift.

In the extreme right hand position of the carriage, the first three operation control sensings determine three actuations corresponding to the digit 3 in that order of the multiplier, and the fourth sensing operation will determine a shifting operation. However, it will be recalled that when the carriage has entered its last position in automatic operation, mechanism has been tripped which will, when a control of a shifting operation is determined, be operative to release the automatic control keys and stop the operation, rather than to initiate a shift. This mechanism operates in the same manner in automatic multiplication as in automatic division, and no description thereof is deemed necessary herein.

At the conclusion of the last three actuations corresponding to the lowest order digit of the multiplier, the number 1,794,435,202 stands in the accumulating wheels. The multiplicand 68,934 stands in the item registering wheels 4, while the multiplier has been entered in the counting wheels 600, at the same time it was being taken out of the counting wheels 601, so that all three factors of the multiplication are visible on three of the registers of the machine.

STOP KEY
Figures 1 and 25

A stop key 1200 is provided which is operative upon depression thereof to terminate an automatic operation at the conclusion of the operation then in progress, whether it be an actuation or a shifting operation. The key 1200 is provided with a stem 1201 which extends through the casing of the machine, and is mounted for limited vertical sliding movement by pin and slot connections 1202, 1203 (Figure 25). A pin 1204 is provided which normally overlies a cam edge 1205 on the latching slide 867. Upon depression of the key 1200, the pin 1204, acting against the cam edge 1205, moves the slide to the left to release either or both of the keys adapted to be latched thereby. The release of the lower part 857 of the division key permits the spring 885 to become effective to lower the forward end of link 884 thereby disabling the connection between the rearward end of said link and the sensing clutch release dog. During the downward movement of the forward end of the link 884, the pin 898 acting against the inclined surface 896, rocks the arm 895 to the left.

As the connection between the rearward end of link 884 and the sensing clutch release dog 890 is broken by depression of the key 1200, the automatic operation is terminated at the conclusion of the cycle of rotation of the actuating clutch or shifting clutch then determined or in progress.

I claim:
1. In a calculating machine having relatively displaceable groups of differential elements adapted to represent two factors in a plural order calculation, normally disabled means for comparing the values entered into said groups, manually operable means for enabling said comparing means, means for maintaining said enabling means in operative position throughout a plural order operation, and automatically operable means rendered effective by the displaceable group in the last displaced position thereof for disabling said maintaining means.

2. In a calculating machine, numeral wheels for registering a product value, mechanism settable to a multiplicand value for controlling actuation of said numeral wheels during digitation thereof, mechanism settable to a multiplier value, means for setting said first named mechanism to a predetermined value, means for comparing said multiplier value and said predetermined value, and means controlled thereby for determining and initiating the proper machine operation.

3. In a calculating machine, numeral wheels for registering a product value, mechanism settable to a multiplicand value for controlling actuation of said numeral wheels during digitation thereof, mechanism settable to a multiplier value, automatically operable means for setting said first named mechanism to a predetermined value, differentially settable means associated with said first named means for determining the relation between the predetermined value set therein and the multiplier value set in said last named mechanism.

4. In a calculating machine, numeral wheels for registering a product value, mechanism settable to a multiplicand value for controlling actuation of said numeral wheels during digitation thereof, mechanism settable to a multiplier value, automatically operable means for setting said first named mechanism to a predetermined value, differentially settable means associated with said first named means for determining the relation between the digits of the predetermined value set therein and the corresponding digits of the multiplier value set in said last named mechanism.

5. In a calculating machine, numeral wheels for registering a product value, mechanism settable to a multiplicand value for controlling actuation of said numeral wheels during digitation thereof, mechanism settable to a multiplier value, automatically operable means for setting said first named mechanism to a predetermined value, differentially settable means controlled by said first named means for determining whether the digits of the predetermined value are greater than, equal to, or less than the corresponding digits of the multiplier value set in said last named mechanism.

6. In a calculating machine, numeral wheels for registering a product value, mechanism settable to a multiplicand value for controlling actuation of said numeral wheels during digitation thereof, mechanism settable to a multiplier value, automatically operable means for setting said first named mechanism to a predetermined value, differentially settable means associated with said first named means for determining the relation between the digits of the predetermined value set therein and the corresponding digits of the multiplier value set in said last named mechanism, and means controlled by said last named means for controlling actuation of said numeral wheels.

7. In a calculating machine, accumulating mechanism, registering mechanism, said mechanisms being relatively displaceable with respect to each other, means for accumulating values in said registering mechanism, means for forming a representation of values standing on said registering mechanism, and means controlled by said last named means for actuating said accumulating mechanism.

8. In a calculating machine, accumulating mechanism, registering mechanism, said mechanisms being relatively displaceable with respect to each other, means for accumulating values in said registering mechanism, means for sensing the values standing on said register, and means controlled thereby for controlling digitation of said accumulating mechanism.

9. In a calculating machine, an item registering mechanism, sensing mechanism therefor, said mechanisms being relatively displaceable with respect to each other, means for retaining said sensing mechanism in inoperative position, a plurality of drive controlling clutches, and means operable in response to the operation of any of said clutches for disabling said retaining means.

10. In a calculating machine, registering mechanism, sensing mechanism therefor, power driven restoring means for said sensing mechanism, a plurality of drive controlling clutches, and means operable in response to the operation of any of said clutches for disabling said restoring means.

11. In a calculating machine, registering mechanism, sensing mechanism therefor, power driven restoring means for said sensing mechanism, a plurality of drive controlling clutches, means for disabling said restoring means during operation of any of said clutches, and means controlled by said restoring means to maintain the power drive therefor until effective operation thereof.

12. In a calculating machine, registering mechanism, actuating mechanism therefor, a second registering mechanism, manipulative means for establishing an operative connection between said second registering mechanism and said actuating mechanism to determine concurrent registration on said registering mechanisms, and means automatically operable to break said connection during tens transfer operations.

13. In a calculating machine, a plurality of registering mechanisms, actuating mechanism therefor, a plurality of settable means for determining positive or negative registration respectively, upon said registering mechanisms by said actuating mechanism, means for selectively controlling said settable means, and means for selecting one or more of the settable means for control by said last named means.

14. An adding machine comprising a frame, selecting mechanism mounted therein, a carriage mounted on said frame for lateral movement with respect to said selecting mechanism, registering devices and actuators therefor mounted in said carriage and controlled by said selecting mechanism, driving means carried on said frame, and an extensible driving connection between said driving means and said actuators whereby the latter may be driven in any of a plurality of lateral positions of said carriage.

15. In a motor driven calculating machine having relatively displaceable groups of differential elements adapted to represent two factors in a calculation; the combination of means for comparing the values entered into said groups of elements, comprising devices for sensing the said elements and forming a mechanical indication of the relative magnitude of the factors represented thereby, and means deriving power from the motor and controlled by said indication forming devices for selecting and initiating operation of one of a plurality of control devices.

16. In a motor driven calculating machine having relatively displaceable groups of differential elements adapted to represent two factors in a calculation; the combination of means for comparing the values entered into said groups of elements, comprising devices for sensing the said elements and forming a mechanical indication of the relative magnitude of the factors represented thereby, and means deriving power from the motor and controlled by said indication forming devices from the highest decimal order thereof in which an inequality occurs for selecting and initiating operation of one of a plurality of control devices.

17. In a motor driven calculating machine having registering mechanism, actuating devices therefor and selecting mechanism; the combination of starting mechanism operable by the motor, means rendered effective by said starting mechanism for determining the relative magnitude of digits of a divisor value in said selecting mechanism and corresponding digits of a dividend value in said registering mechanism, and devices operable by said starting mechanism and controlled by said last named means for connecting said actuating devices to the motor.

18. In a motor driven calculating machine having registering mechanism, actuating devices therefor and selecting mechanism; the combination of starting mechanism operable by the motor, means rendered effective by said starting mechanism for determining the relative magnitude of digits of a divisor value in said selecting mechanism and corresponding digits of a dividend value in said registering mechanism, devices operable by said starting mechanism to effect a driving connection between the motor and said actuating devices, and means controlled by said last named means for preventing said starting means from effecting said connection.

19. In a calculating machine, a plural order item registering mechanism, mechanism for sensing a plurality of orders thereof, means for effecting relative displacement of said mechanisms, latching means for said sensing mechanism, and means controlled by said displacing means for disabling said latching means.

GEORGE W. HOPKINS, Jr.